(12) United States Patent
Moorthi et al.

(10) Patent No.: US 9,239,996 B2
(45) Date of Patent: Jan. 19, 2016

(54) METHOD AND APPARATUS FOR CLEARING CLOUD COMPUTE DEMAND

(75) Inventors: Jay Moorthi, San Francisco, CA (US); Christopher A. Thorpe, Lincoln, MA (US); William Josephson, Greenwich, CT (US)

(73) Assignee: SOLANO LABS, INC., San Francisco, CA (US)

( * ) Notice: Subject to any disclaimer, the term of this patent is extended or adjusted under 35 U.S.C. 154(b) by 0 days.

(21) Appl. No.: 13/216,934

(22) Filed: Aug. 24, 2011

(65) Prior Publication Data

US 2012/0131591 A1     May 24, 2012

Related U.S. Application Data

(60) Provisional application No. 61/376,296, filed on Aug. 24, 2010.

(51) Int. Cl.
    *G06F 9/46*        (2006.01)
    *G06Q 10/06*       (2012.01)
    *G06Q 30/00*       (2012.01)

(52) U.S. Cl.
    CPC ............... *G06Q 10/06* (2013.01); *G06Q 30/00* (2013.01)

(58) Field of Classification Search
    USPC .......................................... 718/104; 709/201
    See application file for complete search history.

(56) References Cited

U.S. PATENT DOCUMENTS

| | | | |
|---|---|---|---|
| 7,020,797 B2 | 3/2006 | Patil | |
| 7,870,044 B2 | 1/2011 | Robertson | |
| 8,166,458 B2 | 4/2012 | Li et al. | |
| 8,214,686 B2 * | 7/2012 | Ueda | 714/15 |
| 2002/0019844 A1 | 2/2002 | Kurowski et al. | |
| 2006/0167984 A1 * | 7/2006 | Fellenstein et al. | 709/203 |
| 2007/0174069 A1 | 7/2007 | Moore et al. | |
| 2007/0180451 A1 * | 8/2007 | Ryan et al. | 718/104 |
| 2007/0283351 A1 | 12/2007 | Degenaro et al. | |
| 2008/0115143 A1 * | 5/2008 | Shimizu et al. | 718/105 |
| 2009/0007074 A1 | 1/2009 | Campion et al. | |

(Continued)

OTHER PUBLICATIONS

International Search Report and Writen Opinion for corresponding International application No. PCT/US 11/48977 Mailed Jan. 11, 2012, 16 pages.

(Continued)

*Primary Examiner* — Diem Cao
(74) *Attorney, Agent, or Firm* — Lando & Anastasi, LLP

(57) ABSTRACT

Provided are systems and methods for simplifying cloud compute markets. A compute marketplace can be configured to determine, automatically, attributes and/or constraints associated with a job without requiring the consumer to provide them. The compute marketplace provides a clearing house for excess compute resources which can be offered privately or publically. The compute environment can be further configured to optimize job completion across multiple providers with different execution formats, and can also factor operating expense of the compute environment into the optimization. The compute marketplace can also be configured to monitor jobs and/or individual job partitions while their execution is in progress. The compute marketplace can be configured to dynamically redistribute jobs/job partitions across providers when, for example, cycle pricing changes during execution, providers fail to meet defined constraints, excess capacity becomes available, compute capacity becomes unavailable, among other options.

37 Claims, 25 Drawing Sheets

(56) References Cited

U.S. PATENT DOCUMENTS

| | | | |
|---|---|---|---|
| 2010/0076856 A1 | 3/2010 | Mullins | |
| 2010/0125473 A1 | 5/2010 | Tung et al. | |
| 2010/0250642 A1* | 9/2010 | Yellin et al. | 709/201 |
| 2010/0251259 A1* | 9/2010 | Howard | 718/105 |
| 2010/0281095 A1* | 11/2010 | Wehner et al. | 709/201 |
| 2011/0093744 A1 | 4/2011 | Martinov | |
| 2013/0152047 A1 | 6/2013 | Moorthi et al. | |

OTHER PUBLICATIONS

A Combinatorial Exchange for Complex Grid Services; 2010; pp. 221-237—Abstract Only—complete reference available upon request.

Inter-Cloud Utility-Oriented Federation of Cloud Computing Environments; 2010; R. Buyya.

A Market Exchange for Trading Utility Computing Services; Mar. 11, 2011; Saurabh Kumar Garg-Christian Vecchiola-Rajkumar Buyya.

Meta Scheduling for Market-Oriented Grid and Utility Computing; Jun. 2010; Saurabh Kumar Garg.

Strategy-Proof Dynamic Resource Pricing of Multiple Resource Types on Federated Clouds; Marian Mihailescu and Yong Meng Teo; Dept of Compuer Science; Nat'l University of Singapore; Computing 1, 13 Computing Drive, Singapore 117417; 2010; pp. 337-350.

Towards Autonomic Workload Provisioning for Enterprise Grids and Clouds; 2009.

Applying Double-Side Combinational Auctions to Resource Allocation in the Cloud; 2010; Ikki Fujiwara; Kento Aida; Isao Ono—Abstract Only—complete reference available upon request.

* cited by examiner

New Job  Track  Account

Review Estimate [Unsatisfied]

Job Name test job

VM Image http://a.b.c.d.com/x.img ⊘

Size 200 VM hours

Estimate

Start Time 11/09/2010 13:45
 Completion Time 11/17/2010 12:32 (!)
 Cost $45.25 ⊘

Aggregate Rate 0.29 GHz
 Average Cost $0.22/hr

Estimate Expires 11/09/2010 13:25

(!) Sorry. We cannot complete your job within the deadline. Click "Start Job" to accept this estimate anyways.

[ Cancel ] or Start Job

FIG. 22

METHOD AND APPARATUS FOR CLEARING CLOUD COMPUTE DEMAND

RELATED APPLICATIONS

This application claims priority under 35 U.S.C. §119(e) to U.S. Provisional Application Ser. No. 61/376,296 entitled "METHOD AND APPARATUS FOR PRICING CLOUD COMPUTE CYCLES," filed on Aug. 24, 2010, which is incorporated herein by reference in its entirety.

BACKGROUND

Cloud computing developed from the need of private companies to recover their investment in compute grids by renting out spare cycles in off-peak times. Typical implementations in compute grids infrastructure often resulted in over-provisioned compute grids and spare cycles of compute power that were not being utilized. As the market for cloud compute resources has been established, more dedicated providers have emerged in commercial settings, such as Amazon EC2, Softlayer, and Rackspace to provide excess compute capacity to consumers. Others have specifically developed compute grids to offer such processing power to consumers both on an as needed basis and on a subscriptions based model. The development of compute marketplaces and the increase in the number of compute provides has limited some of the waste associated with excess compute capacity. However, even these dedicated providers also suffer from the need to over-provision physical resources to insure sufficient compute capacity for a given job at any given time.

As the market for cloud services has grown, providers have pushed to differentiate themselves based on price, reliability, manageability, platform and other factors and features. Typically consumers of cloud compute services, however, are not interested in these complexities. Consumers are often most concerned with getting their compute work done "as soon as possible," "as cheaply as possible," or within some time or price constraint. Thus, the identification of underlying capacities of given cloud compute systems overwhelms the typical consumer.

SUMMARY

In broad overview, various aspects of the invention address some of the inefficiencies in the cloud compute market, both for cloud compute consumers and providers. Various inefficiencies can be observed in traditional cloud compute systems, for example, a provider inefficiency may include excess capacity. Inefficiencies exist on the consumer end of the transaction as well. For example, conventional cloud compute systems rely on the consumer to identify the constraints for a submitted job. Typical consumers are not suited to the task of identifying the constraints and/or attributes of a given job. In some embodiments, a cloud compute clearing system identifies constraints for a submitted job automatically. In other examples, the clearing system balances available compute cycles and costs associated with different compute provider platforms with any translation costs required to separate a compute job into partitions handled by different compute providers. In such a setting insuring a job is completed on time and on budget can require accounting for translation costs before allocation of a job or a partitioned portion of a job to a given compute provider.

According to one aspect, the present invention simplifies the cloud compute market for consumers by eliminating the information gathering work needed to get their compute task completed according to their needs. In one embodiment, the compute environment can be configured to determine, automatically, attributes associated with a given job without requiring the compute consumer to provide the attributes necessary to allocate a specific compute job between various compute providers. According to another aspect, the present invention simplifies the cloud compute market for providers by offering a clearing house where a plurality of providers can offer excess capacity for use. The compute environment can be further configured to optimize job completion based not on welfare of the consumer and/or provider but also factor the needs and operating expense of the compute environment that manages job distribution. In another environment, the compute environment can be configured to monitor jobs and/or individual job partitions while their execution is in progress. The computer environment can be configured to dynamically redistribute jobs/job partitions across providers when, for example, cycle pricing changes during execution, providers fail to meet provided constraints, excess capacity becomes available, compute capacity becomes unavailable, etc.

According to one aspect provided is a computer implemented method for distributing cloud compute jobs. The method comprises receiving, by a central computer system, over a communication network a request to execute a computer based task, identifying, by the central computer system, any condition constraining the completion of the computer based task, partitioning, by the central computer system, the computer based task into one or more sub-tasks, determining, by the central computer system, assignment of the one or more sub-tasks to one or more of a plurality of compute providers, wherein the act of determining the assignment of the one or more sub-tasks includes analyzing the plurality of compute providers for at least resource availability and any translation cost, wherein at least one of the plurality of compute providers provides a different execution format associated with execution of a compute task, transmitting, over the communication network, a request to execute each sub-task to a respective provider, and providing access, over the communication network, to any executed portion of the executed task, wherein the computer based task is scheduled to be executed according to the any condition.

According to one embodiment, the act of identifying the any condition constraining the completion of the computer based task, includes an act of identifying, automatically by the central computer system, the any condition based on the computer based task. According to one embodiment, the act of identifying the any condition includes acts of analyzing the computer based task; and determining, automatically by the central computer system, at least a minimal set of conditions required to execute the computer based task. According to one embodiment, an act of identifying, automatically by the central computer system, the at least a minimal set of conditions includes identifying constraints for the computer based task based on a training set of constraints for computer based tasks having identified attributes. According to one embodiment, the act of identifying, automatically by the central computer system, the at least the minimal set of conditions includes acts of accessing a set of stored rules having computer based task attributes, evaluating the computer based task against the set of rules, and assigning constraints to the computer based task based on matching attributes. According to one embodiment, the method further comprises an act of weighting the set of rules to favor at least one constraint. According to one embodiment, the act identifying, automatically by the central computer system, the any condition based on the computer based task includes an act of assigning at least one response-function family of constraints for the computer based task.

According to one embodiment, the method further comprises acts of evaluating the at least the minimal set of conditions required to execute the computer based task, and updating at least one of a training procedure and a set of rules having computer based task attributes and constraints in response to the act of evaluating. According to one embodiment, the method further comprises an act of monitoring, by the central computer system, at least a portion of an execution of the computer based task in an input environment; and generating a virtualized environment corresponding to the input environment. According to one embodiment, the act of monitoring includes an act of intercepting API traffic generated by the execution of the portion of the computer based task, and the method further comprises generating a translation of the API traffic into another virtual environment. According to one embodiment, the act of identifying the any condition constraining the completion of the computer based task includes an act of executing a subset job on the plurality of compute providers, capturing execution errors, and receiving user based selection of translation mechanisms.

According to one embodiment, the method further comprises an act of storing the any condition constraining the completion of the computer based task and attributes of the computer based task. According to one embodiment, the one or more of a plurality of compute providers include at least a first compute provider having a first compute execution format and a at least a second compute provider having a second compute execution format, and the act of determining the assignment of the one or more sub-tasks to the one or more of a plurality of compute providers includes estimating a translation cost in terms of compute resource of any of the one or more sub-tasks to permit execution in at least one of the first compute execution format and the second compute execution format. According to one embodiment, the method further comprises an act of querying the one or more providers for job execution format and processing capability. According to one embodiment, the act of querying the one or more providers includes an act of requesting execution of a benchmark task. According to one embodiment, the method further comprises an act of recalculating the assignment of the one or more sub-tasks to the one or more of the plurality of compute providers based on execution parameters. According to one embodiment, the execution parameters includes at least one of new compute resource availability, updated pricing information for available compute resources, sub-task performance information, and update computer based task preferences. According to one embodiment, the method further comprises an act of estimating a compute cost of moving at least one assigned sub-task.

According to one embodiment, the act of estimating a compute cost of moving the at least one assigned sub-task includes estimating a translation cost in terms of compute resource. According to one embodiment, the act of estimating a compute cost of moving the at least one assigned sub-task includes estimating a translation cost in terms of compute resource; and estimating bandwidth consumption required to move the at least one assigned sub-task. According to one embodiment, the act of partitioning the computer based task into one or more sub-tasks includes partitioning the computer based task into fixed length intervals. According to one embodiment, the act of partitioning the computer based task into one or more sub-tasks includes partitioning the computer based task dynamically in response to at least one of predicted load, historical load, service level guarantee, and customer identified required compute providers. According to one embodiment, the method further comprises an act of generating at least one of an estimated cost and estimated completion time for the computer based task.

According to one embodiment, the act of generating the at least one of an estimated cost and estimated completion time for the computer based task includes an act of determining an operating expense associated with managing the assignment and execution of the computer based task. According to one embodiment, the method further comprises an act of improving the act of
determining, by the central computer system, assignment of the one or more sub-tasks to one or more of a plurality of compute providers based on historical execution of computer based tasks.

According to one aspect provided is a system for executing cloud compute jobs. The system comprises at least one processor operatively connected to a memory for executing system components, a communication component configured to receive a request to execute a computer based task, a constraint component configured to identify any condition constraining the completion of the computer based task, a partition component configured to partition the computer based task into one or more sub-tasks, an allocation component configured to assign the one or more sub-tasks to one or more of a plurality of compute providers, wherein the allocation component is further configured to determine the assignment of the one or more sub-tasks based on at least resource availability and any translation cost associated with each compute provider, wherein at least one of the plurality of compute providers provides a different execution format associated with execution of a compute task, a distribution component configured to distribute each sub-task to a respective compute provider for execution, and wherein the communication component is further configured to provide access to any executed portion of the executed task, wherein the computer based task is executed within the any defined condition.

According to one embodiment, the constraint component is further configured to identify, automatically, the any condition based on the computer based task. According to one embodiment, the constraint component is further configured to: analyze the computer based task; and determine, automatically, at least a minimal set of conditions required to execute the computer based task. According to one embodiment, the constraint component is further configured to identify constraints for the computer based task based on a training set of constraints for computer based tasks having identified attributes. According to one embodiment, the constraint component is further configured to access a set of stored rules having computer based task attributes; evaluate the computer based task against the set of rules; and assign constraints to the computer based task based on matching attributes.

According to one embodiment, the constraint component is further configured to weight the set of rules to favor at least one constraint. According to one embodiment, the constraint component is further configured to assign at least one response-function family of constraints for the computer based task. According to one embodiment, the system further comprises a training component configured to: evaluate the at least the minimal set of conditions required to execute the computer based task, and update at least one of a training procedure and a set of rules having computer based task attributes and constraints in response to evaluating of the at least the minimal set of conditions required to execute the computer based task. According to one embodiment, the system further comprises a translation component configured to monitor at least a portion of an execution of the computer based task in an input environment; and generate a virtualized environment corresponding to the input environment.

According to one embodiment, the translation component is further configured to intercept API traffic generated by the execution of the portion of the computer based task; and generate a translation of the API traffic into another virtual environment. According to one embodiment, the constraint component is further configured to execute a subset job on the plurality of compute providers, capture execution errors, and receive user based selection of translation mechanisms. According to one embodiment, the system further comprises a storage component configured to store the any condition constraining the completion of the computer based task and attributes of the computer based task. According to one embodiment, one or more of a plurality of compute providers include at least a first compute provider having a first compute execution format and a at least a second compute provider having a second compute execution format, and allocation component is further configured to estimate a translation cost in terms of compute resource of any of the one or more sub-tasks to permit execution in at least one of the first compute execution format and the second compute execution format. According to one embodiment, the translation component is further configured to query the one or more providers for job execution format.

According to one embodiment, the translation component is further configured to request execution of a benchmark task. According to one embodiment, the system further comprises an optimization component configured to recalculate the assignment of the one or more sub-tasks to the one or more of the plurality of compute providers based on execution parameters. According to one embodiment, the execution parameters includes at least one of new compute resource availability, updated pricing information for available compute resources, sub-task performance information, and update computer based task preferences. According to one embodiment, the optimization component is further configured to estimate a compute cost of moving at least one assigned sub-task. According to one embodiment, the optimization component is further configured to estimate a translation cost in terms of compute resource. According to one embodiment, the optimization component is further configured to: estimate a translation cost in terms of compute resource; and estimate bandwidth consumption required to move the at least one assigned sub-task.

According to one embodiment, the partition component is further configured to partition the computer based task into fixed length intervals. According to one embodiment, the partition component is further configured to partition the computer based task dynamically in response to at least one of predicted load, historical load, service level guarantee, and customer identified required compute providers. According to one embodiment, the system further comprises an estimation component configured to generate at least one of an estimated cost and estimated completion time for the computer based task. According to one embodiment, estimation component is further configured to determine an operating expense associated with managing the assignment and execution of the computer based task.

According to one aspect a non-transitory computer-readable medium having computer-readable signals stored thereon that define instructions that, as a result of being executed by a computer, instruct the computer to perform method for distributing cloud compute jobs. The method comprises receiving over a communication network a request to execute a computer based task, identifying any condition constraining the completion of the computer based task, partitioning the computer based task into one or more sub-tasks, determining assignment of the one or more sub-tasks to one or more of a plurality of compute providers, wherein the act of determining the assignment of the one or more sub-tasks includes analyzing the plurality of compute providers for at least resource availability and any translation cost, wherein at least one of the plurality of compute providers provides a different execution format associated with execution of a compute task, transmitting a request to execute each sub-task to a respective provider, and providing access to any executed portion of the executed task, wherein the computer based task is scheduled to be executed according to the any condition.

According to one embodiment, the act of identifying the any condition constraining the completion of the computer based task, includes an act of identifying, automatically by the central computer system, the any condition based on the computer based task. According to one embodiment, the act of identifying the any condition includes acts of: analyzing the computer based task; and determining, automatically by the central computer system, at least a minimal set of conditions required to execute the computer based task. According to one embodiment, an act of identifying, automatically, the at least a minimal set of conditions includes identifying constraints for the computer based task based on a training set of constraints for computer based tasks having identified attributes. According to one embodiment, an act of identifying, automatically, the at least the minimal set of conditions includes acts of: accessing a set of stored rules having computer based task attributes; evaluating the computer based task against the set of rules; and assigning constraints to the computer based task based on matching attributes. According to one embodiment, the method further comprises an act of weighting the set of rules to favor at least one constraint.

According to one embodiment, the act identifying, automatically, the any condition based on the computer based task includes an act of assigning at least one response-function family of constraints for the computer based task. According to one embodiment, the method further comprises acts of: evaluating the at least the minimal set of conditions required to execute the computer based task, and updating at least one of a training procedure and a set of rules having computer based task attributes and constraints in response to the act of evaluating. According to one embodiment, the method further comprises an act of monitoring at least a portion of an execution of the computer based task in an input environment; and generating a virtualized environment corresponding to the input environment.

According to one embodiment, the act of monitoring includes an act of intercepting API traffic generated by the execution of the portion of the computer based task, and the method further comprises generating a translation of the API traffic into another virtual environment. According to one embodiment, the act of identifying the any condition constraining the completion of the computer based task includes an act of: executing a subset job on the plurality of compute providers; capturing execution errors; and receiving user based selection of translation mechanisms. According to one embodiment, the method further comprises an act of storing the any condition constraining the completion of the computer based task and attributes of the computer based task.

According to one embodiment, one or more of a plurality of compute providers include at least a first compute provider having a first compute execution format and a at least a second compute provider having a second compute execution format, and the act of determining the assignment of the one or more sub-tasks to the one or more of a plurality of compute providers includes estimating a translation cost in terms of compute resource of any of the one or more sub-tasks to permit execution in at least one of the first compute execution format and the second compute execution format. According to one embodiment, the method further comprises an act of querying the one or more providers for job execution format and processing capability.

According to one embodiment, the act of querying the one or more providers includes an act of requesting execution of a benchmark task. According to one embodiment, the method further comprises an act of recalculating the assignment of the one or more sub-tasks to the one or more of the plurality of compute providers based on execution parameters. According to one embodiment, the execution parameters includes at least one of new compute resource availability, updated pricing information for available compute resources, sub-task performance information, and update computer based task preferences. According to one embodiment, the method further comprises an act of estimating a compute cost of moving at least one assigned sub-task. According to one embodiment, the act of estimating a compute cost of moving the at least one assigned sub-task includes: estimating a translation cost in terms of compute resource; and estimating bandwidth consumption required to move the at least one assigned sub-task.

According to one embodiment, the act of partitioning the computer based task into one or more sub-tasks includes partitioning the computer based task into fixed length intervals. According to one embodiment, the act of partitioning the computer based task into one or more sub-tasks includes partitioning the computer based task dynamically in response to at least one of predicted load, historical load, service level guarantee, and customer identified required compute providers. According to one embodiment, the method further comprises an act of generating at least one of an estimated cost and estimated completion time for the computer based task. According to one embodiment, the act of generating the at least one of an estimated cost and estimated completion time for the computer based task includes an act of determining an operating expense associated with managing the assignment and execution of the computer based task. According to one embodiment, the method further comprises an act of improving the act of determining, by the central computer system, assignment of the one or more sub-tasks to one or more of a plurality of compute providers based on historical execution of computer based tasks.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

FIG. 22 illustrates an example user interface, according to aspects of the invention;

DETAILED DESCRIPTION

According to one embodiment, the requirements for efficient cloud compute systems rest on some observations on cloud computing. Cycles are cycles. Apart from proprietary software systems, there's nothing special about the CPUs hosting any commercial system. In fact, the success of cloud computing depends on the fact that it can be done on cheap commodity hardware. Results trump all else. As long as a compute task (or subtask) is completed on time and at cost, it doesn't matter to the task submitter whether it restarted, on what host it ran, etc. Many compute tasks are highly partitionable. The rapid growth in cloud hosting providers, and the popularity of MapReduce-style models like Hadoop (and support from Cloudera) along with providers such as Amazon EC2 indicate that there is demand for large-scale bulk compute processing.

According to another embodiment, assuming a set of cloud compute providers that meet a minimum reliability bar, it's possible to treat cloud compute cycles as an interchangeable commodity, tiered by price, performance and other features. A cloud compute system and/or method can then seamlessly parcel out compute work among multiple providers to generate optimal cloud compute execution. In some embodiments, the cloud compute marketplace can factor in the cost in terms of cycles and/or time in translating a given compute job for execution by disparate providers.

Various embodiments solve some of the issues with conventional cloud compute systems. One embodiment develops an intelligent cloud compute pricing model based on real-time price and availability information furnished by a plurality of cloud compute providers. Another embodiment hosts a cloud compute marketplace, where compute providers can register their resources and consumers can submit work and any known constraints of time, cost, and features, such that the work is automatically distributed among the plurality of providers to meet the constraints. In one setting, an environment is provided where cloud resources—whether they be compute, storage, or other interchangeable services—are seamlessly allocated in an efficient market.

Implementation Examples

Figure 10:
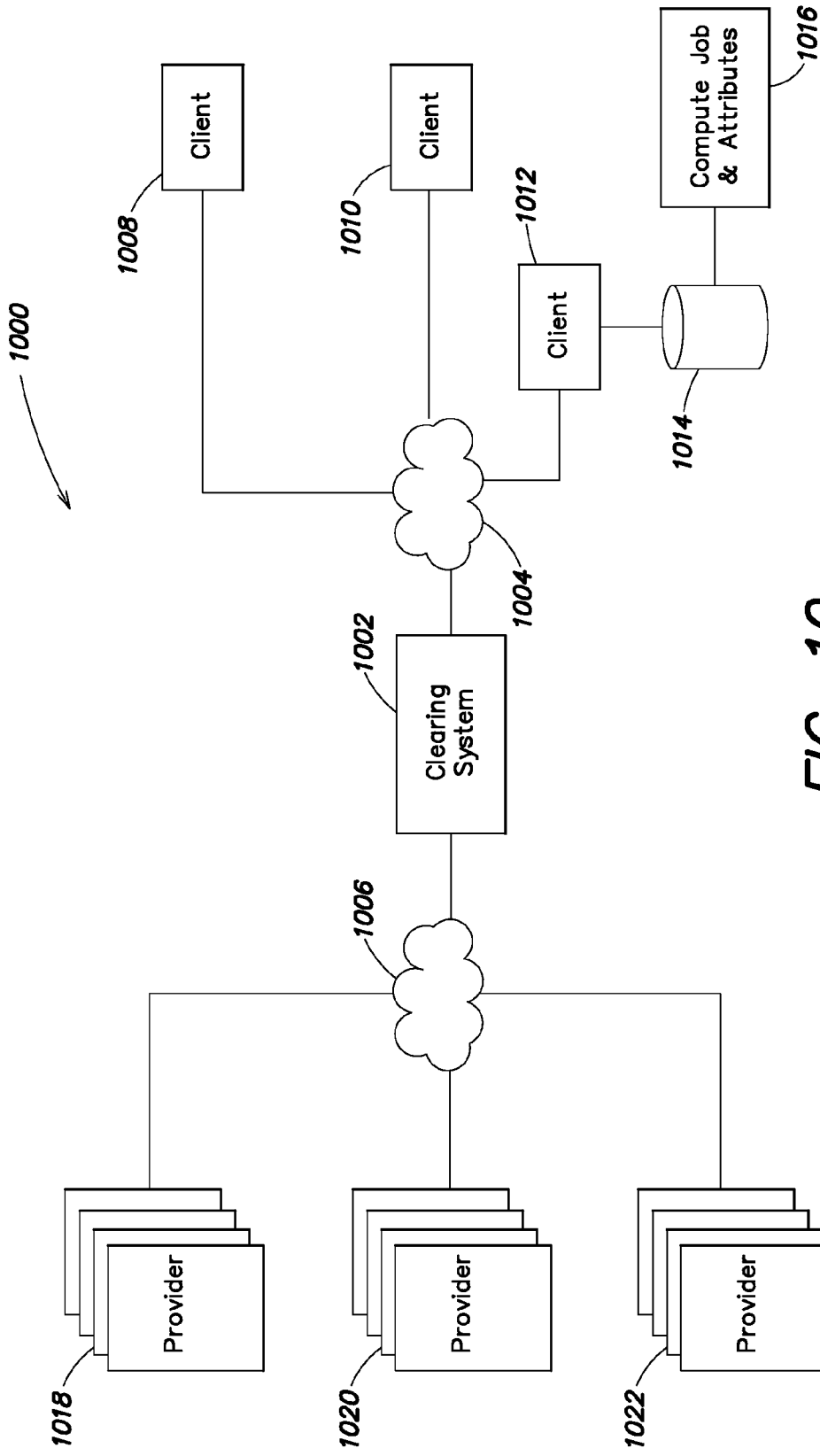
FIG. 10 is a block diagram of an example system architecture for a cloud compute marketplace, according to aspects of the invention.

Shown in FIG. 10 is a block diagram of an example cloud compute marketplace 1000. The cloud compute marketplace 1000 includes a central computer system, e.g., clearing system 1002, which houses the cloud compute exchange. The clearing system 1002 is configured to receive compute job requests from a plurality of cloud compute consumers, e.g., clients 1008-1012. Clients 1008-1012 can provide any known constraints for their cloud compute task, inputting for example, pricing, timing, desired provider, maximum costs, or other preferences establishing parameters for an optimal distribution of the cloud compute task. A client 1012 may create a compute job and specify its attributes on a host computer system. The terms job, task, sub-tasks, and job instance are used interchangeably herein to connote a cloud compute job and/or cloud compute job partitions that a client wishes to have executed by a cloud compute provider, except where the context dictates a more specific meaning. The compute job and its attributes 1016 can be communicated over communication network 1004 to the clearing system 1002 from any storage location on the host computer, e.g., database 1014. Network 1004 can include private communication networks, public communication networks, LAN, WAN, virtual network, among other example, including, the Internet.

Clearing system 1002 can be configured to automatically analyze any received cloud compute task and determine attributes and/or constraints for the received job. In some examples, the clearing system 1002 can also be configured to display graphical user interfaces to the client requesting information necessary to establish the attributes and/or constraints for a received cloud compute task. In some embodiments, the clearing system can be configured to partition the received cloud compute task and determine an optimal allocation for the partitioned sub-tasks as discussed in greater detail below. In other embodiments, the determination of the optimal distribution can be done in conjunction with the partitioning of the cloud compute task. In some examples, the partitioning of the task can be dependent on a calculation of an optimal distribution of the cloud compute task.

The optimal distribution determination can be computed using real-time information obtained or received from a plurality of compute providers, e.g., 1018-1022 over a communication network 1006. The compute providers typically provide information on, for example, available compute resources, cost, and availability. The provided information can be used by the clearing system 1002 to optimally allocate partitioned cloud compute tasks and/or partitioned sub-tasks to the compute resources hosted by the compute providers 1018-1022. In addition to cost and availability information, providers typically specify an execution format for compute jobs. In some examples, the compute provider specifies submission of jobs in a virtual machine format that can be executed on the provider's compute resources. Oftentimes, compute provider formats vary, requiring translation to occur on given sub-tasks prior to delivery and execution by a specific provider. Clearing system 1002 can be configured to execute a translation process to convert a compute task and/or partitioned sub-tasks into a format suitable for any provider determined to be part of an optimal distribution, described in greater detail below. Translation costs can be determined based on compute resources and/or cycles required to complete, time required, and any other parameter on which a compute task can be analyzed. The cost of translation can be factored into the optimal distribution of any cloud compute task. In some embodiments, the determination of optimal allocation and/or translation costs can be made using estimated and/or approximate values.

Once sub-tasks assignments have been determined by the clearing system 1002, the partitioned sub-tasks can be communicated to any assigned provider, e.g., 1018-1012 over communication network 1006. Network 1006 can include private communication networks, public communication networks, LANs, WANs, virtual networks, among other examples, including, the Internet. Communication bandwidth between clearing system 1002 and providers 1018-1022 can also be factored into the determination of optimal distribution. Further, various cloud compute tasks can require access to external data, and bandwidth constraints to external sources can also be factored into the allocation determination. The central computer system for a cloud compute marketplace is also referred to herein as the exchange system or exchange. The term exchange can also be used herein to denote the marketplace as a whole or a central system that providers and/or customers access to exchange cloud compute services.

There are a number of settings in which efficient cloud compute markets, cloud task distribution, and pricing strategies can be implemented. An example compute pricing system implemented as part of a cloud compute marketplace produces combinatorial pricing for large compute tasks in a cloud compute market.

For example, developing budget pricing models for cloud compute projects would be well suited to matching compute supply against consumer demand and budgetary constraints. One implementation can address creating a clearing house for existing cloud providers to wholesale their excess capacity. Various "white box resale" models can be priced and provisioned to users of cloud compute cycles. Another implementation can extend a "white-box" resale model to include organizations that would normally not sell their compute resources.

Providing access for registering provider services to an existing compute marketplace can result in private grid/HPC operators have minimal overhead for selling their idle cycles. In some examples, little overhead can results in greater participation. Greater participation can in some examples increase performance, reliability, and reduce costs of executed compute tasks on a consumer.

For example, academic or scientific supercomputer installations often have low or variable utilization, but fixed operational expense for support staff and maintenance. The academic administrator has little time to find potential tenants for excess capacity, but likely controls enough budget to justify integrating with a system that provides for reducing total cost of ownership through the pricing and distribution of unused cloud compute cycles.

According to one embodiment, the system provides a "trusted" sandbox platform into which generic work can be delivered. In some settings, bandwidth limits and network security can become issues when arbitrary public code can be delivered into a private organization's infrastructure. Ensuring a trusted platform can address some of the concerns. By limiting the execution space of a cloud compute resource the execution environment can be isolated and secured, i.e. "sandboxed." By assuring providers that their compute resources can be shielded from malicious execution using sandboxed implementations, providers can be confident that registering resources for cloud compute tasks should not have an impact on their compute resources.

License Rental Example

Some compute providers are entering the license rental market, for example timesharing an Intel Cluster Compiler installation. The budget pricing, resale, and co-generation discussed herein, as well as other, implementations can all be applied to both generic compute resources and specific license rental needs. License rental can add significant complexity to the market model, making it advantageous to integrate into a cloud compute market place, once the fundamental market model has been established.

Design Examples of an Interaction Model

According to one embodiment, a customer can interact with the system by submitting a job with metadata. The job can be submitted in a variety of formats. In one implementation, a customer generates a virtual machine (VM) image associated with some metadata, e.g., size of the job (e.g., in cycles). The customer can specify in a user interface constraints associated with the completion of that job, which can include budget (dollars), and/or deadline (date). In some embodiments, this information can all be associated and/or embedded in the VM image.

According to some embodiments, the submitted job is assumed to be naturally partitionable. In some examples, this means that the job is "horizontally scalable"—starting additional copies of the job will make it perform incrementally faster. For example, if the job is supplied as a VM image, it should be configured to execute in a set of instances, and to manually or automatically discover new instances as they are started. In some embodiments, the entire job may not be partitionable, but some parts of it may be. For example, if the job is to build an executable software image from source code, the compilation phase of the build may be partitionable since each file can be compiled independently and in parallel, but the link phase may not be partitionable. In some examples, a compute clearing system can be configured to automatically determine if a job is partitionable or if a job is partially partitionable.

Job size and whether a job size is known can impact operation of the system. For example, jobs with a known fixed size can be priced and distributed differently from jobs that can't be size-estimated. When size is fixed (e.g., render 50 million video frames), the system can produce concrete estimates of whether the projected price meets the budget and projected completion time meets the deadline.

Described are some examples of jobs and system responses to a customer:
  budget specified: system estimates soonest deadline
  deadline specified: system estimates lowest cost
  both specified: system estimates feasibility
  neither specified: system estimates cheapest and/or soonest
  fixed-size bills based on fully completed task (if the user cancels after some grace-period, he bears financial responsibility for any resources consumed, even though results may not be returned)

In setting where size is unknown or unlimited (e.g., live video stream processing), the system does not provide an absolute cost or completion time. Instead, the system is configured to operate in terms of relative quantities. For example the system can be configured to generate a price/cycle. Further the system can provide information on cycles/sec to assist a customer in determining projected costs.

Some example jobs and system operation follow:
  price/cycle specified: work is allocated as cycles are available at price
  cycles/sec specified: work is allocated to the lowest-price resource that meets the rate
  absolute deadline and budget can be specified, but work may not be completed once the time/budget are exhausted
  unlimited-size processing bills based on incremental consumption In one embodiment, the system can be configured to distribute work across all of the compute providers that it has registered, such that it meets the agreed upon constraints. Distribution across all providers can be configured to reward existing registrants by insuring that jobs are distributed, providing compute cycle request to all providers as long as specified constraints are met.

Figure 11:
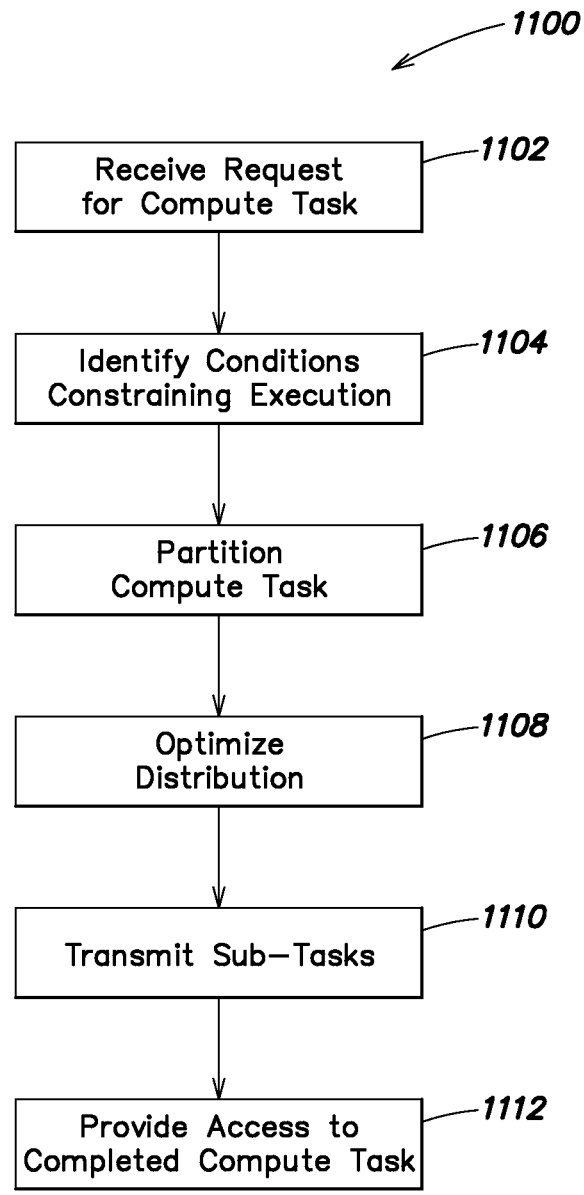
FIG. 11 illustrates an example process for allocating a cloud compute task between a plurality of compute providers, according to aspects of the invention.

Shown in FIG. 11 is an example process for allocating a cloud compute task between a plurality of compute providers. In some embodiments, process 1100 can be executed by a cloud compute marketplace, e.g., in system 1000, FIG. 10. Process 1100 can be implemented on a clearing system 1002 and in other examples can be executed with or instead of other processes. Process 1100 begins at 1102, with receiving a request for a compute task by a cloud compute marketplace system. At 1104, conditions for the execution of the task are identified at 1104. Some conditions can be specified by the submitter with the request for the compute task. In some examples, conditions can be specified interactively, and in other examples, a process can be executed to automatically identified constraints and/or attributes for a received task. Step 1104 can be implemented as another process called during step 1104. For example, process 600, FIG. 6, discussed in greater detail below can be executed in whole or in part as part of step 1104. Once any conditions constraining execution have been identified, the compute task can be partitioned at 1106 into a plurality of sub-tasks. Various partition processes can be executed as part of step 1106 as discussed in greater detail below. In some embodiments, fixed length and/or size partitions can be generated. In other embodiments, partitions can be generated dynamically. At 1108, an optimal distribution of sub-tasks is determined based on the identified constraints for execution. Optimal in a cloud compute marketplace can include at a minimum, any execution that meets any consumer specified parameters (e.g., price, timing, confidence level, etc.) any compute provider requirements (size, availability, execution format, etc.) while providing for operational costs of the cloud compute marketplace. Optimal distribution as used herein describes a solution and not necessarily the best solution to a given job allocation that meet at least the specified minimum requirements.

Once the plurality of sub-tasks has been assigned to the compute providers, the sub-tasks are transmitted at 1110 for execution. In some embodiments, process 1100 can include an optional step of monitoring the execution of the plurality of sub-tasks. Monitoring can invoke other processes for re-distributing sub-tasks to further optimize the execution of compute tasks (e.g., decrease cost, increase confidence level, etc.) Optional monitoring can include for example execution of process 800, FIG. 8, in whole or in part. In some other examples, re-distribution determinations can incorporate process 500 for analyzing switching costs associated with moving a sub-task between compute providers. Once the sub-tasks have been executed, access to the completed compute task is provided at 1112.

Example Pricing Model

According to one embodiment, a cloud compute market place can be configured to execute a pricing engine configured to generate pricing for compute resources that can be provided to consumers in advance, upon submission of a request, and/or on demand. In some embodiments, a pricing engine is comprised of software executed on hardware components. In one example, the pricing engine is configured to generate a price for compute resources based on a reverse-auction model. Further the pricing engine can be configured to provide for an efficient distribution of work. In one example, the pricing engine computes, based on the size of the input job and the knowledge it has about available resources and their individual pricing, a partition of the input job that satisfies consumer constraints while maximizing provider revenue.

Figure 12:
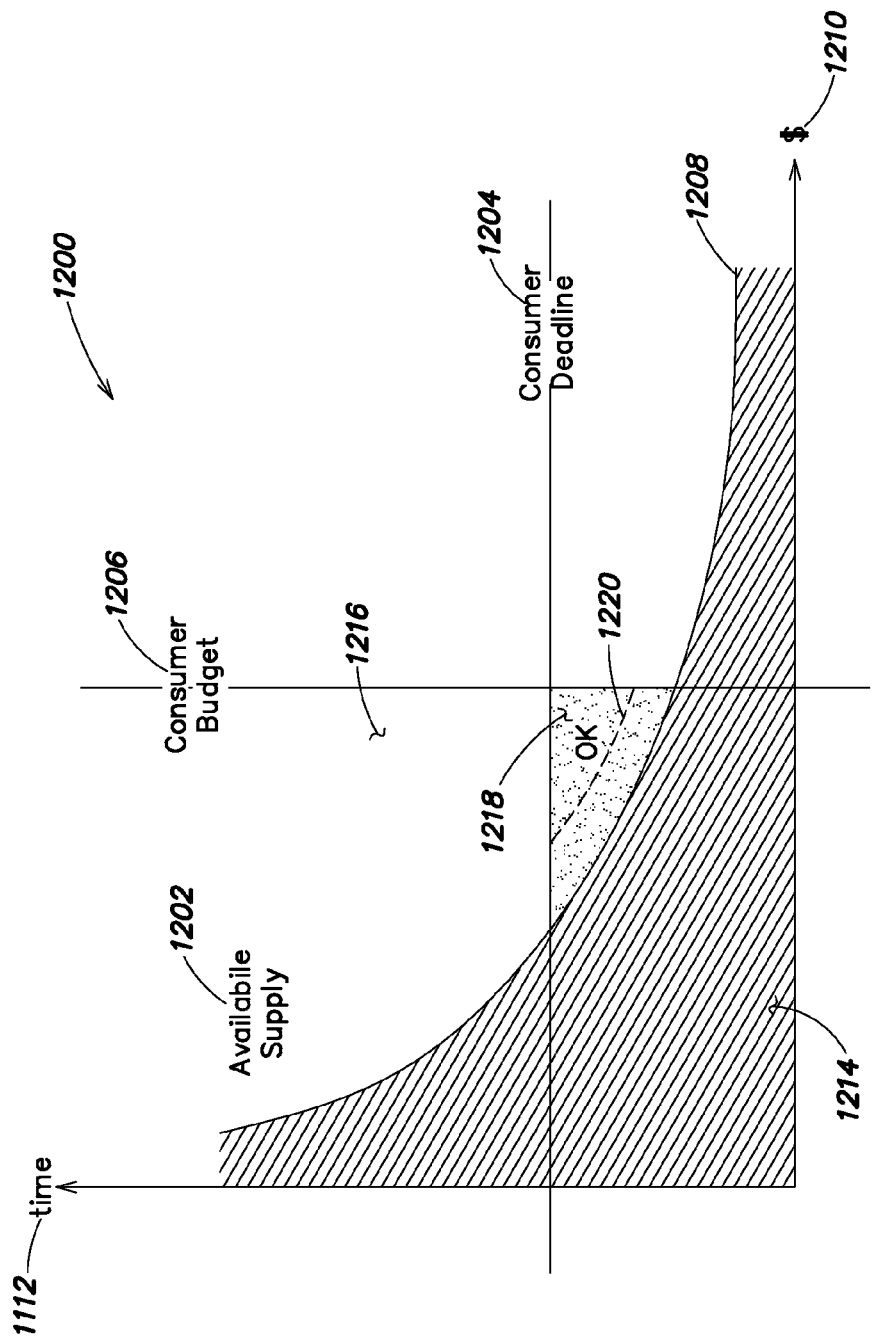
FIG. 12 illustrates an example supply curve graph, according to aspects of the invention.

According to one embodiment, the basic idea of the pricing engine model can be represented with a chart. Shown in FIG. 12 is an example supply curve graph 1200 illustrating available providers 1202 at a given job size. As shown, for a given job size, a point (x,y) represents a job being completed for cost=x 1210 and duration=y 1212. Consumer deadline 1204 and budget requirements 1206 appear as horizontal and vertical lines. Provider combinations appear in the chart as a "supply curve" 1208:

As illustrated in FIG. 12:
  The area below the curve represents cost/time pairings no provider will supply 1214.
  The area above the curve represents cost/time pairings that some combination of providers will supply 1216.
  The shaded area represents suppliers that meet customer demand 1218.

One should appreciate in light of the present disclosure that this simplified view applies to an abstract slice of the market, at a fixed job size. In some examples, other models can be configured to partition and price jobs based on at least one more dimension for job size. Additional variables can be implemented to more accurately map supply and demand: including for example, security, management services, and/or available applications, among other options. When job size is unknown, the money and time axes shown in FIG. 12 become rate dimensions relative to cycles (cycles/$, cycles/time).

The system can provide value by mapping specific consumer job demand to available provider supply. In some embodiments, the system can be configured to extract revenue from consumer and provider commissions and from a variety of bulk pricing deals where resources are acquired up front from providers at a fixed cost and resold for a higher price. Dashed line 1220 illustrates an example costs incurred by operation and management of the clearing system. Further line 1220 can be calculated to cover operational cost and a profit margin for the clearing system.

Example Provider Requirements

According to one embodiment, the system is configured to access cloud compute providers to obtain real-time pricing information. One example of provider rates and pricing strategy includes Amazon's spot instance pricing service. Integrating with cloud providers may require that they support some programmatic access to price and available capacity information. In one setting, pricing APIs (Application Protocol Interfaces) are integrated into common cloud infrastructure software packages to incorporate job fulfillment into large chunks of the cloud computing market. In some examples, pricing APIs can be integrated into common cloud infrastructure software packages by building standardized APIs for the common cloud platform packages according to the present disclosure. In other examples, the clearing system can be configured to query cloud compute providers prior to job completion, in conjunction with receiving a job request, and/or prior to determining an optimal distribution of job partitions that meet user constraints as some examples.

Figure 13:
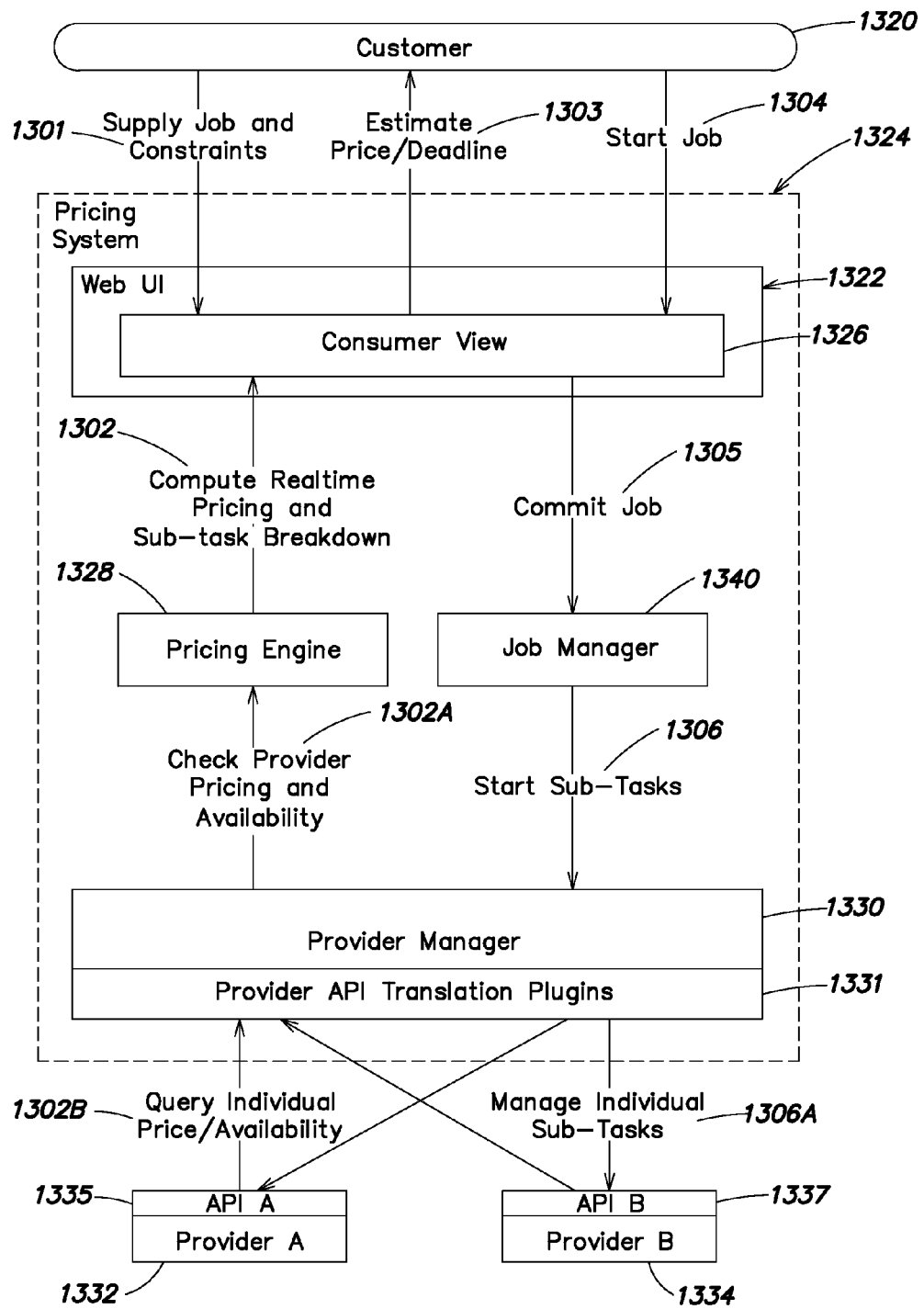
FIG. 13 is block diagram of example component architecture and communication flow, according to aspects of the invention.

FIG. 13 illustrates an example component architecture and communication flow. There are four high-level components in the illustrated example system. A customer 1320 interacts with a cloud compute market places. The customer can access a user interface over the web made available by a pricing system 1324. The pricing system generates and provides a consumer view 1326 to the customer through the user interface 1322. The user interface is configured to permit the customer to supply a compute job and any known or desired constraints 1301 for job completion. A pricing engine 1328 is configured to compute real-time pricing and sub-task breakdown at 1302. The pricing engine makes the determination of pricing and availability based on real-time data received from compute providers connected to the pricing system 1324. A provider manager 1330 can be configured to interact with compute providers, controlling registration of providers, maintaining real-time pricing and availability information, as well as tracking other information, including execution format, confidence level for task completion, etc. Pricing engine 1328 can access provider pricing and availability at 1302A. A request for pricing and availability can trigger provider manager to query 1302B individual providers to determine price/availability. Provider manager 1330 can include provider API translation 1331 configured to manage communication channels with compute providers, e.g., 1332 and 1334. Each provider can be associated with its own API, e.g., 1335 and 1337 having its own execution format and/or communication protocols.

At 1303 an estimate of price and/or deadline for a submitted task is provider to the customer in the customer view 1326. If the customer wishes the compute task to be executed the customer can agree to the price and/or deadline and the job is committed for execution at 1305. A job manager 1340 is configured to manage job information, distributing sub-tasks, and starting sub-tasks 1306 at the assigned compute providers through interaction with the provider manager 1330. The provider API translation plugin can manage individual sub-tasks 1306A, and can provide translation for any sub-task so that the compute providers 1332 and 1334 receive each sub-task in a compatible execution format.

One or more of the following high level components are present in various embodiments of the system. The high level components can be configured to provide one or more of the elements described:

Provider Backends:
interfaces with cloud provider APIs, provides "normalized" pricing and demand information
converts between consumer's work format (e.g., a Hadoop MapReduce code/data bundle) and cloud providers required format (e.g., xen VM image running Hadoop).
modular configuration can allow for new formats and cloud provider APIs.
configured to permit third-parties to provide their own (open) translation logic.

job Backend:
configured to manage job information

Pricing Engine:
configured to aggregate and manage demand and availability information for each cloud provider
Optionally performs operations in real and/or near real time
given job constraints, configured to calculate satisfactory task breakdown across providers Web UI:
configured to present a web-based user interface
allows consumers to submit, monitor, and control their work
allows system support personnel to perform maintenance tasks
allows providers to monitor and manage their participation in the marketplace According to some aspects, job pricing models can be configured to assume that the compute jobs submitted to it are partitionable, or parallelizable. For example, a job submitted as a VM image is intended to have multiple instances running in parallel and the system can be configured to coordinate those instances.

Web UI View Examples

Figure 14:
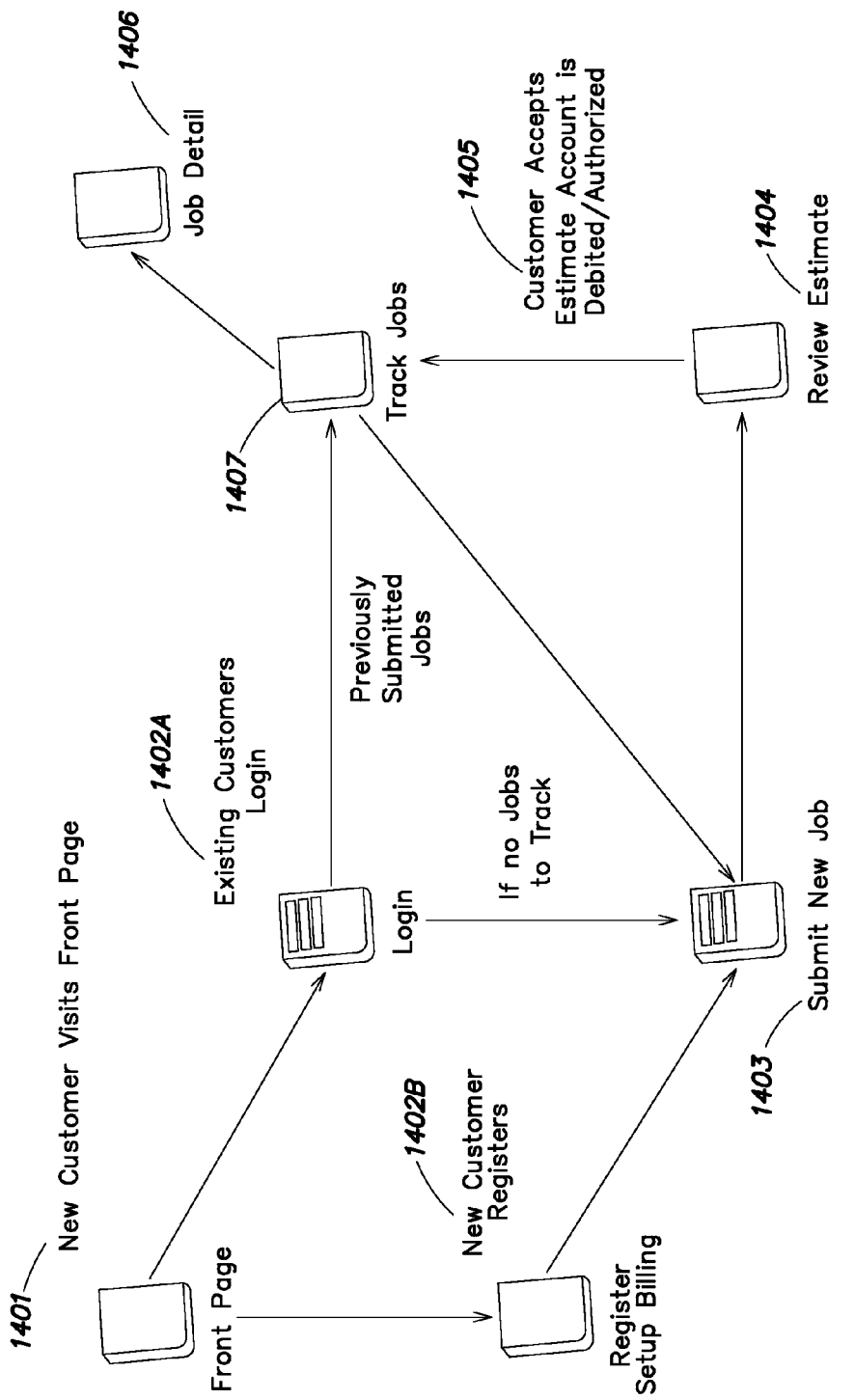
FIG. 14 illustrates an example flow between displayed views, according to aspects of the invention.

Illustrated below are 7 example views including: Front Page; Login; Register and Setup Billing; Submit New job; Review job Estimate; Track jobs; and job Detail/Management view. FIG. 14 illustrates an example flow between the 7 examples views. At 1401 a new customer visits a front page for a cloud compute marketplace. At 1402A existing customers can log in. Alternatively, new customers can register for the cloud compute marketplace at 1402B. Previously submitted jobs can be tracked at 1407. If no previously submitted jobs exist, or if a new job is desired a new job can be submitted at 1403. The cloud compute marketplace can be configured to return an estimate in time and cost for the submitted job for customer review at 1404. If the customer accepts the estimate payment can be process and/or authorized at 1405 and the new job's execution can be viewed like any other previously submitted job at 1407. Each job can be viewed in greater detail at 1406, including for example, status of individual sub-tasks, estimated completion time, confidence level, etc.

These example views and the logic to produce them are configured to be served by a "UI Controller" component implemented using a popular web-ui framework. Example frameworks include Ruby on Rails or Django. According to one embodiment, the job Backend and Provider Backend serve an external data model.

Figure 15:
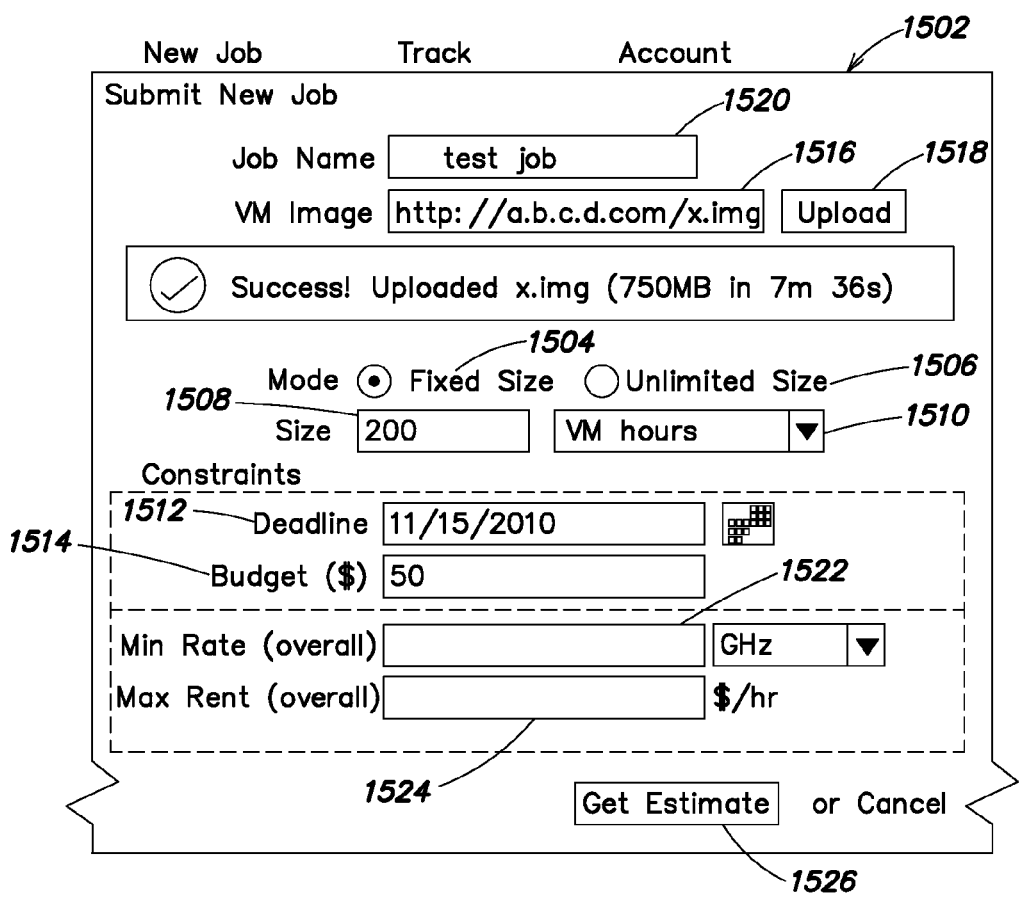
FIG. 15 illustrates an example user interface, according to aspects of the invention.

FIG. 15 illustrates an example view provided by the user interface, title submit new job at 1502. As illustrated there are two ways to submit a new job—with a fixed size 1504, or with an unlimited size 1506. If the job is a fixed size job, the customer can specify a size 1508 in terms of virtual machine hours to complete 1510. In some settings, the system can determine the size of the job automatically based on analysis of the submitted task. A compute job can be uploaded from a given location specified in the user interface 1516 by executing an upload operation triggered by display 1518. The customer can also specify a name for the given job at 1520. A deadline 1512 for completing the job and/or a budget 1514 can also be specified. For unlimited size jobs, a minimum rate for processing can be specified 1522 and a maximum rent in cost per hour can be established at 1524.

Based on these inputs, the UI Controller will generate a job request object and query the pricing engine with it to retrieve a job estimate object in response to selection of get estimate at 1526. It will then display the review estimate view. The user can review the estimate before the job will start. In some setting, the user must review the estimate before a job will start. If the user has not set up billing, or billing information is invalid (incomplete or expired billing information), an error can be displayed and/or a redirect to a billing setup screen can occur. FIG. 22 illustrates an example user interface displayed in response to an estimate that does not meet specified requirements.

Figure 16:
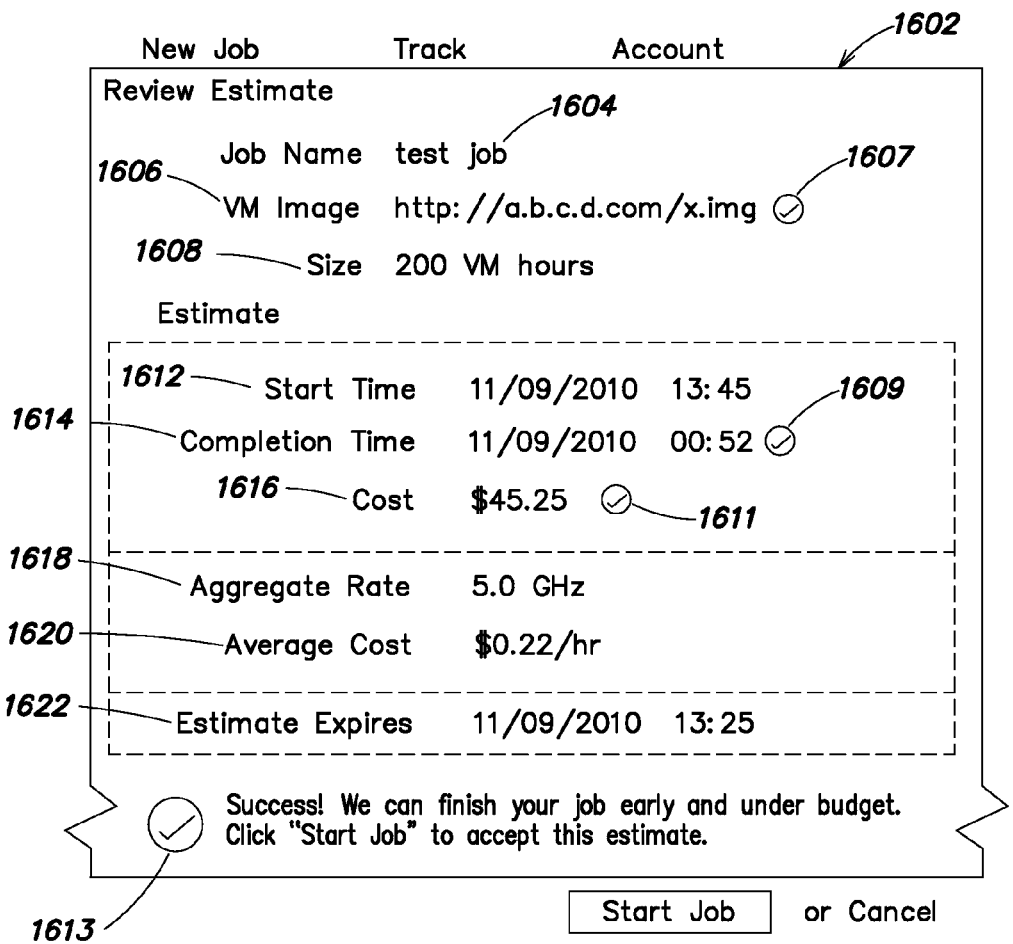
FIG. 16 illustrates an example user interface, according to aspects of the invention.

FIG. 16 illustrates an example view of a review estimate 1602 screen. According to one embodiment, before the job can start, the user must approve an estimate, in the form of a job estimate object. The job estimate object can be specified by job name 1604, size 1608, and indicate a source of the job 1606. If the job estimate indicates that constraints will not be met, the view can be configured to highlight a warning message. The view can also indicate if the job constraints have been met, e.g., 1607, 1609, 1611, and 1613. The review estimate view can be configured to reflect start time 1612, completion time 1614, cost 1616, aggregate rate 1618, average cost 1620, and when the estimate expires 1622. A job estimate can be configured as a persistent object. Further the job estimate can be accessed from multiple user interfaces, for example from the Submit New job view and from the Track jobs view.

If the user approves of the estimate before it expires, the UI Controller will invoke the job backend to start the job based on the job estimate. An estimate may or may not meet the constraints set by the user. According to one embodiment, the user can approve of an unsatisfactory estimate. In some embodiments, approving an estimate and starting a job authorizes the system to charge the user's account for any work that is completed.

Figure 17:
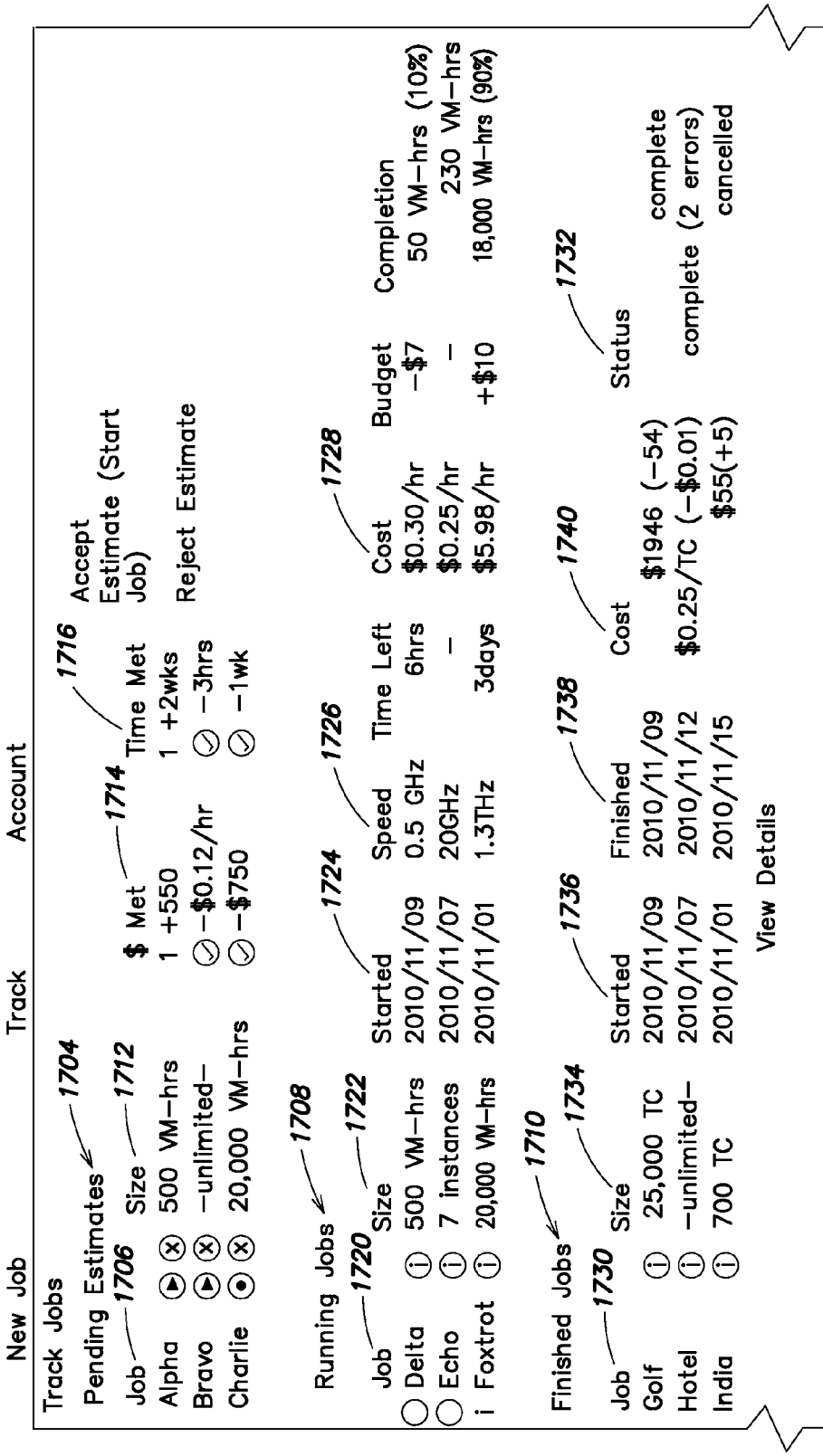
FIG. 17 illustrates an example user interface, according to aspects of the invention.

FIG. 17 illustrates an example view of a track jobs screen with heading track jobs 1702. The Track jobs view permits a returning user to see pending estimates 1704 by job 1706, in-progress jobs 1708, and finished jobs 1710. In some embodiments, the user interface is configured to query the job backend to retrieve job record objects for the current user and provide any information on existing estimates, current execution, and completed jobs.

Figure 18:
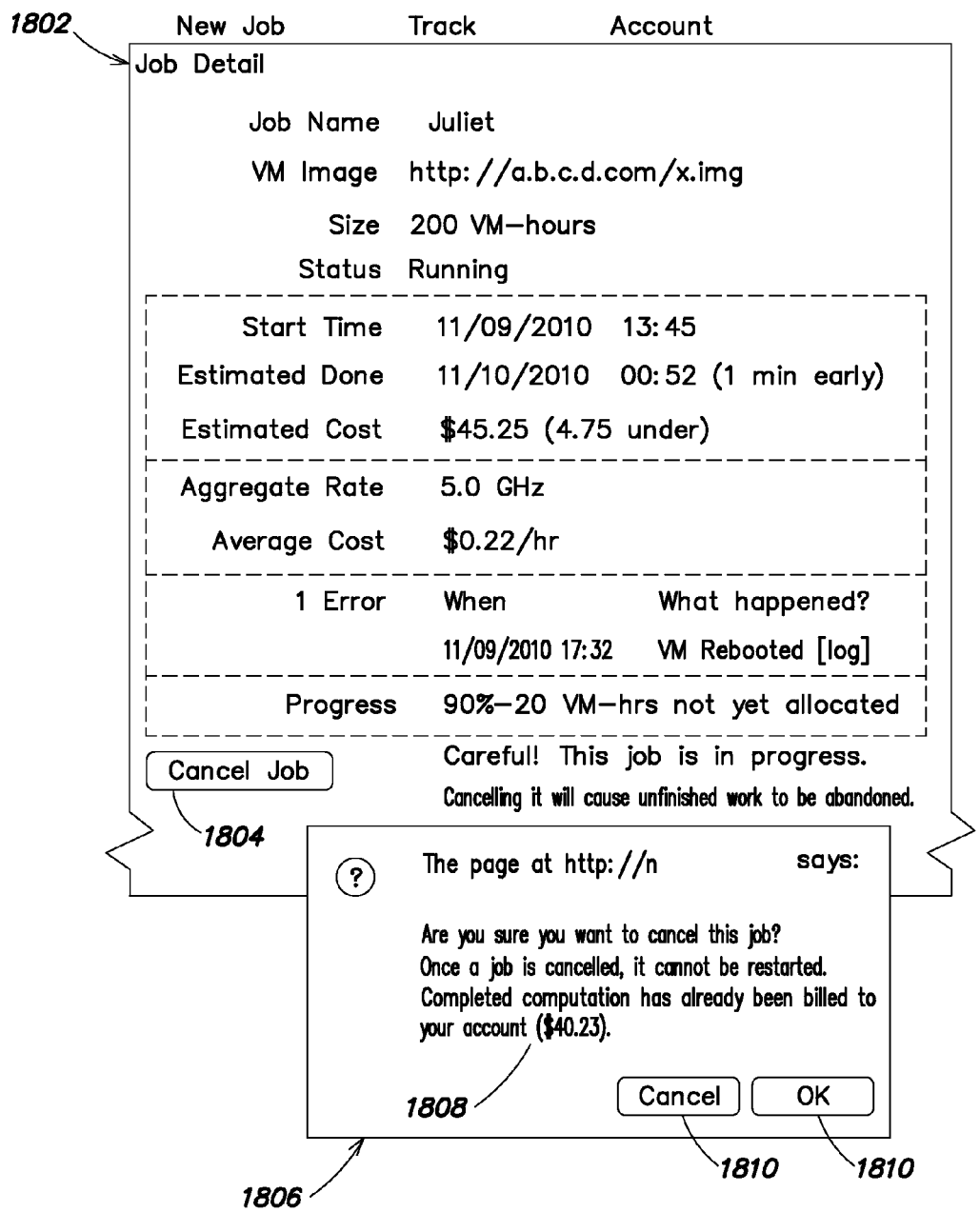
FIG. 18 illustrates an example user interface, according to aspects of the invention.

According to one example, the Track jobs view is configured to:
  display unexpired estimates including any one or more of:
    job name 1706
    job size 1712
    budget/rent satisfied 1714
    a deadline/rate satisfied 1716
    review link
  display in-progress job status, as a table with any one or more of the following columns:
    job name 1720
    status (running, errors, failed, paused, stopped)
    job size 1722
    start time 1724
    elapsed time
    active instances
    units of work completed (instance-time, percentage)
    amount of budget consumed (absolute), indicating over/under
    current estimated completion time
    current processing rate (Hz) 1726
    current average cost/rent ($/hr) 1728
    detail/manage link
  display completed job status, as a table with any one or more of the following columns:
    job name 1730
    status 1732
    job size 1734
    duration
    cost 1740
    start time 1736
    completion time 1738
    detail link FIG. 18 illustrates an example view of a job detail screen. The job Detail view includes header 1802 and displays information in a job record, and can include current status, estimates, and errors interesting to the user (e.g., VM rebooted, VM ran out of disk space, etc.). According to one embodiment, an in-progress job can be canceled outright at 1804. Already-consumed resources (e.g., instance-time) will be debited from the user's account. Resource consumption will be rounded to the greatest-common-denominator unit across all backend providers. This rounding unit can be static. According to one embodiment, compute providers allocate by the hour. Confirmation display 1806 is triggered upon selection of 1804. Confirmation display can be configured to include information on incurred expenses 1808 and require confirmation at 1810 to complete cancellation. According to one embodiment, the system can be configured to maintain a database of user accounts and billing information. The database can include information on pending jobs, existing estimates, cancellations, execution history, speed, price etc.

Pricing Engine

According to one embodiment, the pricing engine is responsible for producing a price and time estimate for an input job, by performing an example process for generating a job estimate. The example process can include the acts of computing a partition of the job into multiple subtasks, assigning each subtask to a backend provider (or set of providers), such that the total time to complete the job and the associated cost are computed to be within customer constraints.

Pricing Model Example

Given a fixed-size F(size, budget, deadline) pricing model, an example pricing algorithm can be presented according to two sets of definitions. First, customer-facing terms, which virtualize provider resources:
processor Capacity (unit: Hz): A physical CPU is measured in terms of the number of cycles it can complete in a second. A better measure of computation speed is "floating point operation rate" (FLOPS), but outside of the high performance computing (HPC) space, the software industry thinks in terms of cycles.
Virtual processor (VP): To allow for consistent measurement across the wide variety of CPUs made available by compute providers, the system can be expressed using a canonical virtual CPU, the VP. One VP is equivalent to a 1 GHz single-threaded x86 core.
Virtual Capacity: The processor capacity in Hz of a single VP—for example 1 GHz.
job Size (unit: cycles or NVP-hrs): The canonical size of a job is measured by the number of virtual processor cycles it takes to complete. One way to arrive at the job size in cycles is to specify the time needed to finish the job on a single network virtual processor (NVP) (e.g., an NVP-hr).
Next, Provider Facing terms:
Availability (Instances): Providers sell compute resources in terms of machine instances. These may be virtual or physical, but they are usually virtual.
Instance Multiplier (VPs): Each provider instance performs computation in some multiple of VPs. For example, a "small" Amazon EC2 single-core instance may be equivalent of 1 VP, while a 4-core Rackspace instance may be equivalent of 3 VPs.
Slice Term (seconds):
  Most providers sell usage of machine instances by the hour. Some providers are considering billing in 10-minute increments.
Instance Time (seconds):
  The amount of time spent running on an actual machine instance. Can be defined in increments of Slice Term.
Provider Price ($/instance-term):
  All major providers currently report prices in $/instance-hr. For example, 1 "Small" Amazon EC2 single-CPU instance costs $0.085/hr. The smallest Rackspace instance is $0.015/hr. To normalize across potentially differing lease-terms, internally provider price will be tracked in terms of the cost of 1 lease term period of 1 instance.

According to one embodiment the system is configured to directly measure CPU speed with a test job, if the provider doesn't report CPU speed. Additionally, test jobs can be employed to test reported information. In another embodiment, the pricing model generates pricing and calculated compliance on the basis that once a CPU is acquired at given rate for a specified time/rate, it can be used until it is released.

Example Algorithm

According to one example, provided are a single provider and 1 instance available: raw-time (seconds)=job-size/(instance-multiplier*VP-capacity) job-time (seconds)=roundup (raw-time, slice) job-cost ($)=job-time*provider-price
As discussed adding more instances of the same capacity and price decreases the duration (wall-clock time), and will leave the cost unchanged: raw-time (seconds)=job-size/(instance-multiplier*VP-capacity) job-time (seconds)=roundup(raw-time, slice-term) job-duration (seconds)=roundup(job-time/ num-instances, slice-term) job-cost ($)=job-time*provider-price Introducing more than one provider-price (either by having more than one provider available, or more than one price offered by a given provider), the job needs to be split into subtasks. For N providers utilized, there must be at least N subtasks. Each subtask is processed as in the multiple-CPU case above:

> job-duration (hrs)=max(subtask-duration for each subtask)job-cost ($)=sum(subtask-time* provider-price for each subtask)

The pricing engine produces a subtask-partition P[subtask]={cycles, provider, num-instances, provider-price}, such that job-cost(P)<customer-budget and now+job-duration(P)<deadline.

With few constraints and a small number of partition elements (e.g., 2 compute providers each with 2 tiers of CPU) there are few enough combinations that a brute-force search of the partition space will generate a pricing estimate in good time. Different pricing mechanism can be employed depending on the constraints being analyzed.

According to one embodiment, the pricing engine's main function is configured to return a job estimate based on a job request produced through the user interface. In one example, a UI Controller accepts and process input information to generate a job request object.

One example function employed includes a compute_estimate(jobrequest):
 The function is configured to returns→jobestimate
 In one example, the job request structure contains the job size and constraints on deadline, budget, hourly-cost and minimum speed. Based on this information, the Pricing Engine can be configured to:
   query each provider for price and availability, including unexpired pending estimates to prevent conflicts
   compute breakdown of subtasks across providers
   build, save, and return a job estimate object, which optionally can include a list of sub task records (reflecting the portioning of the job into discreet tasks).

Another example function can include forget_estimate (jobestimate):
 This function permits an end user to cancel a pending estimate. In one example, the function does nothing if the estimate has expired.

Example Job Backend

According to one embodiment, the job Backend tracks in-progress and completed jobs. The job backend can be configured to manage information needed to interact with running instances, and can track historical information for support and maintenance.

Example Job Format

According to one embodiment, jobs are submitted in the form of a packaged linux virtual machine image. VMWare and Xen are the most common virtualization platforms in use by compute providers. Both of these platforms accept VMs as, for example, bootable disk images, and do so either directly or with minimal packaging. VM instances are configured to have internet access, routed through the system using a software VPN and/or HTTP proxy. According to one example, the system provides users the ability to log in to VM instances.

In some settings, machine images are configured to contain the data needed to perform computation. In one alternative, the machine image includes instruction on where/how to download the data needed to perform the requested computation.

Other Example Functions start_job(jobestimate):
 Returns→job record
 Starts a job based on an estimate.
 Queue the jobEstimate to Submittedjobs.
 Wait for jobEstimate to be processed and return on success or failure.
cancel_job(job record):
 Cancel a running job.
list_running_jobs(User):
 Returns→List of job record objects for in-progress jobs owned by User.
list_finished_jobs(User):
 Returns→List of job record objects for finished jobs owned by User.

According to one aspect, the actual starting a job is not a simple operation. It depends on:
 whether compute providers can still match the approved estimate
 successfully starting subtasks on each provider specified in the estimate
In order to make this job start consistent, in one embodiment, job-starting is configured to be serialized on a submitted jobs queue. A job processor task is configured to read from the submitted jobs queue and do the following for each jobEstimate:
 validate the SubTask partition in the jobEstimate against current pricing availability. Return an error if the estimate cannot be satisfied.
 create a job record object
 for each sub task record in job estimate:
 translate input job to per-provider job format
 communicate with the provider to create an instance record for this SubTask
 record start_time in job record if all (or enough) subtasks started.

Example Provider Backend

The Provider Backend can be configured to offer the pricing engine a consistent interface to query provider pricing and availability, and can be further configured to manage translation interfaces to convert between different job formats and control APIs. As far as possible, pricing, availability and job status will be realtime through the provider backend. Caching can be employed, and typically occurs outside of the provider backend as necessary. The provider backend can be configured to maintain a database of currently registered providers and their VM and API translation implementations. Example functions include:
query_availability(provider):
 Returns→(ttl, meta, price, availability)
translate_vm(provider, in_vm):
 Returns→provider_vm
 Converts from input VM format to provider VM format.
new_instance(provider, provider_vm):
 Returns→instance record
 configured to make a new instance from a VM image. Setup management connections but do not start the instance.
cancel_instance(Instance Record):
 configured to tear-down and stop an active instance, regardless of its status.

Figure 19:
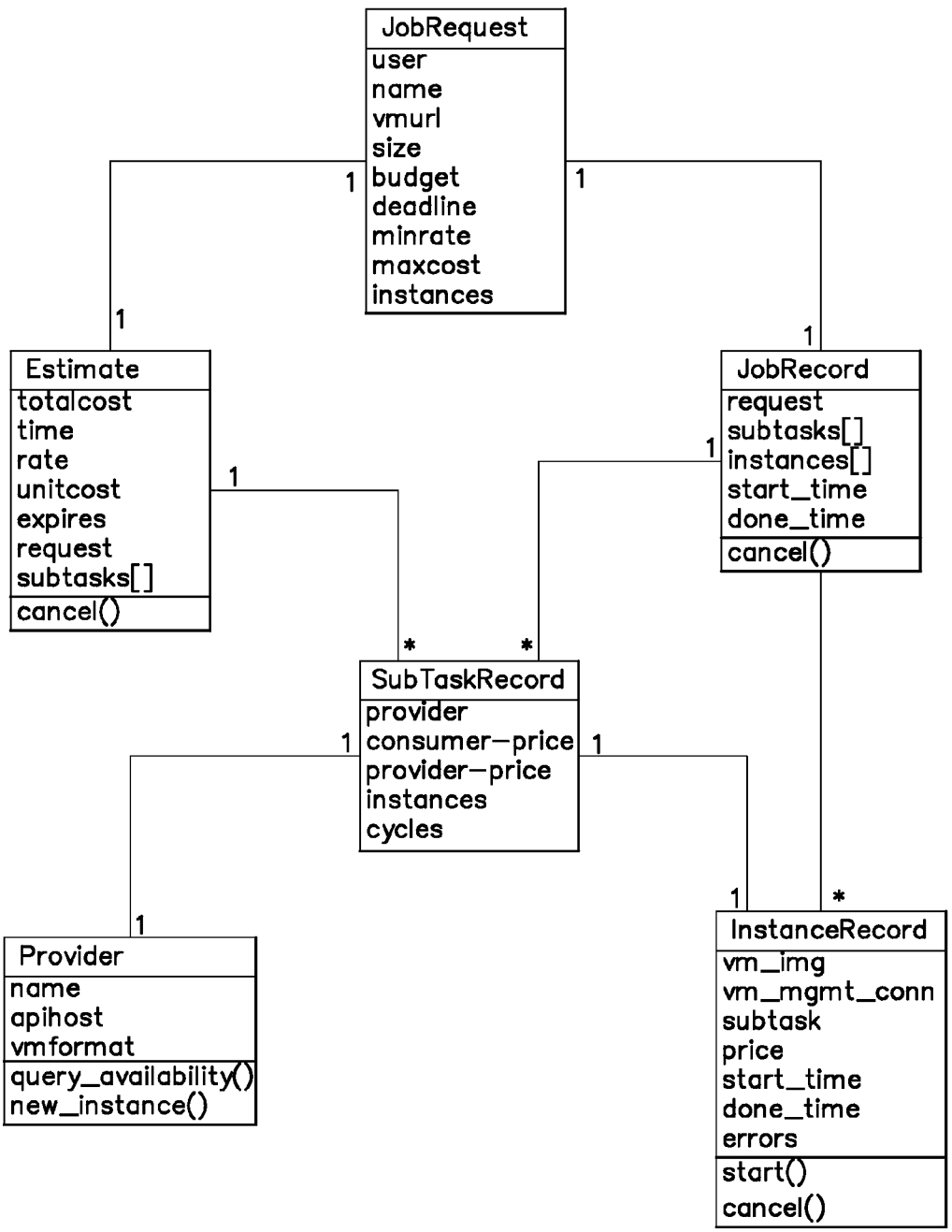
FIG. 19 illustrates an example database model, according to aspects of the invention.

FIG. 19 illustrates an example object model database diagram.

In some settings, the system is further configured to permit the user to "pause" a job if the job has unallocated work (i.e., subtasks that have not been pushed to compute providers). This causes unallocated subtasks to be held until the job is "unpaused". Note that when a job is unpaused, the remaining work needs to be re-estimated and costs can change.

In another implementation, the system can be configured to provide per-VM management granularity. Where the job format allows detailed progress tracking, the system can combine progress of subtasks into a single progress reading. In one example, the system can accept bulk data transfer by delivery of physical media, including for example, HDDs or other mass storage media.

According to one aspect, a computer implemented method for cloud compute pricing is provided. The method comprises acts of receiving over a communication network a user request to complete a computer based task, determining any user defined condition constraining the completion of the task, partitioning, on a computer system, the task into one or more sub-tasks, calculating, on the computer system, assignment of the one or more sub-tasks to one or more compute providers, transmitting, over the communication network, a request to complete each sub-task to a respective provider, and providing access, over the communication network, to the user to the completed task within any user defined condition. According to one embodiment, the method further comprises an act of accepting a completed sub-task from the respective provider.

According to one embodiment, the method further comprises an act of providing access, over the communication network, to the user to a running task. According to one embodiment, the method further comprises an act of translating as necessary the computer based task requested by the user into a format supported by the respective provider. According to one embodiment, the computer based task can be automatically partitioned into one or more sub-tasks. According to one embodiment, the act of calculating includes an act of determining based on published provider compute availability a distribution of the sub-tasks that meets any user defined condition.

According to one embodiment, the act of calculating includes an act of determining based on published provider compute availability a distribution of the sub-tasks that meets at least one of any user defined condition, other desired characteristics of the provider, and any combination thereof. According to one embodiment, the act of determining the distribution includes an act of maximizing a number of providers assigned. According to one embodiment, the act of determining the distribution includes an act of minimizing a number of providers assigned. According to one embodiment, the act of determining the distribution includes an act of minimizing a time to complete the computer based task. According to one embodiment, the act of determining the distribution includes an act of minimizing a cost to complete the computer based task. According to one embodiment, the act of determining the distribution includes an act of matching a plurality of desired characteristics of the provider to desired characteristics of the computer based task.

According to one aspect, a computer implemented method for including private compute resources in a public cloud compute market is provided. The method comprises acts of creating, on a host computer system, a computing environment for performing one or more computer based tasks, limiting the parts of the computer system the environment is configured to use to perform at least one task, registering with a task broker, over a communication network, the availability of the environment to perform tasks, receiving, over the communication network, a request to complete a computer based task, determining whether the task can be performed within the limits of the environment, completing, in the environment, the requested task, providing access, over the communication network, to the requestor to the completed task. According to one embodiment, the method further comprises the use of a virtual machine to create the computing environment. According to one embodiment, the method further comprises an act of deregistering an environment that is no longer available for use. According to one embodiment, the method further comprises an act of destroying an environment.

According to one embodiment, the act of creating an environment includes an act of creating a new network name. According to one embodiment, the act of limiting use of the computer system by the created environment includes an act of limiting storage consumption. According to one embodiment, the act of limiting use includes an act of limiting CPU (processor) consumption. According to one embodiment, the act of limiting use includes an act of limiting memory consumption. According to one embodiment, the act of limiting use includes an act of limiting bandwidth consumption on a communication network. According to one embodiment, the act of limiting use includes an act of keeping data private between environment and host. According to one embodiment, the act of keeping data private includes an act of preventing tasks in the environment from accessing host data. According to one embodiment, the act of keeping data private includes an act of preventing the host from accessing data in the environment. According to one embodiment, the act of registering availability includes an act of describing characteristics of the environment. According to one embodiment, the act of registering availability includes establishing a private communications channel with the task broker.

According to one aspect, a system for providing cloud compute resources is provided. The system comprises a communication component configured to receive a user request to complete a computer based task, a management component configured to determine any user defined condition constraining the completion of the task, a execution component configured to partition the task into one or more sub-tasks, a distribution component configured to assign the one or more sub-tasks to one or more compute providers, wherein the communication component is further configured to transmit a request to complete each sub-task to a respective provider, and provide access to the user to the completed task within any user defined condition.

According to various aspects cloud compute marketplaces can incorporate a number of real-world components and involves a number of actors accessing the various components. In some embodiments, the teachings discussed herein are intended to encompass at least some of the following components and/or actors: an exchange, also referred to as a clearing system, to facilitate purchase, assignment, clearing, transfer and tracking of resources made available in a public or private cloud among a plurality of resource consumers and resource providers; a resource consumer, also referred to as a consumer, whether the consumer is human or a computer system, that submits jobs to the exchange—a typical consumer uses resources offered through the exchange or otherwise to execute jobs; a resource provider (also referred to as a provider) can be an agent that offers resources for use by and sale to consumers—the resources available from a provider may be offered for sale by a human or automatically by a computer system(s) and can be sold directly to consumer, via the exchange, or through another connection; and resource (also referred to as a compute resource) which can be any physical or virtual system, service, or process offered for use, individually or in bulk on the public Internet or in a private computing environment. Resource providers may authorize the exchange to advertise their identities or brands with resources, or may require the exchange to offer their resources with no brand (also referred to as white-label).

In some embodiments, resources include, but are not limited to, usage of a virtual machine for a specified period of time (e.g., one hour), or a specified amount of storage (e.g., a 10 GB volume). A resource can also include a CPU from a particular architecture family such as an Intel x86 compatible CPU, a 64-bit Intel x86 compatible CPU, an ARM compatible CPU, a graphics processing unit (GPU), or a vector processor, or another type of special-purpose processing unit. Other examples of resources include a physical or virtual network subject to a variety of constraints including but not limited to bandwidth and latency constraints. A concrete example might include virtual network supplying 10 Gbps bandwidth at 10 ms latency. Still other examples of resources include firewalls, routers, network address translators, virtual private network endpoints, or an e-mail scanner capable of processing 100 emails and scanning for viruses, or 10 Gbps of load balancer bandwidth. Resources can also be aggregates—that is, a bundle of other resources.

In one embodiment, a consumer can interact with the exchange in terms of a job. In one embodiment, a job can be a networked collection of Agents, Tasks, resources and data which comprises a specification of constraints on attributes of resources and data to be deployed to those resources. In several aspects, constraints are expressed over one or more attributes and encompass hard limits, optimization and improvement targets, and scaling factors. In one example, a job comprises a specification for minimums each of 5 2 GHz compute nodes, 2 3 GHz compute nodes, 100 TB of block storage with 1 Gbps connectivity to each compute node, 2 load balancer sets, 2 firewall rules and 100 GB of Internet bandwidth that must be provisioned for at most $1000/month; and data of 2 virtual machine images and a configuration file.

In another embodiment, the exchange responds to the consumer's request to start a job with an estimate for an instance of the job including the actual cost, the completion time if calculable, excess or shortfall capacity, and attributes of the resources that will be allocated to the job instance. An attribute of a resource can be an advertised, measured or manually-assigned Characteristic. In some examples, an attribute could be CPU speed, geographic location, security certification, allowed input format, API protocol, interoperabilty standards adherence, source of randomness, or service redundancy among other options. In one example, an attribute of a resource can be the format of data that is configured to contain, process, or otherwise interact with a given job request.

In one embodiment, the exchange constructs a schedule that records the allocation of resources to a job instance. The allocation can specify a plurality of providers that each execute a portion of the job instance. A job or job instance can be partitioned into a plurality of sub-tasks so that each subtask can be match to one or more providers. The exchange can be configured to deploy executable components of a job instance or job sub-tasks using a job runner. In one embodiment, the exchange translates a job as supplied by a consumer into the format supported by the scheduled resources. The translated job or job instance is then delivered to the provider for execution. A job instance can produce results and instrumentation information that it reports back to the exchange. In one example, the results can be returned from a plurality of providers to the job runner which deployed the executable components of the job instance.

Figure 1:
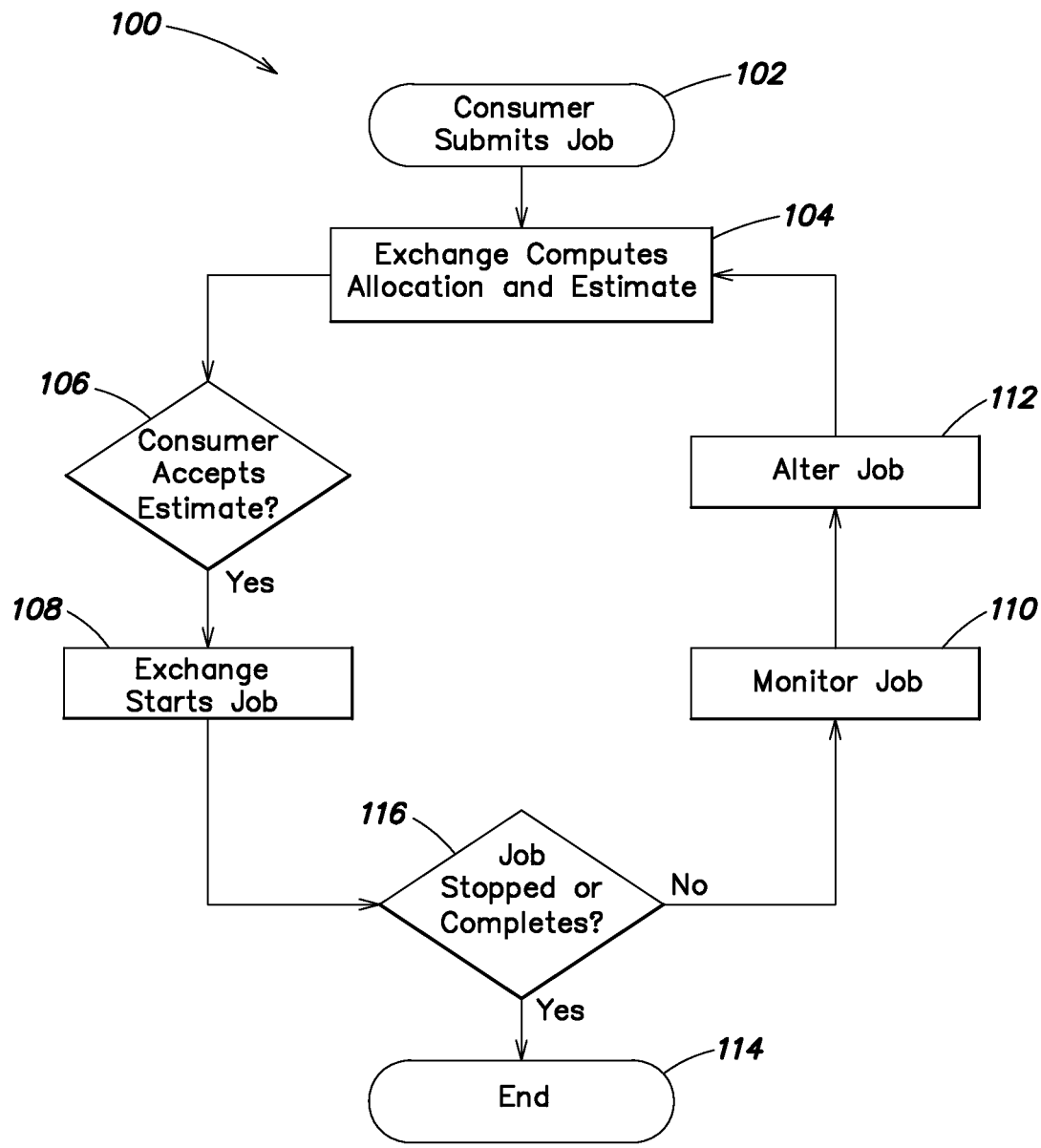
FIG. 1 illustrates an example process for providing consumer interaction with a cloud compute marketplace, according to aspects of the invention.
Figure 2:
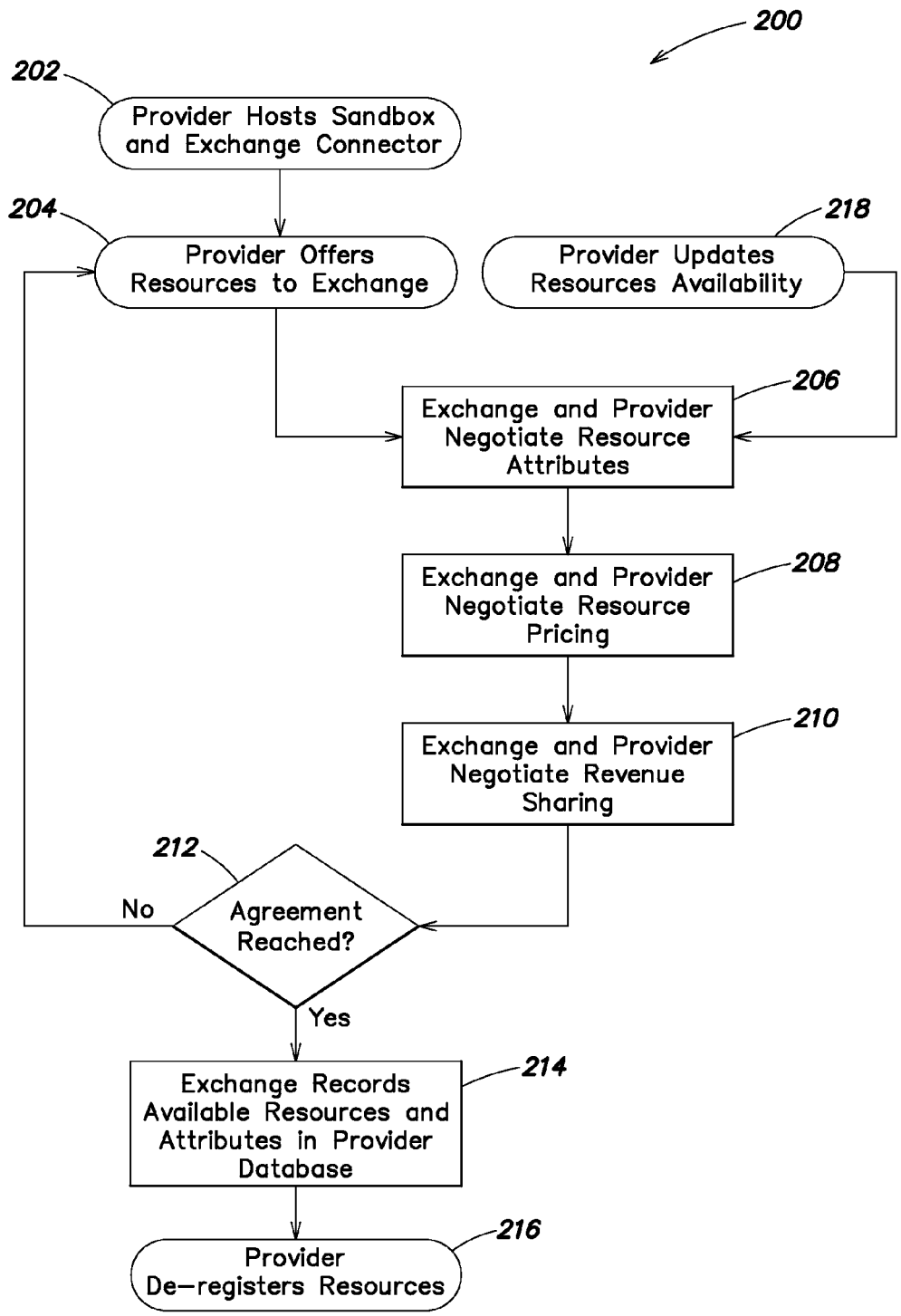
FIG. 2 illustrates an example process for managing resource provider interaction with a cloud compute marketplace, according to aspects of the invention.
Figure 3:
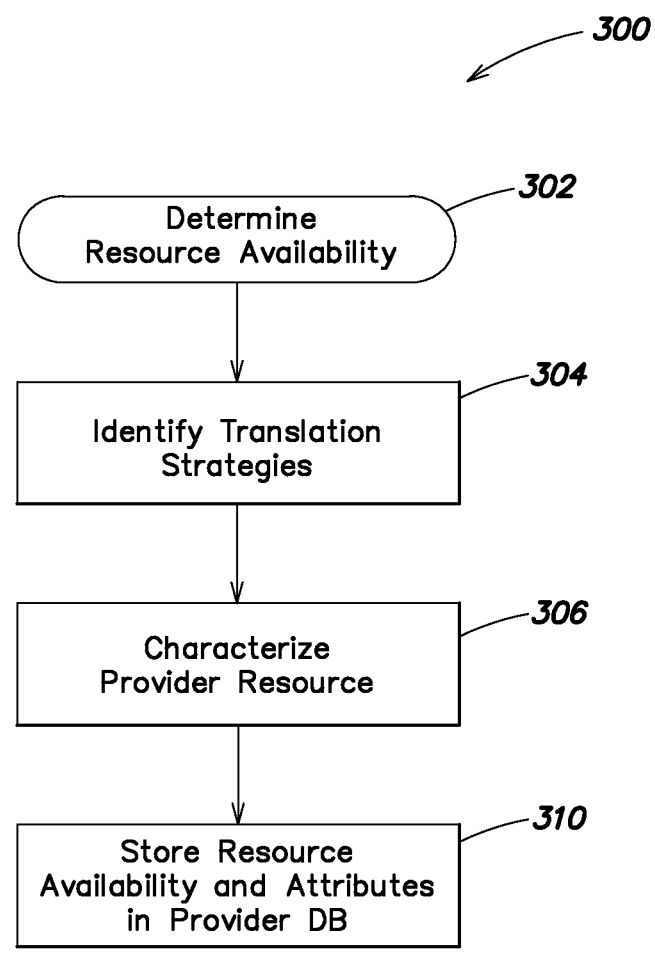
FIG. 3 illustrates an example process for maintaining an exchange, according to aspects of the invention.

FIGS. 1-3 show example processes that can be used separately or together in an overall flow for a cloud compute marketplace or exchange. The exchange is configured to facilitate purchase, assignment, clearing, transfer, and tracking of resources made available as public or private cloud resources. Resources represent the hardware and/or software, real or virtual, for executing compute tasks submitted by consumers to the exchange and can be hosted among a plurality of resource providers connected to the exchange.

Shown in FIG. 1 is an example of a process 100 for providing consumer interaction with a cloud compute marketplace. The consumer presents a job request with constraints to the Exchange and the Exchange responds with an estimate (steps 102-104). The Exchange then allocates Resources to the job, and starts it (steps 106-108). As the job runs, it is monitored against the supplied constraints, and it may be altered by an authorized actor (steps 110-112). The exchange can be configured to partition jobs into a plurality of job instances. In some embodiments, job instances are each allocated resources across available providers. When the job instance completes or it is stopped, the Exchange releases Resources allocated to the job (114-116).

Shown in FIG. 2 is an example process 200 for managing resource provider interaction with a cloud compute marketplace, and specifically an exchange. As shown process 200, a resource provider can offer a public or private cloud resource to an exchange (202-204), can negotiate teens (206-212), and the exchange can discover the resource's attributes (214-218). Shown in FIG. 3, is an example process for maintaining the cloud compute marketplace. As shown in process 300, the exchange can conduct maintenance operations including establishing/refreshing its provider information (302-308) and improving its allocation and analysis processes.

Returning to FIG. 1, process 100 illustrates consumer interaction with a cloud compute marketplace. In some embodiments, the cloud compute marketplace includes a central exchange system or exchange. As shown, at step 102, the consumer submits a job request to the exchange. At 104, the exchange analyzes the job request to determine constraints and objectives for running the job, computes an estimate for executing the job and presents the estimate to the consumer. At 106, the consumer chooses to accept the estimate, optionally if a consumer rejects an estimate process 100 can be re-executed or terminated. At 108, the exchange provisions resources for the job and the job starts. At 110, the exchange, consumer, or other party monitors the job for performance, correctness, or any other measure. At 112, either as a result of monitoring in 110, or otherwise, the job can be altered. In one example, monitoring processes can be running during job execution that identify execution improvements resulting from re-allocation provider resources to the job. In another example, a consumer can access a user interface to alter the running job, change job constraints, or modify any characteristic of the executing job. In one example, process 100 can terminate at 114 if the consumer or another party stops the job before it completes on its own at 116 (yes). Alternatively if the job completes on its own 116 (yes) process 100 can also terminate at 114.

Figure 23:
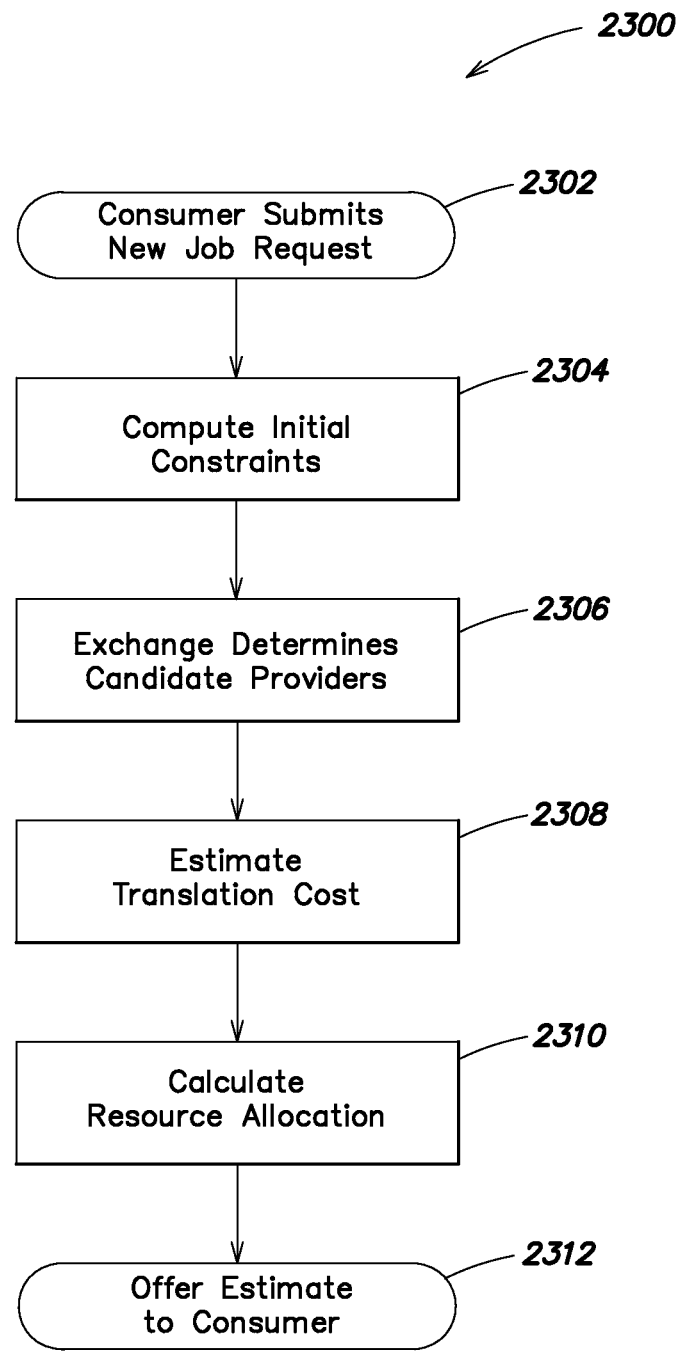
FIG. 23 illustrates an example process for submitting a job request and receiving an estimate for executing the job, according to aspects of the invention.

Shown in FIG. 23 is an exemplary process 2300 for a consumer submitting a job request and receiving an estimate for executing the job. In some embodiments, process 2300 can be executed as part of a larger process, for example, process 2300 can be invoked in steps 102-104 of process 100. As shown, at step 2302, a consumer submits a new job request, the job request include the compute task the clients wishes to be executed as a job. At 2304, the exchange analyzes the job submitted as part of the job request to produce job specification constraints. The job specification constraints can identify whatever condition(s) the consumer wishes to impose on the execution of the job. For example, the consumer may identify a maximum cost that must be met (i.e. not exceed) before execution can begin. In addition or in some examples instead of customer identification of constraints, the job specification constraints can be extrapolated by the exchange from the consumer-provided job request and/or from performance data associated with the job. Job analysis at 2304 can be configured to invoke other processes for analyzing a given job. In one example, process 600 can be executed, in whole or in part, as part of 2304. At 2306, the exchange determines a candidate set $\hat{R}=\{R_1, \ldots, R_n\}$ of provider resources capable of executing the job based on information associated with resource providers. At 2308, the exchange estimates any translation cost of the job. The translation costs for the job can be determined based on an execution format of the submitted job and an execution format required by the resources that are allocated to execute the job. Translation can be required in response to job submission, if the job as submitted does not meet an execution format dictated by the resources that are allocated to execute the job. The exchange is configured to translate the job and/or any job partitions into the formats supported by $\hat{R}$, as necessary. Step 2308 can be configured to execute other processes for estimating translation costs prior and/or as part of any translation. In some examples, process 400, FIG. 4, for translating jobs between provider formats and/or process 500, FIG. 5, for analyzing switching costs associated with moving a sub-task between compute providers can be executed in whole or in part as part of step 2308. At 2310, the exchange calculates an allocation schedule of provider resources R. The allocation schedule matches the submitted job and/or partitions of the submitted job to resources that execute the submitted job. Step 2310 can also include an act of issuing provider reservations to insure that any resource on the allocation schedule is reserved for the execution of the submitted job. In some embodiments, a resource provider can be configured to require reservation of resources in order to guarantee execution at a given price or any other known constraint. At 2312, the estimate is offered to the consumer. In some examples, the consumer can view the estimate in a user interface display on a host computer system. In other examples, a customer can receive notifications through other electronic communication channels containing the details of the estimate.

Figure 24:
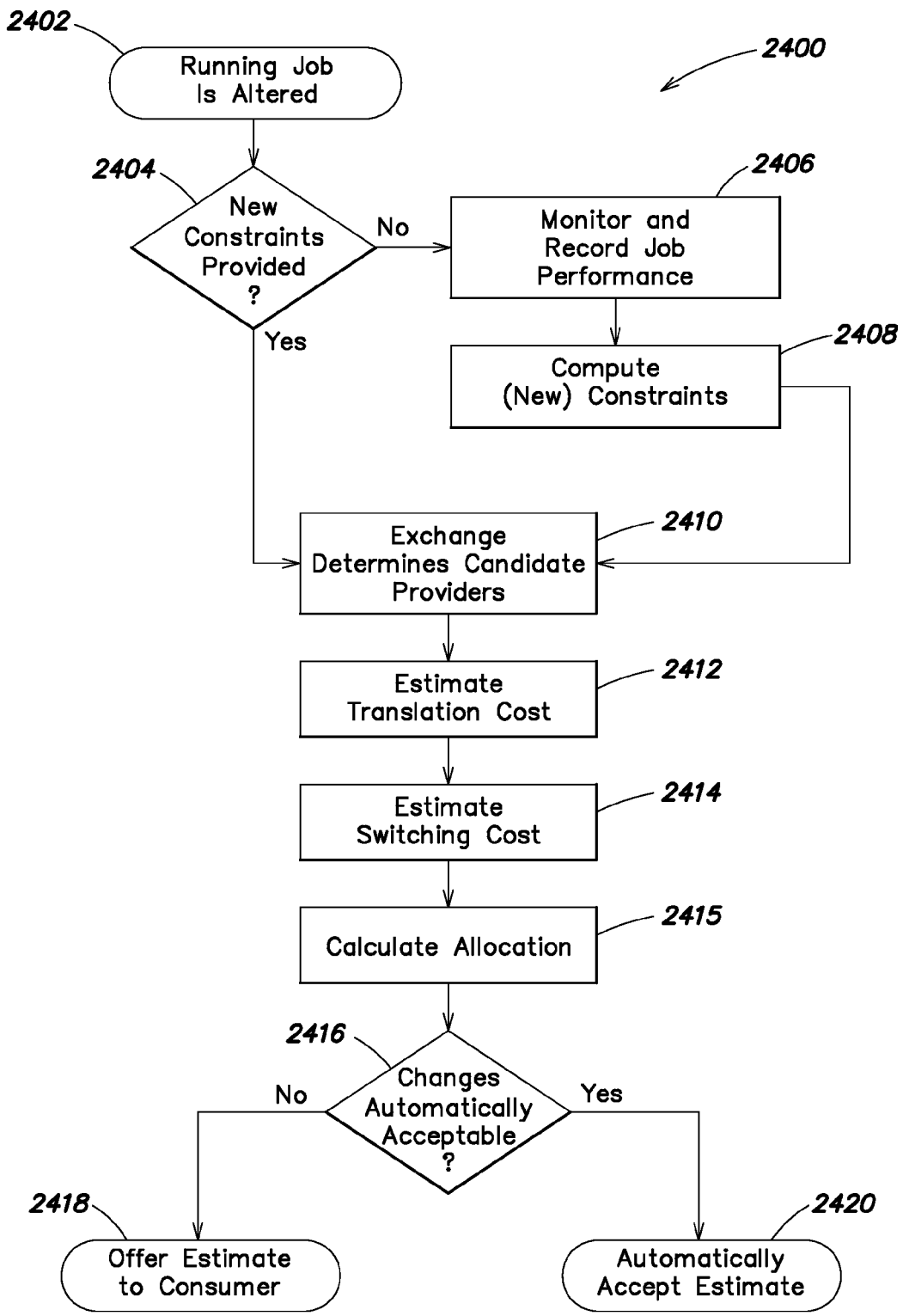
FIG. 24 illustrates an example process for monitoring and/or altering an execution of a job, according to aspects of the invention.

Shown in FIG. 24, is an exemplary process 2400 for monitoring and/or altering an execution of a job allocated through an exchange. According to some embodiments, process 2400 can be invoked as part of other processed executed on an exchange. In one example, process 2400 can be executed, in whole or in part, as part of process 100. In another example, process 2400 can be executed in whole or in part, as part of any of steps 104, 110, and 112 of process 100. Returning to FIG. 24, at step 2402, a running job is altered, for example, by the consumer who submitted it, by the exchange, or by an authorized third party. At 2404, the exchange checks whether the alteration in step 2402 includes new specific constraints sufficient to carry out an allocation. In some examples, constraints are sufficiently defined if the exchange can solve, at least approximately, an optimization function for allocating resources to the job's execution. In some examples, constraints can be identified as sufficiently defined if a minimum set of available constraints are specified. In other examples, constraints can be interpreted from the job itself, as discussed below. If the constraints are not sufficiently defined 2404 (no), at 2406, the exchange records monitoring data about the running job instance. Monitoring data may be collected by the exchange in the course of its operation, by the consumer, by the provider(s) hosting the job instance, or by a third party. At 2408, the exchange accesses any monitoring and/or any information obtained from analyzing the job and computes job constraints that are sufficiently defined to perform a job allocation. At 2410, the exchange determines candidate providers based on the determination of the job allocation. In some examples, step 2410 can be executed as discussed in step 2306, FIG. 23. Returning to FIG. 24, if at 2404, any new constraints provided are sufficient to complete a job allocation, process 2400 can continue at 2410.

Figure 6:
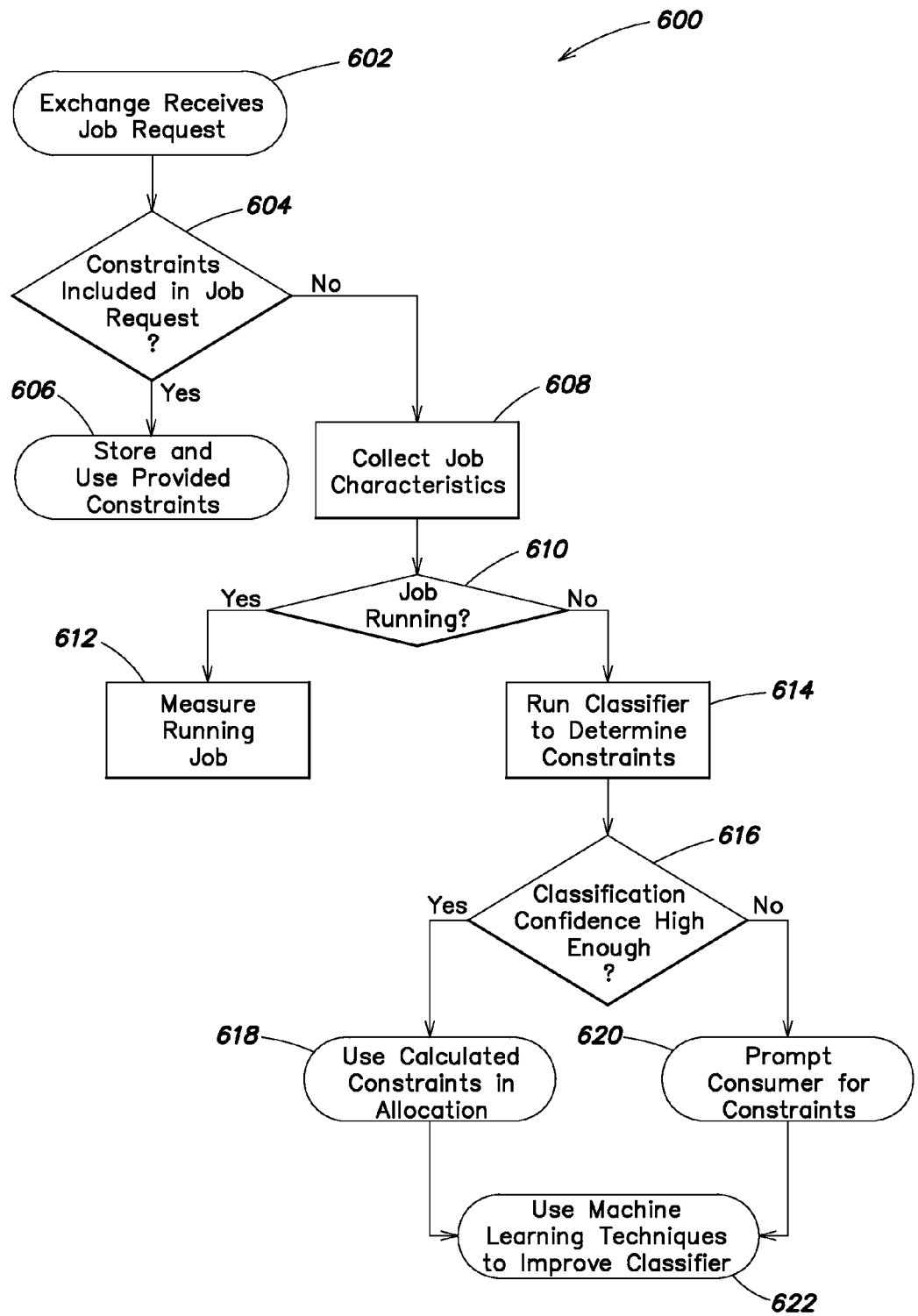
FIG. 6 illustrates an example process for analyzing a job to produce a job specification, according to aspects of the invention.
Figure 7:
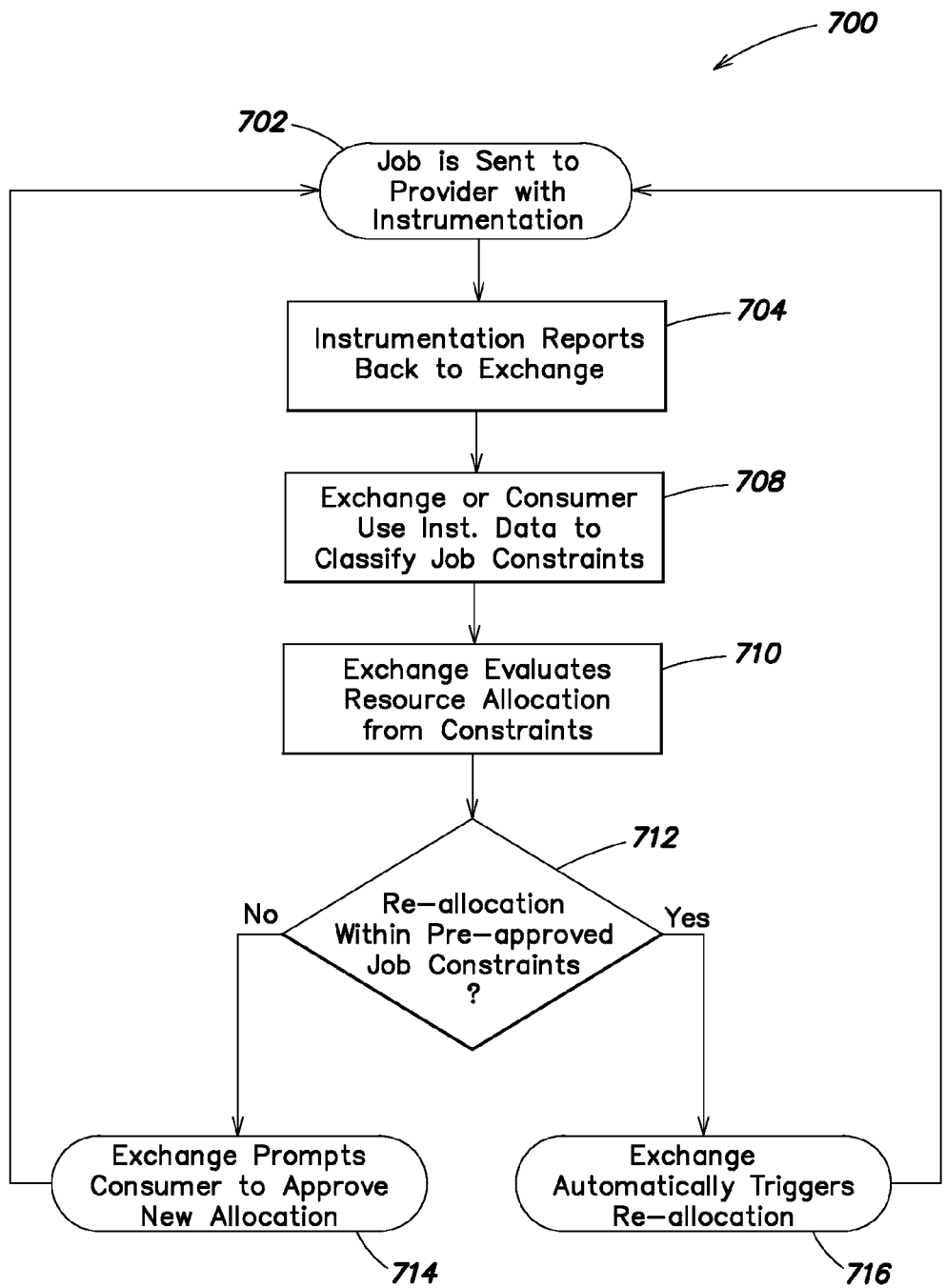
FIG. 7 illustrates an example process for re-allocating resources, according to aspects of the invention.

Steps 2402-2410 can be repetitively executed based on monitoring of an execution of a job that automatically triggers alteration in the running job. For example, FIG. 6 illustrates an example process 600 for analyzing a job to produce a job specification that can be used in conjunction with steps 2402-2410. Additionally, the operations discussed in greater detail with respect to process 600 can be used as part of the execution of steps 2402-2410. Further, shown in FIG. 7 is an example process 700 for re-allocating resources assigned to a job that can trigger step 2402 of process 2400. In some examples, the functions and operation discussed with respect to process 700 can be employed as part of process 2400.

At 2412, the exchange estimates any translation cost. In some examples, 2412 can be executed as described in step 2308 of process 2300. Further step 2412 can be configured to invoke other processes for estimating translation costs. In some examples, process 400, FIG. 4, and process 500, FIG. 5 can be executed in whole or in part as part of step 2412.

At 2414, the exchange estimates the switching cost associated with moving the job, if the job is already running and/or allocated. Step 2414 can be configured to invoke other processes for estimating a switching cost associated with moving a job from one provider to another provider. In some embodiments, step 2414 can executed, in whole or in part, process 500, for determining switching and/or translation costs. At 2415, the exchange calculates an allocation schedule for the job where the job and/or any job sub-task is assigned to a resource. The allocation schedule can be determined from any constraints identified in 2408 or 2404. Further allocation schedule is configured to optimize the allocation based on costs determined from 2410-2414. The allocation can include and/or be used to produces an estimate for execution of the altered job. At 2416, the exchange determines whether the estimate can be automatically applied. The exchange can employ and one or more of the following automatic application conditions:

1. The consumer specified constraints in the original job submission or any altered constraints identified at 2404 or 2408, and the new estimate (2415) continues to meet those constraints.
2. The condition from the previous example is true, and the consumer has supplied a sufficient funding source, for example, where the cost of execution has increased.

In one embodiment, at 2418, the exchange offers the estimate to the consumer if the estimate is not automatically acceptable 2416 (no). At 2420, the exchange automatically accepts the estimate if allowed 2416 (yes).

Figure 25:
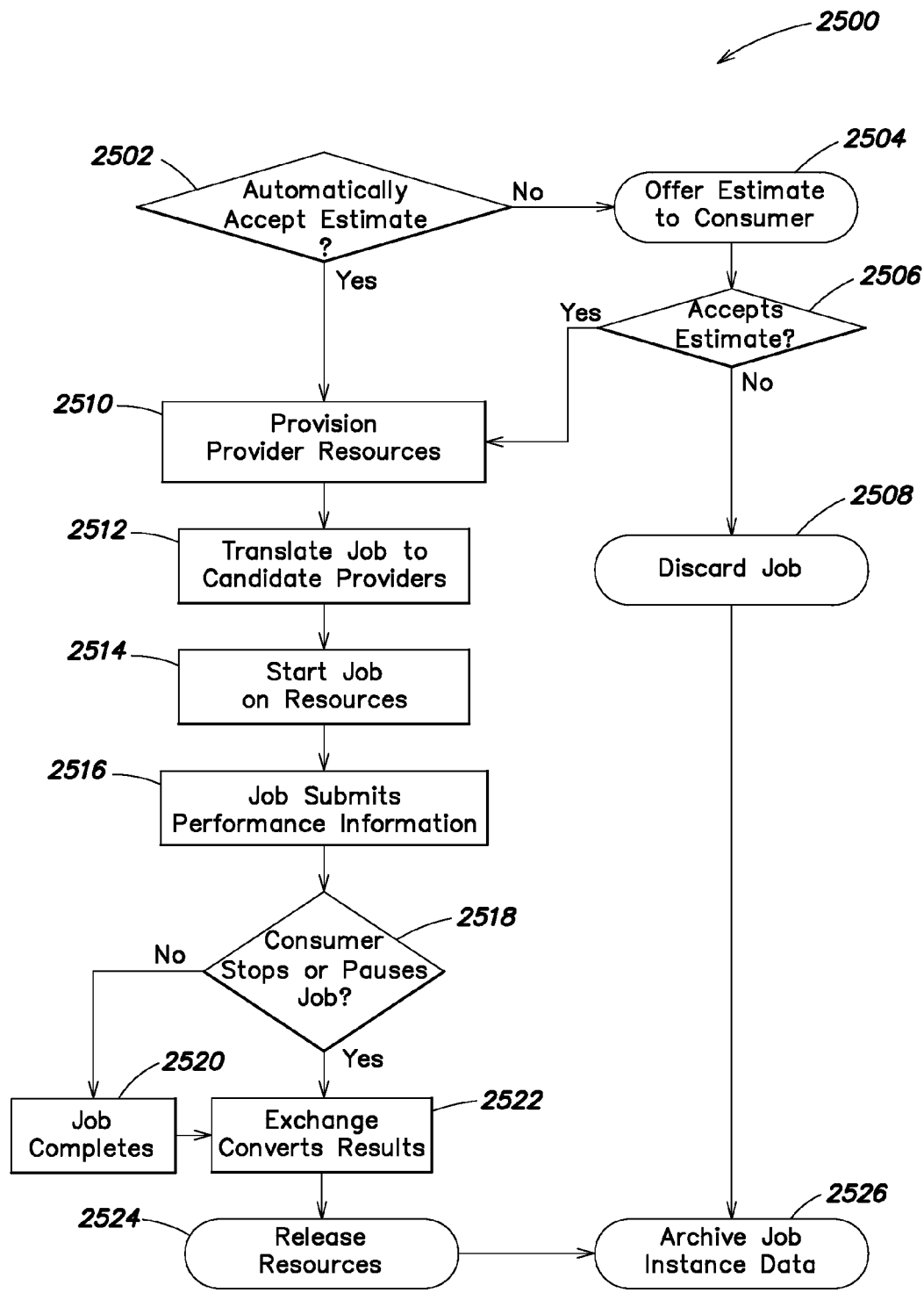
FIG. 25 illustrates an example process for processing an estimate and executing a job, according to aspects of the invention.

Shown in FIG. 25 is an exemplary process 2500 for processing an estimate and executing a job. At 2502, the exchange determines whether it can automatically accept an estimate that has been constructed (e.g., as in 2416 of process 2400). At 2504, the exchange offers the estimate to the consumer if the estimate is not automatically acceptable 2502

(no). At 2506, the consumer chooses whether to accept the estimate. At 2508, the exchange discards the job request if the consumer rejects the estimate 2506 (no). At 2510, the exchange starts committing execution of the estimate by provisioning resources if the estimate is approved 2506 (yes) or 2502 (yes) automatically accepted. In one embodiment, provisioning resources involves firmly assigning, leasing, subleasing, or otherwise acquiring a provider-offered resource for use by any job instance. At 2512, the exchange continues by translating the job into the provisioned resource formats. Additional operations and functions that can be employed as part of or in conjunction with step 2512 are described in greater detail with respect to process 400. At 2514, the exchange starts the job instance on the provisioned resources. At 2516, the running job instance submits its own performance data to the exchange.

In some examples, an allocated resource provider can be configured to monitor job execution and report back to the exchange. In other examples, an allocated job can be delivered for execution with executable monitoring procedures. In one example, executable instrumentation is bundled with a job configured monitor an executing job. The instrumentation is executed in conjunction with the job and performance metrics can be communicated to the exchange by the instrumentation. In some embodiments, the exchange can request information from the instrumentation. Further exemplary detail on submitting job performance data via instrumentation and the actions the exchange or consumer may take is described with respect to process 700. At 2518, the consumer may stop or pause the job instance before it completes on its own. At 2520, if the job instance was not artificially stopped 2518 (no), the job instance completes, either in success or failure, and returns results to the exchange at 2520. At 2522, the exchange optionally converts the results from 2520 into the consumer's requested format. At 2524, after the job stops on its own or it is stopped by the consumer, the exchange releases the resources allocated to the job instance. At 2526, after a job instance completes (2524) or is discarded (2508), the exchange may perform the optional step of archiving information about the job instance.

In one embodiment, the consumer can pause the job instance, e.g., at 2518 (yes). When the consumer resumes the job instance (not shown), the exchange must re-calculate an allocation schedule to restart the job instance, repeating process 2500. If a job instance is paused for too long a period, the exchange can treat the job instance as completed and follow steps 2524-2526.

Safely and Securely Providing Resources to the Exchange

According to various aspects, an operator of a private collection of cloud computers resells excess capacity using a cloud compute marketplace. Resellers of compute capacity may require an adequately trusted, sandboxed environment in order to protect their compute resources. "Sandboxing" means ensuring that a task running on a particular hardware unit cannot interfere with or read information belonging to another unrelated task. Sandboxing promotes trust between the private cloud operator and consumers of the excess capacity. This encourages the cloud operator to monetize excess capacity, and alleviate consumers' worries about the theft of code or other data. The sandboxed environment protects consumers from one another and further protects the private cloud operator's infrastructure, including compute nodes, networks, and storage, from malicious public cloud users who have bought excess capacity and launched jobs into a portion of the private cloud.

In one embodiment, the cloud compute marketplace or exchange includes an implementation of a trusted sandbox for resellers of cloud capacity. Various embodiments may include one of several primitives that enhance the trustworthiness of the system implementing the sandbox, including without limitation security restrictions, monitoring, logging or auditing, non-repudiation, or prioritization based on ownership or importance. One aspect of the sandboxed environment is a subsystem that mediates access to physical hardware. This subsystem may do so using one or more known existing techniques such as virtual machines, virtualized storage, or virtualized networking. Virtualized networking technologies that can be used with a trusted sandbox platform include virtual LAN (VLAN) tagging, virtual private networks (VPNs) to implement network privacy, firewalls, load balancers, and/or ARP spoof protection, among other examples.

In one implementation of a trusted sandbox, a consumer of private cloud capacity is allocated a private set of virtual machines, storage, or virtual network segments. Consumers' jobs are partitioned based on the attributes and/or constraints for the respective job. The partitioned jobs can be made inaccessible to any other consumer regarding of the provider or resource on which the job is executed. A private cloud operator's own jobs can also be subject to the same constraints. In one example, the private cloud operator's own jobs are run in the same manner as those of any other consumer. In embodiments where auditing is employed, the private cloud operator also audits the actions of consumers' jobs. Such an audit trail may be used for computing billing information to be used internally by the private cloud provider. In some settings, the audit trail can be sent to the customer and/or exchange for payment processing. An audit trail also allows the provider to enforce security policies and determine if any violation of the security policy has occurred. The audit trail can be used to assign blame for anomalous or malicious behavior by any jobs. Various embodiments are configured to include an audit trail that records all activity on any system external to the resource performing the computations defined by the jobs.

In some cases, efficient use of cloud resources can include multi-tenancy: allowing jobs from different consumers to execute on the same Resources. An embodiment including multi-tenancy includes partitions of a submitted job, wherein the data and configuration for the job is partitioned into sub-tasks, and each sub-task can be executed as its own job instance. Multi-tenancy may be implemented not only at the hardware level, but also at the software or virtual machine level, which would also be incorporated into an embodiment of the invention. Multi-tenancy need not involve executing jobs from different consumers on the same resource simultaneously. Tearing down and allocating a new virtual machine at the provider level may result in significant expense due to the pricing regime of a cloud provider; the time, storage, network bandwidth, or CPU required; or because individual tasks to be run are small relative to the setup and teardown times of the top-level virtualized environment. In other words, a trusted sandbox might allocate a set of top-level virtual machines from a cloud provider, and then optimize or otherwise improve utilization of any sandbox jobs allocated to those resources by allocating and controlling one or more nested virtual machines within those top-level virtual machines. In one example, a virtual machine resource V is leased from a provider for 1 month, and the exchange has started a 2 week long job A on it. If V were released after A completes, there would be 2 weeks of unused (but paid for) time on V. A more efficient implementation allows a 2 week partition of a second job B to securely run on V for the remaining 2 weeks of lease after job A is done.

In one embodiment, the exchange is configured to secure tasks with existing operating system (OS) security functionality. In some embodiments, allocating tasks on a particular virtual machine is configured to ensure that any task requiring isolation be run by a separate user registered with the OS kernel. Requiring separate users registered with the OS kernel permits mediating access to physical and virtual resources on any hardware being used to execute a job and/or sub-tasks. In another embodiment, an agent can be configured to move sensitive data onto a host from a secure repository. Sensitive data can be stored in files with access granted only to the particular user intended to run the task. The original data or results can be removed to a secure repository and/or destroyed after a task completes.

Another embodiment of the invention secures tasks using nested virtual machines. A host providing compute resources can be configured to execute virtual machine technology, encapsulating each task within its own private virtual machine, to provide security and isolation. In one embodiment, the host itself may run virtual machines for each consumer or for each task. A nested virtual machine can be configured to take advantage of specific features of a host virtual machine in which it is nested. Further, nested virtual machines can be configured to utilize hardware acceleration to improve performance or may rely solely on the emulated hardware.

In another embodiment, a managed runtime system enforces security and isolates tasks. In this embodiment, a host may run user jobs or individual tasks in a managed runtime environment such as a Java Virtual Machine (JVM), Perl, Python, Ruby, or other scripted language interpreter. The managed runtime environment can be configured to provide various aspects of sandboxing as described above.

Another embodiment is configured to provide software fault isolation. Software fault isolation can be configured to enforce security and sandboxing between mutually distrustful user tasks. In one implementation, software fault isolation techniques are executed to rewrite client code before execution. Thus, the system can insure that the client code is safe to execute on any hardware. An example of a known process for software fault isolation is discussed in "Evaluating SFI for a CISC Architecture," by Stephen McCamant and Greg Morrisett, published in 15th USENIX Security Symposium, (Vancouver, BC, Canada), Aug. 2-4, 2006, incorporated herein by reference.

Various embodiments enable private cloud operators to advertise excess capacity via the exchange to consumers of cloud resources using the exchange to satisfy job request, without concern that consumers will compromise the information or tasks of other consumers or the private cloud operator.

Shown in FIG. 2, is an exemplary process 200 for managing provider interaction with an exchange. At step 202, a provider installs sandboxing software provided by the exchange. The sandboxing software partitions the operator's cloud environment into a private partition and a public partition. At 204, the provider publishes the resources to the exchange, choosing to do so with his brand or without a brand (i.e. "white-box"). Identification of a brand includes identifying the source of the compute resource being offered, whereas providing resources without branding permits the supplied resource to be anonymous. Publication of the resource can optionally include definition of any restrictions on execution. Further, the provider may provide information on capacity, availability, and reliability, among other options. At 206, the exchange optionally discovers attributes (e.g., capacity, availability, and reliability) of the offered resources automatically. The exchange can be configured to discover attributes of the offered resources beyond the information supplied by the provider at 204. In some examples, the exchange can be configured to execute benchmarking jobs on the provider's resources to determine any attributes. In some embodiments, the exchange can employ the sandboxing software itself, benchmark programs, monitoring processes, or other techniques to assess the capacity and performance of the resources offered. In some other examples, the exchange can be configured to query publically accessible information about the provider to determine a provider's attributes. At 208, on the basis of these metrics, the exchange and provider agree on a pricing scheme.

In some embodiments, the exchange suggests a pricing scheme to the provider which the provider can accept or not. In some examples, the provider can choose to advertise the pricing scheme through the exchange or not. For instance, the provider may instead choose to shut down a portion of its public partition rather than run it at a loss or low marginal value. In other embodiments, the provider can advertise the capacity to consumer accessing the exchange and allow the market to determine a price. In some examples, a provider can set a reserve price. In yet other embodiments, the provider can advertise the capacity in the exchange at a price set directly by the provider. At step 210, the provider and exchange agree on a commission to compensate the exchange, which may be fixed, tiered, a percentage of gross, or computed according to a specialized formula as agreed by the parties, for any combination of one or more of the following activities:

Providing the sandboxing software to safely partition the providers resources for resale Determining a pricing scheme on the basis of performance, capacity, and market prices seen in the exchange for similar resources Advertising capacity in the exchange Allowing the provider to set a specific price for its resources For any actual transactions between consumers and the provider whether via the exchange or otherwise For any other benefit the provider or exchange realizes from the other In one embodiment, at step 212, both exchange and provider decide whether to agree on the terms established in 206-210. If agreement is not reached 212 (no), the provider may return to step 204. At 214, the exchange records the resource as Available if an agreement is reached 212 (yes), along with its pricing scheme and attributes as evaluated in steps 206-210.

At 216, when the provider wishes to reclaim its public or private resources for its own use or otherwise remove the resources from the exchange, the provider deregisters some or all of its advertised resources with the exchange. The provider can then return any sandboxed private resources it had advertised through the exchange to the common pool of private resources in a private partition.

In some embodiments, a provider may alter resources attributes, pricing, or other terms agreed upon joining the exchange at 218. Process 200 continues from 218 at 206 and the provider and exchange can again reach agreement or not be repeating steps 206-212.

White-Label Reselling of Excess Capacity

In one aspect, the seller of cloud computing resources is permitted to sell excess computing capacity at prices lower than published on a provider site. The provider may wish to do this for many reasons, for example, maintaining a higher published price point associated with a premium product, which could discourage existing clients from obtaining the lower prices, limit revelation of information about provider capacity or usage, or diluting the value of the provider's brand.

In one embodiment, a party with excess cloud computing resources transmits information to the cloud compute market place system describing the available resources of the provider (e.g., CPU, Memory, Bandwidth, capacity, availability, min. price, etc.). This transmission can include information about at least one important characteristic of the resources, for example, origin, price, CPU speed, storage, bandwidth, or system architecture. The system then considers these resources as available when optimally allocating consumers' jobs to resources, including any applicable translation or relocation costs. In some embodiments, the system can withhold information about the at least one important characteristic of the resources from any public disclosure of available resources. The system can also withhold such information from any disclosure to the consumer if the consumer does not require that information to start, run, and receive the completed job.

In another embodiment, providers selling excess capacity who wish to keep their identities secret may request that the system limit allocations of jobs to it to include only jobs with certain characteristics that cannot reveal information about the provider. The cloud compute marketplace system and/or the providers' infrastructure can be configured to enforce software and/or hardware based constraints on running jobs to prevent jobs from communicating information back to the consumer. For example, these jobs might be run in an environment that prohibits outbound network access. In one example, the provider can keep its identity secret. In some examples, the provider information submitted to the exchange indicates it only permits the running of virtual machines with embedded storage and no jobs that require outbound network access.

In one example, the system can offer these resources as "CPU Only" resources to consumers, who would be required to design their jobs such that each job is a virtual machine with one or more of the following characteristics:
  The job's preliminary state includes all data required for the computation
  The job is permitted to use data available from a limited set of data libraries assumed to be accessible to it without general network access
  The job is given access to a source of trustworthy random data
  The job performs any long-term storage or records any intermediate states only on storage embedded in the job's virtual machine definition
  The job is designed to terminate and record any output or errors to the virtual machine definition
  The job is programmed to signal to the system or the provider if and when it terminates, so that its output may be collected and returned to the consumer quickly
  The job is programmed to accept a request to suspend processing early, in which case the job records its intermediate state in its virtual machine definition
  The job is programmed to resume processing from a recorded intermediate state In some implementations, an additional advantage of supporting such jobs, which may be useful in applications such as cryptographic computations or cryptanalysis, data combing, or scientific computing, is that they are more trustworthy to run on providers' infrastructure and require significantly less overhead to support in a trusted sandbox setting, as described in herein.

Shown in FIG. 3, is an exemplary process 300 for maintaining the exchange. At step 302, the exchange queries a known set of providers to determine availability of resources. In some implementations, the exchange is configured to establish real-time resource availability. The set of providers can be established through past or present participation in the exchange or otherwise. In one embodiment, the exchange queries a provider that has not ever offered resources to the exchange in order to include that provider's resources. In one example, the exchange is configured to identify providers through internet searching. The exchange can direct queries to any identified provider. In other examples, non-participating providers can be recommended to the exchange.

In some embodiments, publicly offered resources can be resold without the express consent of a provider. At 304, the exchange identifies the formats supported by the provider's available resources and determines the available translation strategies that can convert incoming jobs to those formats. At 306, the exchange discovers any other attributes of the provider resource in order to characterize the provider resource. For example, the exchange may have obtained attributes for a given resource during a registration process, or as part of execution of process for managing provider interaction with the exchange. In one example, attributes for a given provider can be obtain during execution of process 200 at 206-210. Returning to FIG. 3, at 310 the exchange stores any attributes for the provider and the provider's resources. The attributes can include pricing information, availability, execution format, reliability, among other options. In one embodiment, the exchange can be configured to analyze the stored data to improve job analysis. The exchange can be configured to execute various functions to analyze submitted jobs. In one example, process 600 described in greater detail below, may access the stored data to augment job analysis (e.g., at step 622). Data stored on providers and provider resource can also be used in re-evaluation of executing jobs. In one example, exemplary process 700, FIG. 7 can access attribute information stored in a provider database as part of a process for re-evaluating executing jobs, discussed in greater detail below.

The exchange can also be configured to use the data stored in the provider database to improve job and/or sub-task allocation. In one example, data stored at 310 can be augmented with information derived from other sources. The exchange can be configured to query external sources, external providers, and store additional information used to improve job allocation functions. Job allocation can be improved by continually selecting better allocation algorithms. The exchange can be configured to simulate individual algorithms' results on historic resource and job data which can be stored in a provider database. In one embodiment, the exchange is configured to maintain an inventory of resources purchased or reserved from providers asynchronously from consumer demand in order to hedge against future limited supply.

Optimal Allocation of Cloud Resources

According to one aspect, the cloud marketplace or exchange is configured to allocate cloud resources optimally according to predefined objectives and constraints. Optimal allocation in a cloud compute marketplace can include at a minimum, any execution that meets any consumer specified parameters (e.g., price, timing, confidence level, etc.), any compute provider requirements (size, availability, execution format, etc.) while providing for operational costs of the cloud compute marketplace. Optimal allocation/distribution as used herein describes a solution and not necessarily the best solution to a given job allocation that meets at least the specified minimum requirements. Indeed, various functions and processes discussed herein allow the exchange to improve upon given allocation algorithms, using, for example, historic allocations to train existing algorithms, and to identify algorithms with greater utility. There are known processes for allocations of cloud resources in single cloud platform environments. Single cloud environments operate within a known execution format, allowing optimizations to be performed across all provider resources without concern for an execution format. Indeed conventional works assume a cloud compute platform that can execute any job, regardless of how it is received, as discussed in Garg, S. K. (2010), "Meta scheduling for market-oriented grid and utility computing," published PhD thesis in Engineering—Computer Science and Software Engineering, The University of Melbourne. Another One existing work, by Moβmann, Stöβer, et al, titled "A Combinatorial Exchange for Complex Grid Services", published in Economic Models and Algorithms for Distributed Systems by Birkhäuser Basel 2010, describes various methods to perform cloud resource allocation in a single cloud platform, and these known single platform optimizations can be employed in conjunction with the cloud compute marketplace as discussed herein.

According to various embodiments, multi-platform optimization of resource allocation to cloud resources is discussed. In some embodiments, a centralized system is configured to calculate the value of managing the allocation and is further configured to compensate the operator of the system by incorporating that value into the determination of an optimal distribution. In some embodiments, the centralized system can be the exchange configured to receive requests from compute consumers and to allocate the requests to connected providers. Further embodiments are configured to explicitly calculate and consider the costs of translation or relocation of jobs during the optimization. Some other embodiments include resource utilization improvement processing that incorporates translation costs, and/or relocation costs of jobs/tasks into allocation determinations. Various embodiments can combine translation cost analysis, relocation costs analysis, and management costs analysis in order to determine job allocation. In some examples, dynamic monitoring and optimization disclosed can be used improver single platform cloud compute systems.

According to one embodiment, a cloud compute marketplace can be configured to execute a process in which a central system accepts a set of constraints about one or more compute jobs and determines a set of available resources and one or more characteristics for the resources, and then computes an allocation of jobs across the resources according to a predefined objective function. This allocation may be optimal according to the selected (usually user-defined) objective function, or it may be merely an approximation that the consumer may or may not accept. Optimal again refers to a solution meeting minimum requirements, and not necessarily the best solution to the requirements. Discovering the most optimally efficient allocation in many cases is computationally infeasible, thus the system can be configured to approximate a solution for given problem.

In one embodiment of the invention, the central system can be configured to represent the optimization problem as a linear program (LP) or mixed-integer program (MIP). In this setting, the system translates the constraints about the one or more compute jobs and the information about available resources into numerical values, and then defines an objective function over these values. The optimization of this objective function yields a solution to the problem and thereby a (possibly approximately) optimal allocation of resources to the compute jobs that satisfies the constraints. In this setting, the system can then send this definition of the problem to existing solvers such as ILOG CPLEX, Gurobi, Analytica, or others, and translate the results from the optimizer into an efficient allocation of jobs across resources.

Optimized Autoscaling for Long-Running/Variable-Size Jobs

According to another aspect, when an input job has a fixed size—which can include including readily computable input and output sizes and intermediate resource requirements—various embodiments are configured to compute an allocation of resources that minimizes cost, completion time, or an arbitrary objective function defined on any one or more of cost, completion time, reliability, and availability.

However, when an input job has no readily, a priori computable criteria for job termination, or is explicitly intended to be always running, simple objective functions like min(total cost) or min(completion time) can not be computed once and for all before the job starts. Various embodiments are configured to provide adaptive improvement of cloud resources for jobs whose characteristics are not known before the job is started. Systems can be configured to monitor a job's characteristics while the job is running and improve the allocation of present or future resources to that job and/or sub-tasks according to any desired objective function. In some examples, the objective functions provided determine lowest cost, fastest completion, or a fastest completion given a maximum cost per unit of computation.

Figure 8:
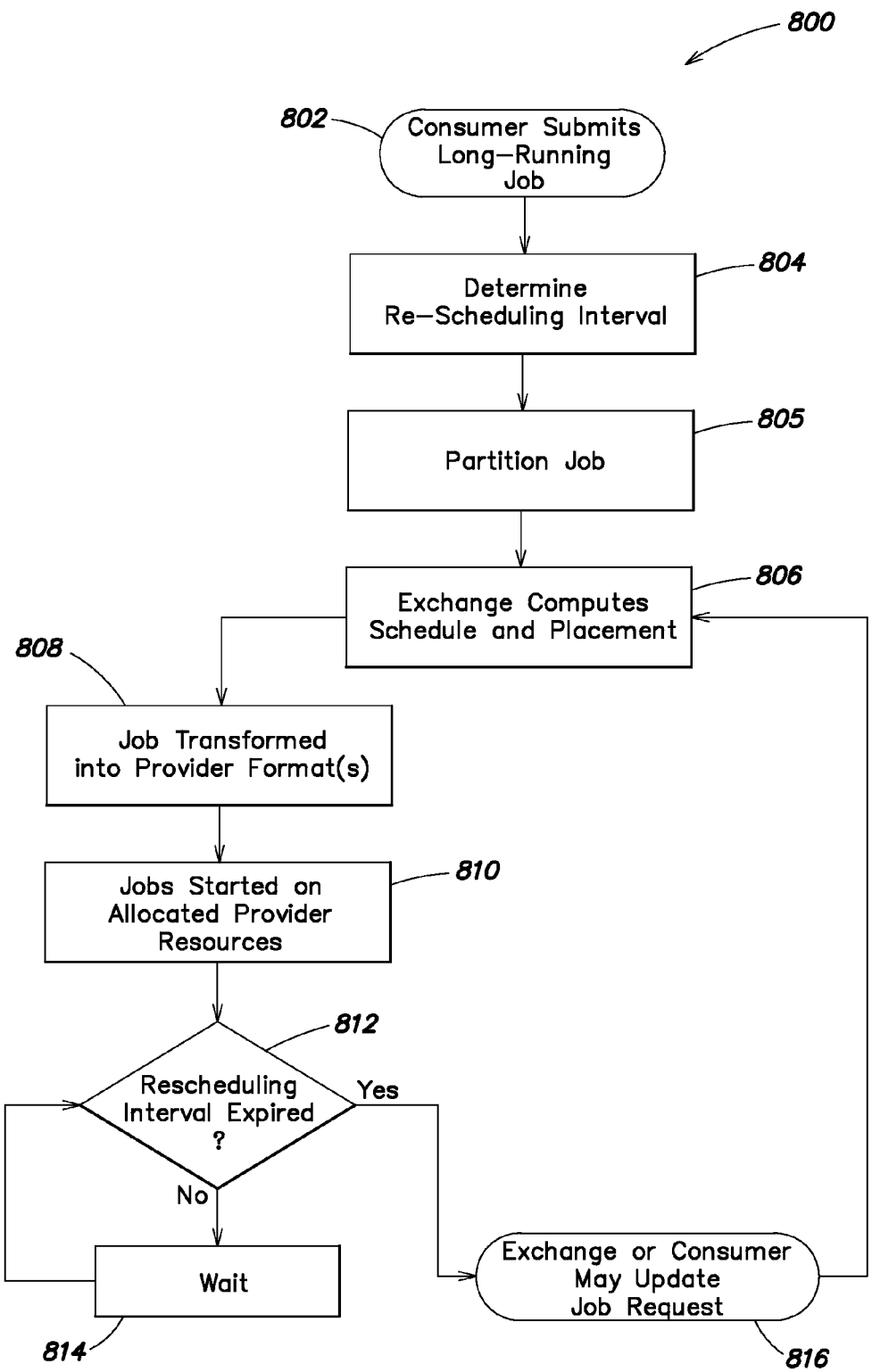
FIG. 8 illustrates an example process for automatically scaling a long-running job, according to aspects of the invention.

Shown in FIG. 8 is an exemplary process 800 for automatically scaling a long-running job. Long running jobs are intended to include jobs that have no stated conclusion, and/or jobs intended to run for an indefinite period. At step 802, a consumer submits a description of a long-running job to the exchange or a provider. Often, the amount of computation in the job will be impossible or difficult to predict: for example, the job might include a farm of web servers, a cluster processing a stream of video clips and photos, or a search operation to recover a lost cryptographic key, as some examples.

In one embodiment, at 804, some combination of the consumer, exchange, and provider agree on a rescheduling interval. In one embodiment, the process for automatically improving resources allocated may be practiced by breaking the long-running job into shorter intervals and the carrying out the improvement for each interval, instead of optimizing for or otherwise improving the solution to a fixed objective function over the entire run at the beginning of the run. In some examples, each interval can also used as a completion point for the long-running job. Each interval can be viewed as a completed task for delivering any computed results to a consumer. The interval can be based on time, and in other examples, the interval can be based on any other portion of the execution of the long-running job. At 805, a system embodying the invention optionally partitions a job into parts according to a partition rule governing how and when a job is managed for reallocation of resources. Example partition rules that can be executed alone or in combination include:

1. Statically partition a job into fixed-length intervals specified by one or more of the consumer, the exchange, or the provider.
2. Dynamically partition by the job each time its computation sends a message to the exchange or provider requesting it to re-analyze or improve its resource usage.
3. Dynamically partition the job by the consumer on the basis of measured load in the application, anticipated or predicted load, or business driven requirements (e.g., customer contracts, historical load, service level agreements, etc.)

4. Dynamically partition by the exchange on the basis of measured or predicted load in the application or observed or predicted price and/or performance of the different providers used to run the job.
5. Dynamically partition by the provider on the basis of measured or predicted load in the application or on the basis of measured or predicted load in the provider's cloud as a whole.
6. Dynamically partition by a combination of consumer, exchange, and provider. For instance, the job interval may be taken to be the shortest proposed by any of the participants.

In some embodiments, competing sets of proposed job re-scheduling intervals (e.g., from each of the consumer, exchange, and provider, the parties to the scheduling process) are resolved by executing an algorithm to compute an agreed-upon re-scheduling interval or in some embodiments a leader is designated whose schedule takes precedence. One example approach includes requiring each party to propose a minimum acceptable and maximum (possibly infinite) acceptable re-scheduling interval and the exchange determines the shortest re-scheduling interval that satisfies these constraints (if any solution exists).

According to one embodiment, a job so partitioned may be reallocated for improved resource usage at the beginning of each interval. The system implementing the exchange protocol may use a hysteresis rule or an analysis of the movement cost (in time, money, etc.) to avoid repeated movement of jobs from one cloud or data center to another.

Shown in process 800 the system(s) running the exchange computes a schedule and a placement for the job at 806, which can be subject to the consumer's objective function. For long-running jobs, an example list of suitable objective functions includes, without limitation:
1. aggregate cost per unit time ($/hr)
2. aggregate throughput (operations/hr)
3. aggregate processing speed (GHz/hr)
4. work latency (turnaround time for a single operation, queue depth)
5. network latency or bandwidth available
6. availability (uptime for the service as a whole)
7. reliability (uptime of individual components or resources in the system)
8. security (reputation or rating of the system)

In some embodiments, measures for determining compliance with the objective function can be computed for at least some resources using provider-advertised characteristics (e.g., $/hr for CPU). Others measures may be computed using provider-advertised characteristics and assumptions or models of the job (e.g., $/hr for storage given the number of I/Os/hr issued by the job). Monitoring processes can be executed to determine the number of I/O requests issues by a given job over a time period. Still others measures can be determined empirically either by benchmarking each provider, or by comparing instances of a job running in different providers. An embodiment of the invention can be configured to define and employ any appropriate objective function depending on the circumstances of the job's execution. The appropriate objective function can be selected by the consumer, selected by the exchange based on consumer constraints, selected by the exchange based on provider constraints, selected by the exchange based on consumer and/or provider constraints, determined based on rule based analysis, among other options.

According to one aspect price optimization includes minimizing/maximizing one or more (or a combination) of these measures in the objective function. One or more measures can also be used among a set of optimization constraints (e.g., minimize aggregate cost, with at least X throughput and a queue depth of at most Q). The optimization algorithm can improve the price rather than find a mathematically optimal/satisfactory solution. That is, an approximation or indeed any improvement may be sufficient in practice in determining an optimal solution.

Process flow 800 continues at step 808 and the system running the exchange transforms the job into a suitable format, if necessary. Transformation of the job is intended to include transformation of any partitions of the job and may include multiple translations of the partitions into a plurality of execution formats. At 810, the system launches the job on the allocated resources after any employed optimization or improvement functions are complete.

According to some embodiments, an intelligent autoscaling system discussed herein is configured to provide better outcomes than some conventional approaches by triggering autoscaling based on real performance indicators (e.g., throughput, database replication lag, historical traffic, transaction latency). Intelligent autoscaling systems can be configure to consider the resources and prices across providers and make more radical changes than some conventional approaches, such as running a job on provider A's small VMs at night and provider B's large VMs during the day, leading to greater efficiency than some existing approaches.

According to another embodiment, an autoscaling system can be configured to permit a consumer to achieve a balanced time/price computation. For example, a system executing process 800 can effect a balanced time/price computation. In one embodiment, the consumer submits a job request (802) to the exchange describing a job that requires at least X hours of CPU time per day but can use up to Y hours per day if the total price is less than a budget B. In this setting, the consumer, exchange, and provider agree on a rescheduling rule (804), for instance every hour, at the request of the job, or some examples, never. Then, the exchange analyzes the request and allocates resources for the job (806). The exchange allocates at least enough resources to guarantee the consumer at least X hours of CPU time over the current day. If the exchange finds additional capacity under the budget B for the day, it automatically allocates those resources to the job, up to a total of Y so long as the addition does not exceed budget B. The job is then transformed into a format suitable for execution on the chosen resources (808) and started on those resources (810). At 812, the exchange checks whether the time to reallocate is reached. At 814, if the re-allocation interval is not reached 812 (no), the exchange waits and returns to 812. At 816, if the re-allocation interval is reached 812 (yes), the consumer or the exchange updates the job request and returns to step 806 to reallocates resources as necessary according to the rules. This analysis permits the exchange system to dynamically re-compute a placement/allocation, and further guarantees at least X hours of CPU time, adding additional resources up to Y hours if the budget B allows for it, continuously meeting the goals of the job's creator.

Feedback-Driven Job Characterization and Specification

A hidden factor in stating an objective function like "min (cost)" is the constraint that the job has to complete, and a requirement that the job execution has to deliver some utility. Efficient resource provisioning is difficult because it often requires experimentation or knowledge to determine or estimate what resources are sufficient to provide utility, and then how changes in resource allocation impact utility. Utility can include a combination of functional objectives: correctness, throughput, latency, completion, security, uptime, etc.

Optimization algorithms, cost or resource-aware scheduling, and placement improvement algorithms, including those discussed herein for calculating resource allocation, typically need a set (or sets) of objectives and a set (or sets) of constraints. Example objectives and constraints can include limits set by a consumer, an exchange, and/or a provider on aggregate cost per unit time ($/hr), aggregate throughput (operations/hr), aggregate processing speed (GHz/hr), work latency (turnaround time for a single operation, queue depth), network latency or bandwidth available, availability (uptime for the service as a whole), reliability (uptime of individual components or resources in the system), security (reputation or rating of the system), total cost, total cost rate, total time, preferred providers, preferred execution format, among other options.

Some conventional job resource optimization and improvement algorithms have limited the job submitter to a fixed objective and have required manual specification of job constraints prior to job execution. One aspect of the invention includes functions to continually improve resource allocation by periodically re-evaluating job constraints for a variety of user-selectable job objectives, is some embodiments, even during job execution. In one example, a job analyzer is configured to re-evaluate job constraints for any specified job objectives during job execution.

According to one example, a job analyzer is executed on the exchange. The job analyzer accepts a job and produces a job specification by applying manual and/or automatic classification mechanisms to job characteristics (shown in FIG. 6 is an example process, 600, for analyzing a job to produce a job specification). In some embodiments, a job analyzer is configured to execute process 600 to obtain classification information. In other embodiments, a job analyzer can be configured to execute process 600 in whole or in part, and in other embodiments invoke other processes disclosed herein. In some other embodiments, the job analyzer can be configured to execute on various or multiple systems connected to a cloud compute marketplace.

In another embodiment, when job constraints or objectives change, the exchange or the consumer may trigger a re-allocation of resources (shown in FIG. 7 is an example process 700 for re-allocating resources assigned to a job). Referring again to FIG. 6, discussed is an execution of example process 600 on an exchange system. Although one should appreciate that process 600 can be executed on any one or more of the computer systems connecting to the exchange and/or participating in the exchange of cloud compute services. As shown, at step 602, the exchange receives a job request. At 604, the exchange executing process 600 determines if the job request already contains enough information to calculate an allocation schedule. If the job request includes a specification of attributes, objectives, and/or constraints sufficient to generate an allocation schedule 604 (yes), at 606, the exchange records the provided constraints, for example, in a job database. Other processes may use information obtained on a given job, for example, to calculate an allocation schedule (e.g., as part of process 100). Step 604 may invoke other processes or portions of other processes to determine if the job constraints specified are sufficient. In one example, 604 can include an operation for calculating a resource allocation using any supplied information. In other embodiments, step 604, can include comparisons against complete job specifications stored on the exchange. Any missing information can be identified and the exchange can be configured to request the information from a consumer, determined it automatically from job analysis, and/or extrapolate the information from prior job execution and any associated specifications.

In one embodiment, the exchange is configured to require a job specification in order to submit a job request. In other embodiments, the exchange can be configured to automatically generate a job specification based on characteristics of the submitted request. In some examples, the exchange can determine a job specification and request approval from the customer for the determined job specification. An example job specification schematically includes a set of q objectives $Q=\{Q_1, \ldots, Q_q\}$ and a set of objective-attribute response functions RF, which define the sensitivity of a job objective to a given attribute. A simple response function RF may be denoted as in the following example equations:

The following example constant response function implies the job's performance towards objective $Q_i$ is independent of the attribute's availability:

$$RF_{Qi}(x_{attr})=k$$

The following example means the job scales linearly with attr's availability:

$$RF_{Qi}(x_{attr})=kx$$

The following example means the job always fails:

$$RF_{Qi}(x_{attr})=0$$

In the following example, an image processing job that needs to load a 100 MB file in one go may have a unit-step response function:

$$RF_{completion}(x_{RAM})=H[100\ mb]$$

The response function may be multi-variate (e.g., jointly dependent on RAM and Storage), dependent on absolute or relative time, or piecewise. Various embodiments can incorporate a plurality of response functions, including linear, multi-variate, logarithmic, exponential, etc. The particular, function employed can be fit or approximated to the supplied objectives and constraints.

Expressing the full space of response functions for each objective is not necessary. One example approximation represents a job specification for a set with and assuming n attributes with 2 vectors for each objective: a limit vector L and a scale vector S:

$$L_{Qi}=[l_{i1}, \ldots, l_{in}]$$

$$S_{Qi}=[s_{i1}, \ldots, s_{in}]$$

Continuing the above example, the limit vector specifies minimum attribute values for the job to deliver utility. Each element is a hard constraint on one of many attributes of an available resource, including without limitation minimum processor cores, minimum RAM, maximum ping latency to an Internet backbone, or minimum bandwidth. According to one embodiment, the scale vector specifies "bottlenecks": a scaling factor for how much each attribute increases the utility delivered by the job.

If any information provided is not sufficient to generate a job specification 604 (no), at 608, the exchange gathers information about job attributes and constraints from whatever information the consumer has provided. At 610, the exchange checks to see whether the job is currently running. At 612, if the job is running 610 (yes), the exchange measures the job according to a list of pre-defined Measures, provided by the exchange, the consumer, the provider, or a third party. The pre-defined measures can include any of the attributes tracked in the provider resource database, objectives defined by the consumer, or other measures, for example, the number of processes running in a Unix virtual machine, the number of storage operations per second, the percentage of SSL-secured transactions vs. total transactions, the number of exceptions generated per minute, or the total database transactions.

Process 600 continues at 614, whether the job was running 610 (yes) and the running job was measured at 612 or if the job was not running 610 (no). In one embodiment, at 614, job a representation of the job's response functions is computed. In some examples, step 614 can call other processes for computing a representation of the job's response function. In some embodiments, a classifier is configured to execute a process for computing a representation of a job's response function. Specific response functions and examples of classifiers that produce them are discussed in greater detail below. The classifier can be executed by the exchange or another system as part of step 614.

Existing classification and scaling techniques use after-the-fact measurement approaches to add resources to a deployed application when it triggers simple rules. For example: (1) when the average CPU load of a group of servers increases past 75%, add another server to the group; (2) when the average CPU load decreases below 45%, remove a server from the group. Such techniques are extended in an embodiment of the invention that uses rule-evaluation, described below.

In one embodiment of the invention, the form of the job analyzer uses a manual process to determine a representation of a job's response function. In this setting, the system operating the exchange asks the consumer a series of questions about minimum requirements, limits, and scaling in order to create objective-attribute response functions. In this setting, measurement processing discuss in step 612 may not be necessary, or measured information may not be used, even if obtained at 612.

In another embodiment of the invention, a job analyzer is configured to track completion and throughput objectives for a given job and/or subtasks. The job analyzer can be configured to automatically compute limit and scale vectors for up to M resource attributes for each objective by evaluating an n-element measurement vector v, of a running job instance and applying linear regressors, one for limit and another for scale. Each regressor is expressed as an N×M "design matrix" of real numbers:

$$DM_{QiL} = [m_1, \ldots, m_n]$$

$$DM_{QiS} = [t_1, \ldots, t_n]$$

$$L_{Qi} = vDM_{QiL}$$

$$S_{Qi} = vDM_{QiS}$$

Continuing the above example, the values of the design matrix are learned using a training procedure that iterates to find best-fit of measured variables against a "training set" of jobs. Typically, a training set will comprise a set of "correct" limit and scale vectors constructed by hand when implementing the invention. Various embodiments can include a stochastic classifier component configured to automatically compute limit and scale vectors for a plurality of resources and their attributes for any defined objective. Some embodiments can be configured to evaluate an n-element measurement vector v, of a running job instance and apply linear regressors as discussed above. In other embodiments, the form of the regressors can vary. In some examples, a job analyzer is configured to execute a classifier component to obtain classifications for a job, in others the job analyzer can incorporate the classifier component directly. Other examples, of classifier components can be configured to operate according to rules based analysis of a job and/or include system initiated user classifications. According to various embodiments, a job analyzer can include any one or more of the classification components.

In another embodiment of the invention, a job analyzer is configured to construct limit and scale vectors using a Rule evaluator to populate vector elements. In this embodiment, a set of Rules are kept, where rules match one or more attributes of a job and result in an assignment of one or more constraints to the job. The Rule set may requirement multiple measurement iterations to reach a conclusion. Rules can be combined with weights, and the combination function coefficients are trained using a similar approach to the design matrix described above. In one example, a Rule set contains 3 conditions to evaluate on a running Unix virtual machine: (1) is an Apache Web Server process running?; (2) is a MySQL database process running?; (3) is the memory used vs. total available RAM greater than P percent?; and a directive to apply the following response functions, expressed as limit and scale vectors:

$$L_{completion} = [M, \ldots, l_n]$$

$$S_{throughput} = [C, \ldots, s_n]$$

representing a minimum of MGB of RAM for the job to complete and that throughput scales by a factor of C with the number of available cores. In this embodiment, rules may comprise more than simple conditions and directives: conditions may capture values they measure for use in directives, multiple directives may be triggered, and conditions may be combined using Boolean, linear or nonlinear weighting functions in order to trigger directives. Rule weightings may be altered subject to machine learning techniques, as described below in step 622.

According to some embodiments, limit and scale vectors are coarse approximations of the full response-function space. In another embodiment of the invention a job analyzer configured to execute a k-class linear classification function to choose one of k implemented response-function families for a given functional objective. The job analyzer can be configured to execute a classifier component that is configured with the k-class linear classification function. In some embodiments, a classifier component can be configured with a plurality of classification functions that identify response-function families. The classifier component can be configured to be called by an executing process for classifying job, various system(s), and/or system components. According to some embodiments, each response-function family is then trained, as discussed above, and applied to an input job.

In one embodiment, at 616, the exchange determines whether, step 614 produced a valid representation of the job's response function. The representation of the response function can also be evaluated to determine if the result has a sufficient confidence level. Various thresholds can be set to determine if confidence level is met. The confidence level associated with particular classification or representation of the job's response function can be determined as part step 614 based on known statistical analysis models. In some examples a classification component can be configured to determine classification information for a job and further be configured to determine a confidence level associated with the classification.

Some classification techniques, especially those that rely on statistical methods are imprecise, and can report an estimated error. In one example, where statistical regression is used, a correlation coefficient indicates a measure of confidence or confidence level for the particular result. In cases where error can be estimated, the exchange maintains error thresholds. At 618, if the result can be used 616 (yes), i.e. the confidence level meets the error threshold, the result is accepted. In some examples, the result is passed on to a resource allocator. A resource allocator can be configured to be executed as a component on a system, and in one example, a component on an exchange. The resource allocator can be configured to generate an allocation schedule which matches a given job and/or sub-tasks making up the job to resources available on the exchange. Further the resource allocator can execute allocation operations as discussed herein using the result that meets the defined error threshold.

At 620, if the result could not be used 616 (no), i.e. the result of 614 does not meet the error threshold, the consumer can be prompted to supply a manual classification. In one embodiment, the exchange may maintain a database or cache of measurements, attributes, and response functions in order to speed up evaluation. The database or cache of measurements, attributes, and response functions can be accessed as part of step 614, and the accessed information can be compared to any information available on the job to be classified. Matching information against known jobs with known classifications can permit the use of the known classifications, rather than determining them. Further, the degree of match between known classification and job information can also be evaluated based on a degree of confidence in the match. In some embodiments, the confidence level in the match is used to determine by the system if known classification information will be used. If the confidence level is too low, the representation of the job's response functions can then be computed as discussed above.

In one embodiment, at 622, the exchange executes machine learning techniques to evaluate representations of any job response function, classification operations, and/or the execution of classification components. The exchange can be configured to improve tunable classifiers, classification algorithms, and stored information linking job and their characteristics to any job response function. Any classification method, system, and/or component, as discussed herein, can be evaluated for accuracy and improved using a database of jobs annotated with measured values and classification results. Some subset of zero or more jobs may have manually defined "true" objective-attribute response functions—provided either by the consumer, the system(s) operating the exchange, or a third party. This subset can be used as a "training set" for improving analyzing any classification for potential improvement. A classification method can be evaluated by running it on the training set, and comparing its outputs to the (assumed) "true" results. An automatic classification method may also be improved by applying a Machine Learning approach. In order to increase the number of "true" annotations, the exchange system can be configured to prompt the consumer to evaluate the performance of a job with respect to one or more objectives. The exchange system may also read objective measures from the consumer, the provider, a running job instance, or a third party. Various embodiments can incorporate the preceding classification methods or any combination thereof.

Shown in FIG. 7 is an exemplary process 700 for improving job allocation using feedback. At 702, a job is sent to a provider with instrumentation that provides measurement against some set of allocation objectives or other metrics of the satisfactory running and/or completion of the job. For example, consider a job that performs statistical analysis on a data set of stock prices using the Hadoop distributed framework. Instrumentation for the job could include functions to monitor the Hadoop slave (worker) latency in processing parts of the distributed work. In another example, of a job that is a web application can be monitored using a cloud-hosted application performance monitoring service that collects throughput and error statistics at a deep level with the application, instrumentation is entirely separate from the job or job data. According to some embodiments, instrumentation includes the executable code and/or functions that are configured to monitor various run-time attributes of a given job. Instrumentation functions can include monitoring functions and communication functions for returning the results of the monitoring. In some examples, reporting can occur in real-time, near real-time, and/or as part of periodic processing.

In one embodiment, at 704, the instrumentation of the job reports performance data back to the exchange. In another embodiment, at 704, the exchange polls the instrumentation for performance data. At 708, the exchange stores performance data, regardless of the manner it is acquired. The stored performance data can be provided to any of the consumer, exchange, or third party. In some embodiments, the performance data can be used by various processes and/or functions discussed herein to classify the job instance's performance. In some examples, the exchange can be configured to maintain records of job performance associated with each provider. The job performance can be categories as satisfactory as part of a function to validate an existing job specification. Step 708 may include any manner of functions configured to provide classification, manual or automatic, including for example, the functions discussed with respect to process 600. At 710, performance data retrieve is used to evaluate current resource allocation. In example, an exchange executing process 700 can be configured to construct a new allocation schedule for the job based on results retrieved from 708 at 710. In some embodiments, step 710 evaluation of resource allocation can include operations for re-allocation which can result in construction of a new allocation schedule. In some examples, construction of a new allocation schedule requires a determination of any switching costs.

In one example, switching costs can be determined as discussed with respect to process 500, below. At 712, exchange checks the current allocation, which can be a new allocation produced in 710, fits within constraints approved by the consumer. At 714, a consumer is presented with a new estimate if the estimate is not within pre-approved constraints 712 (no). At 716, the exchange automatically commits the new estimate if it meets pre-approved constraints 712 (yes).

Optionally, process 700 can be executed continuously by returning to step 702 from either steps 714 or 716. In one example, the process loops back to 702 as the job continues to run or starts to run again under any new allocation and/or constraints.

Embodiments of the invention may continually or periodically re-evaluate the feedback loop described in process 700. In some embodiments, monitoring components can be configured to execute process 700. The monitoring components can be further configured to wait defined periods of time before looping execution of process 700. In other embodiments, a monitoring process can be configured to perform some subset of the steps discussed with respect to process 700 and re-execute those steps on a pre-defined schedule.

In one embodiment, the feedback provided in step 708 may be used as an input to a machine learning training process. In some examples, the machine learning process described with respect to process 600 can be configured to access data generated from process 700 in 708. In various examples, process 600 may include an operation configured to retrieve information generated at 708 in step 622. In another embodiment, the feedback provided in step 708 may be used as an input into an evaluation and improvement process for job Allocation algorithms, as described herein.

Job Translation

According to one aspect, the cloud compute marketplace is configured to accept a wide variety of input job formats and then translate those jobs and/or partitioned sub-tasks into formats operable by the various suppliers of compute resources. To yield more accurate price estimates, various embodiments are configured to include translation costs into the resource allocation model for determining which provider(s) are best suited for executing a particular job.

Translation can be done at various levels of a job on any one or more of:
1. Virtual Machine Image (e.g., EC2→Rackspace, or VMDK→EC2)
2. Provider Service API (e.g., Amazon→Rackspace, or OpenStack→vCloud)
3. Middleware API (e.g., Hadoop→GridEngine, Rails→EC2)
4. PaaS (e.g., Google App Engine→Amazon Elastic Beanstalk)

Some examples of possible translation approaches include without limitation:
1. Physical (e.g., convert from one native format into another: e.g., translate virtual machine images and security policies from Amazon's format into Rackspace's). [The QEMU software package offers one implementation of this operation.]
2. Virtual (e.g., use Eucalyptus to create an EC2-compatible platform within a cluster of Rackspace VMs)
3. Proxy (intercept API traffic through transparent proxies that translate compatible API calls and warn on incompatibilities.) This could be implemented as a network proxy or daemons/kernel modules injected into a VM When translation is successful the job and/or partitioned sub-tasks will typically run without errors related to environment integration. In some examples, the application may still encounter transient errors because of resource outage, or internal errors because of faulty logic, and some embodiments are configured to resolve any translating error conditions as well as handle normal program flow.

In some embodiments, translation is executed by the exchange automatically. In various embodiments, the exchange can be configured to accept user input as part of the translation. Translation models of interaction that can be configured alone or in various combination on any exchange discussed herein include without limitation:
1. Fully automatic: well-specified input formats can be automatically matched and translated into output formats by a central computer system. For example, if the input job is specified as a set of OVF VMs, translation of manifest and machine image to EC2, VMDK, etc. are straightforward. If the application has no further requirements, the translation is complete.
   a. Moreover, a large amount of input detail can be captured by examining an application running in its existing environment, for example, by accessing the VMs, security groups, and volumes of a cluster running in Amazon EC2, and then by examining the API network traffic of the running application.
2. Virtual Assisted (Automatic) which can be execute using any one or more of the following attributes:
   a. A job to be translated is started in a virtualized environment that exactly matches the input environment
   b. Useful when the input environment can be enumerated, e.g., by monitoring a running working application, or an application in a test environment
   c. The virtualization environment can detect what proprietary services are in use, and use that information to drive an automatic physical or proxy translation
3. Proxy Assisted (Manual) which can be execute using any one or more of the following attributes:
   a. Request the user provide a sample (subset) job that the platform can start on the available resource providers after minimal automatic physical translation.
   b. For each provider, start the job on a minimal set of resources
   c. Inject transparent proxies that are configured to catalog and record API interactions for review
   d. Automatically suggest API translations
   e. Provide the user with an interface to choose suggested translations
   f. Provide the user with an interface to define translations for unrecognized API calls
   g. Record which providers this job can be translated to, and by what mechanism
4. Sandbox Assisted (Manual) which can be execute using any one or more of the following attributes:
   a. Request the user provide a sample (subset) job that the platform can start on the available resource providers after minimal automatic physical translation.
   b. Perform as much automatic physical translation as possible, based on the specified input job.
   c. For each provider, start the job on a minimal set of resources
   d. Capture failures, applying knowledge of the image where possible (e.g., capture network traces, common logs, other tracking information)
   e. Provide the user with an interface to analyze failures and choose or rule out translation mechanisms
5. Manual: in an embodiment using manual translation, the user is responsible for furnishing copies of the job that can run in the required format(s).

Different types of translation have different costs associated with them. Automatic or assisted translation can be preferred because it requires no user input, but may lead to more jobs that need to be restarted because of environment integration failures. According to some embodiments, automatic or assisted translation can require more speculative execution, and therefore increased raw resource cost.

One aspect of the invention includes defining a taxonomy to generally characterize providers' resources into Layers (such as "infrastructure", "platform", "service", "application", and "environment") and Types (such as "storage", "compute", "web application", "database"). In one embodiment, the taxonomy is represented in a provider database. One example of storing the taxonomy is as a list of known formats for each provider, Layer, and Type, a list of supported Translation Strategies (drawing from the levels, approaches, and user-interaction models described above) and a mapping from format A to format B that specifies a Translation Strategy to use to convert a job defined in format A to be runnable in format B.

Figure 4:
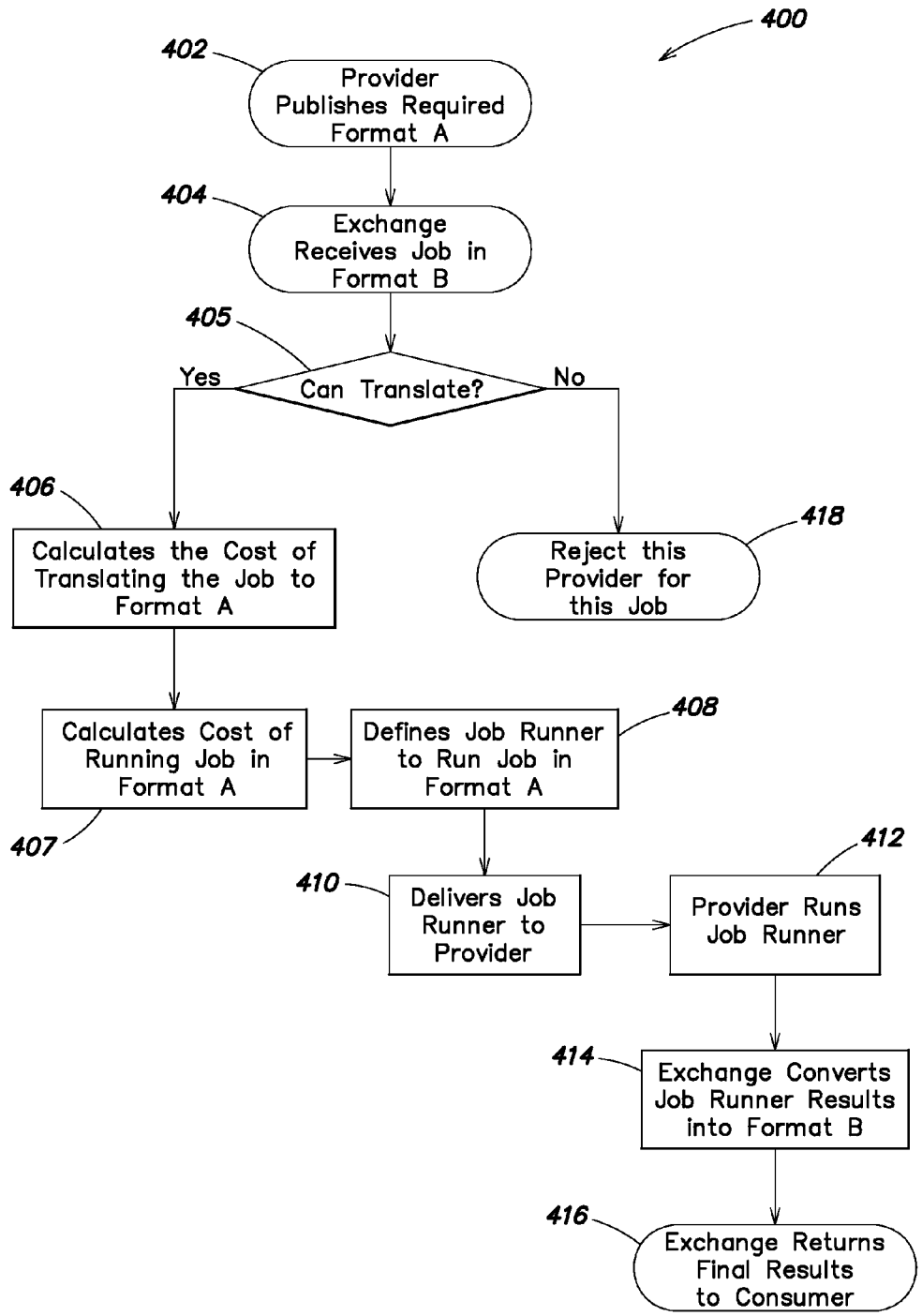
FIG. 4 illustrates an example process for translating jobs between provider formats, according to aspects of the invention.

Shown in FIG. 4 is an exemplary process 400 for translating jobs between provider formats. Various embodiments access a provider database that holds attributes of the provider and the resources it offers to determine information associated with translation.

In one embodiment, at step 402, the provider publishes a requirement for job in format A. Receiving information from a provider regarding execution format of a job may occur as part another process, for example, step 204 of process 200. The provider database can also be manually populated by the exchange and/or an exchange administration entity; further the provider database can be automatically populated by the exchange, for example by running benchmark applications in each provider's environment. An exchange can be configured to execute various processes to automatically and/or manually obtain translation information. In one example, process 200, can obtain translation information at 206.

According to one embodiment, at step 404, the exchange receives a job in format B from the consumer. Format description can include a description of the necessary resources, including specific layers and types required to execute any job on a given resource. At 405, the exchange filters the provider database to determine if any Translation Strategy exists to run a job in format B on the available providers. In one example, assuming providers and resources that only support running Virtual Machines, there is a set of supported input VM formats that the exchange can automatically translate from to obtain executable versions of the job for the allocated resources 405 (yes). If there does not exist a translation strategy for the job format 405 (no) the providers requiring that particular format can be ignored for determining resource allocation for the job at 418.

At 406, the exchange determines the cost of translating from format B into format A. The determined cost of translation can be an estimate of the cost of translation rendered as any one or more of a time necessary to translate, number of cycles, machine hours, etc. The determined cost can also be used in other processes, for example, a determined costs of translation can be used a factor in re-allocating job distribution.

At 407, the exchange determines the cost of running a format B job in format A. In a non-limiting example, given an AB translator that uses a format A virtual machine running natively in a format B host, there is minimal translation cost (since the original job need not be altered) and a run cost function that accounts for virtualization overhead defined by:

$$C_{FmtB}(job_{FmtA}) = \text{Overhead}(job_{FmtA})$$

Embodiments of the invention employing translation can be configured to use a translation system that operates in a way analogous to a database query planner, where the exchange can execute a variety of different strategies for different components of a job. For example, the exchange can execute some strategies that are suitable for the compute resources of a job and other strategies suitable to storage resources.

In one embodiment, at 408, the exchange produces a job runner configured to execute in the format selected in 405-407. At 410, once the exchange has transformed the job from format B to format A, it delivers the resulting job runner in format A to the corresponding provider. At 412, the exchange causes the provider to run the job runner. In one embodiment, the output of the job runner is the result of the computation in the format A used by the provider that was selected to run the job. At 414, the exchange retrieves these results and transforms them back into the format B using the translation function stored in the provider database. In some examples, a result can be generated that is format independent, thus step 414 may be omitted in some examples. At 416, the exchange returns the transformed results in format B to the consumer as the final output of the job.

Pricing Model: Normalized Pricing

Some conventional cloud compute distribution system have addressed some of the problems associated with brokering and providing a clearinghouse in the case where providers are either assumed (or engineered) to all offer the same pricing model. However, even in these systems, for example, where pricing is engineered to be consistent (by requiring providers to implement the same pricing API), the underlying good that is being sold is variable. According to one aspect, it is realized that eliminating these dependencies yields a more efficient cloud compute marketplace.

Different providers offer similar resources for sale, typically with product and pricing models differentiated on a number of factors, including without limitation:
  product types (compute, storage, services, etc.)
  product granularity (are "bundles" offered for sets of resource attributes, or can custom configurations be created?)
  location-dependent pricing
  time-dependent pricing
  demand-dependent pricing (e.g., Amazon's "spot" pricing)
  lease-term (e.g., hourly, monthly, yearly)
  up-front cost (e.g., Amazon's reserved instances)

Some providers offer "packaged" resources where a set of characteristics are rolled up into a single product code (e.g., Amazon's EC2 instance types, or Rackspace's flavors). Other providers offer variable configurations, where the consumer selects a number of virtual cores, total RAM, total local storage, and available bandwidth, location, etc.

Various embodiments eliminate these dependencies and are configured to offer a coherent, unified pricing model for exchanging resources that accounts for differences in the pricing models offered by the sellers of the underlying resources.

Figure 9:
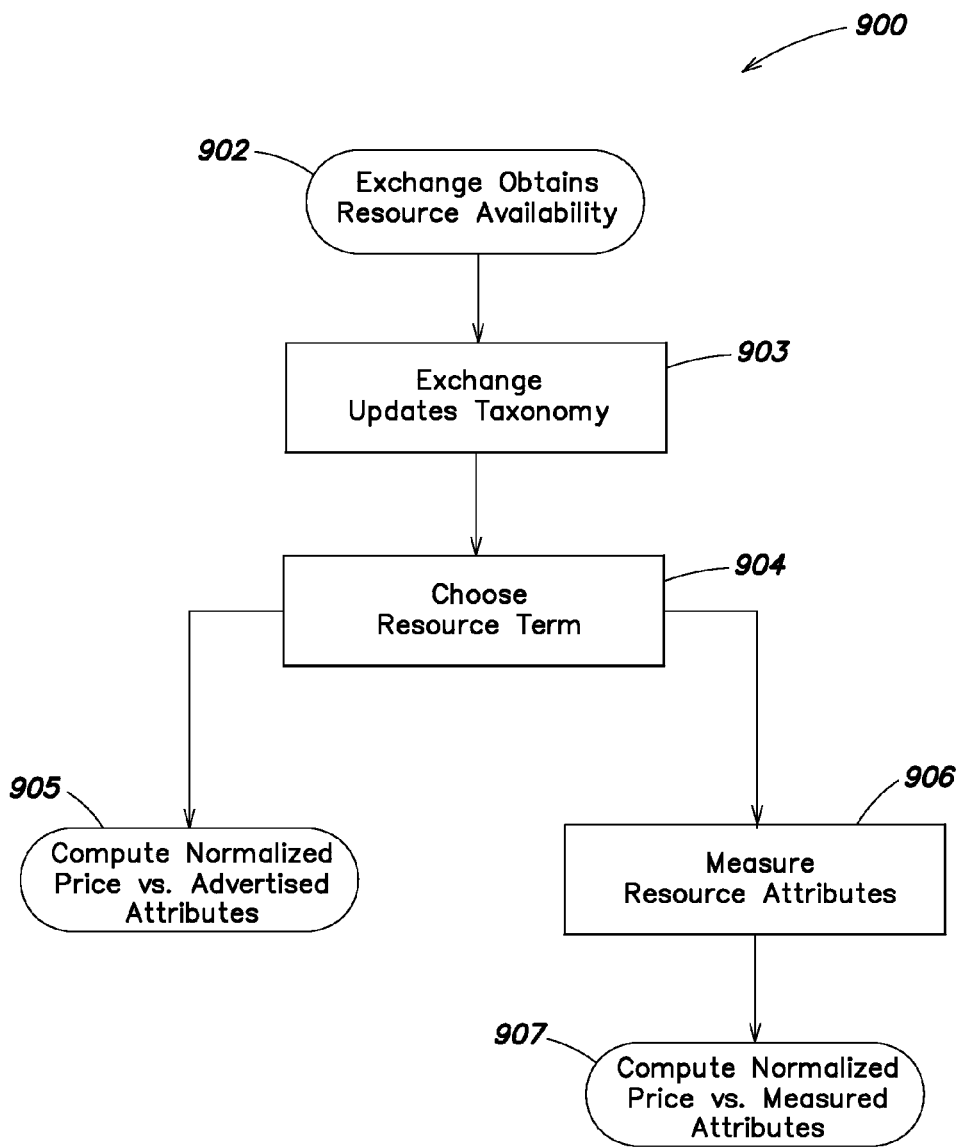
FIG. 9 illustrates an example process for normalizing exchange pricing, according to aspects of the invention.

Show in FIG. 9 is an exemplary process 900 for normalizing exchange pricing across heterogeneous providers. At 902, the exchange obtains information about provider resources and their prices and attributes either when the provider offers the resource to the exchange (e.g., as in process 200 at 214), when the publisher publishes resource availability, and/or the exchange automatically obtains information on the provider. In some embodiments, the exchange can also be configured to obtain information about provider resources when the exchange queries the provider (e.g., as in process 300 during step 302) among other options.

At 903, the exchange characterizes an offered resource using a taxonomy of resource types and layers. An example taxonomy includes layers such as such as "infrastructure", "platform", "service", "application", and "environment" and types (such as "storage", "compute", "web application", "database") by which to characterize a given provider. At 904, the exchange defines a "standard" pricing term (such as fractional hour). The exchange then computes prices normalized against a variety of attributes, or a combination of attributes at 905. Normalized prices capture the quantity of each attribute acquired per unit currency when a given provider resource is purchased. In one embodiment, the list of attributes can include any one or more of:
  single virtual-core speed (rate of processing a single-threaded computation)
  instance multiplier (effective number of threads that be run in parallel)
  total memory available to a virtual machine
  memory bandwidth (aggregate memory data rate)
  memory latency
  local storage bandwidth
  local storage latency
  network storage bandwidth
  network storage latency
  network interface bandwidth
  network interface latency public network bandwidth
public network latency
included local storage
included network storage
included network bandwidth In one embodiment, providers furnish specifications of attribute quantities included with each resource at a given price. In another embodiment, the exchange can be configured to query a provider to determine specifications of attribute quantities included with each resource at a given price.

At step 905, the exchange computes advertised-quantity/unit-money for each attribute for use in the optimized or improved allocation algorithms. In one example, provider A offers three Compute resource types, Small, Medium, and Large, with the following prices and attributes as follows:

| Provider A Type | CPU | RAM | Price |
|---|---|---|---|
| Small | 1× 1 GHz Core | 1 GB | $0.05/hr |
| Medium | 2× 1 GHz Core | 2 GB | $0.10/hr |
| Large | 4× 2 GHz Core | 7 GB | $0.30/hr |

The exchange can be configured to use a 1 GHz CPU core as the normalized unit of Compute, 1 GB as the normalized unit of RAM. It computes the following normalized attribute prices at 905:

| Provider A Type | CPU-hr/$ | RAM GB-hr/$ |
|---|---|---|
| Small | 20 | 20 |
| Medium | 20 | 20 |
| Large | 26.7 | 21 |

In some examples, process 900 concludes at 905 having obtained normalized attribute prices. According to another embodiment, process 900 can instead at step 906, measure attribute quantities offered in each provider resource empirically using a set of synthetic and application benchmarks (such as SPEC CPU, TPC, iozone, lmbench, etc.) and obtain measurements of real jobs submitted to the system. These measurements are used to produce real-quantity/unit-money for each attribute for use by the resource optimization or improvement algorithms discussed herein.

At 906, using the SPEC CPU synthetic benchmark, the exchange can be configured to detect a different practical characterization of provider A's resources from the advertised characterization.

| Provider A Type | SPEC CPU Measured | Price | Spec-CPU-hr/$ |
|---|---|---|---|
| Small | 10 | $0.05/hr | 200 |
| Medium | 21 | $0.10/hr | 210 |
| Large | 32 | $0.30/hr | 106.7 |

In one embodiment, at step 907, the exchange computes a normalized price in team of the measured attributes.

In one embodiment, the exchange is configured to re-measure real attribute quantities regularly, manually or automatically, and store a database of the time-series of real attribute measures to produce a more accurate analysis of real quantities. The exchange can also be configured to analyze attribute quantities that accounts for time-variance in any resource attributes. In some examples, process 900 is executed periodically, on a given schedule, on demand, and/or as requested.

In another embodiment, the exchange can "time-shift" lease-terms by selling resources at different terms than they were offered by providers, for example by buying resources for a year and time-sharing them hourly. In this embodiment, the exchange incorporates multi-tenancy functionality to ensure that subsequent users of a resource are isolated from past users.

An aspect of the invention is an allocator that computes a schedule of resources. Embodiments of the allocator, and of the process used to improve the allocator, may use either or both of the advertised price, the measured price, and/or normalized values of either in computing an allocation schedule or improving the schedule.

Estimating Cost of Movement

According to one aspect, a cloud compute marketplace or an exchange system operating as part of the cloud compute marketplace is configured to compute the switching costs associated with moving all or part of a job from one provider to another. According to some embodiments, the movement of a job and/or sub-task may be from one part of a single provider's data center to another, between data centers operated by a single provider, or from the data center operated by one provider to a different data center operated by another provider.

Figure 5:
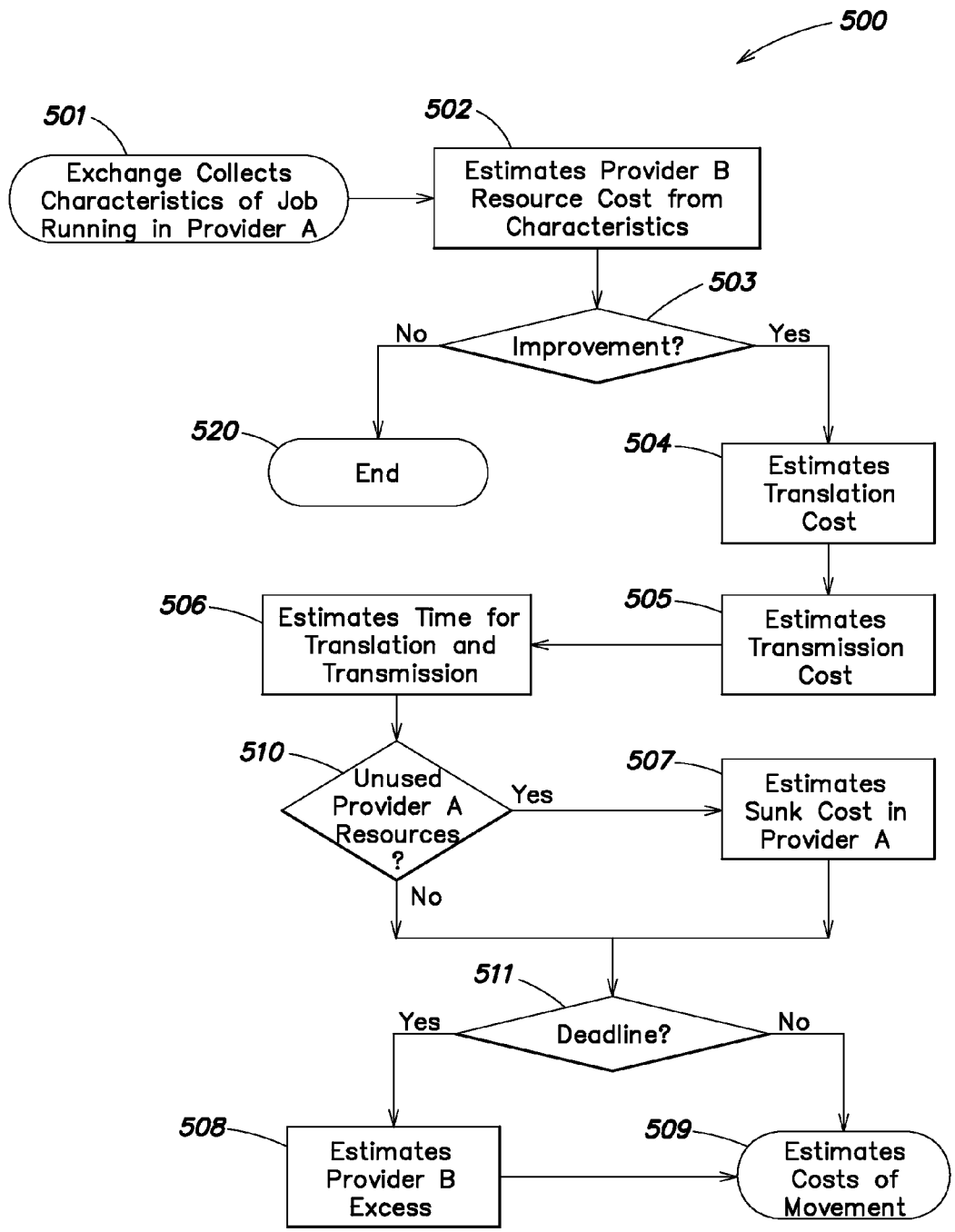
FIG. 5 illustrates an example process for analyzing switching costs associated with moving a sub-task between compute providers, according to aspects of the invention.

In one embodiment, the exchange is configured to estimate a movement cost based on at least one of the following:
1. Availability and reliability cost, that is the downtime incurred or the degree of vulnerability to downtime.
2. The time cost. The cost in time has two components:
   a. The movement cost, that is the time incurred to shutdown, move, and restart the computation.
   b. The cost or improvement due to differing performance between the current location of the computation and the new location
3. The economic cost of resources consumed. The system must compute a deadline or an approximately cost-optimized allocation of resources in the target cloud and compute an estimate of the cost of running the computation there.
4. Total cost to business of switching. This cost includes:
   1. (1) through (3) above
   2. The business's needs such as: availability, durability of data, deadline for the computation, and budget available In some examples, the exchange is configured to execute a process for calculating a cost of movement, and in others the exchange is configured to execute an estimation component configured to perform a process for calculating a cost of movement. In some embodiments, an estimate of the moving cost of a job and/or sub-tasks includes at least one of the following:
1. The amount of data, code, size of VM images, etc., that must be moved.
2. An estimate of the cost to transfer any data, code, VM images, etc., over a communication network connecting the current executing provider with the reallocated provider
   a. The network bandwidth consumption is determined for both the source and destination
   b. The cost of bandwidth at both source and destination can depends upon:
      i. The source location
      ii. The destination location
      iii. Any bulk discounts negotiated by the provider and user
3. An estimate of the time to transfer any data, code, VM images, etc., over the communication network 1. The cost model can be configured to account for the cost to the business of being unavailable or available but with less performance
2. The cost model can be configured to account for a deadline for the entire job
3. The cost model can be configured to account for historical measurements of data transfer rates and predictions for the future
4. The cost model can be configured to account for the time to restart the computation in a new physical location 2. An estimate of the unused but contracted-for usage at the origin that must be paid for even if the job is moved elsewhere
    1. Estimate can be configured to include existing contracts between user and provider which affect the rate paid for computation
3. An estimate of the unused but contracted-for usage at the destination that must be paid for even if the job completes before that usage period expires
    1. Estimate can be configured to include existing contracts between user and provider which affect the rate paid for computation
4. An estimate of the cost for starting a new job at the destination
    1. Estimate can be configured to include the cost, time, I/Os or other resources necessary to quiesce (gracefully terminate) the application at its current location
    2. Estimate can be configured to include the start-up or fixed fees from the provider
    3. Estimate can be configured to include the include the cost, time, I/Os or other resources necessary to restart the computation in its new location
5. An estimate of the performance, cost, time, resources, etc. that best fits the application at its new location
    1. Changing the number or type of VMs may require additional computation to repartition data and the computation and can be configured to invoke various functions configured to re-partition the job and/or data.
    2. Changing the assignment of tasks to VMs—e.g., putting multiple tasks in the old location on the same VM in the new location or vice versa
    3. The estimate can be configured to include the price, performance, or deadline achievable at each provider given the size of the user's job and the job's workload profile Shown in FIG. 5 is an exemplary process 500 for analyzing switching costs associated with moving a sub-task between compute providers. At step 501, the exchange collects characteristics of the job as it runs on one or more providers. The characteristics collected can include the memory used, storage used, number of I/O transactions per-second used, and network bandwidth used for each of the one or more providers, and/or for any task associated with the job. In addition other features may also be collected as they are available and/or specified. In one embodiment, an exchange is configured to execute process 500, and further to maintain a provider characteristics database which stores, for each provider, various characteristics. The characteristics can include any one or more of the provider's capacity for I/O (which can be a normalized measure), network bandwidth, CPU, and memory performance, the characteristics can also include information on availability. Given constraints for a job, for example, a number of virtual machines, total time permitted, and total monetary budget to spend, the exchange can be configured to compute the time and money required to complete the job at, for example, providers A and B.

In one embodiment, at 502 the characteristics for the running job collected at 501 are compared to the estimated availability for resources stored in a provider characteristics database. In some examples, it is sufficient to compute the relative performance of the job execution at provider A and at provider B to estimate the speedup offered by moving the job from provider A to provider B. Given the published costs of resources at both providers, which can be accessed through the provider database, or in some instances queried directly from the providers, and an estimated speedup determined based on the published costs, the difference in monetary expense can be estimated by dividing the expense by the speedup. For instance if CPU costs $0.15/hr at A and $0.25/hr at B and the speedup in execution is 1.5, then the cost at A is $0.15/hr and the cost for the execution at B is $0.25/1.5=$0.167 at B.

If no execution improvement is determined at 503 (no), process 500 can optionally terminate at 520. In some examples process 500 can be configured to re-execute periodically, and in some other examples, can be triggered to execute in response to a change in provider characteristic information in the provider characteristic database. If a potential improvement exists 503 (yes) then at 504, the cost to transform the job at provider A into a job format suitable for provider B is estimated. According to some embodiments, a potential improvement can include reduced cost of execution, reduced time to complete, etc. The estimate for translation costs can, in some examples, be derived from observing the size of the inputs and scaling the costs of other recent translation jobs from format A to format B appropriately.

In one embodiment, at 505, the cost for transmitting the job from provider A to provider B is estimated. In some embodiments, the transmission costs can be calculated in terms of bandwidth consumption. At 506, the time to carry out the movement is estimated. In some examples, the job characterizations from (501) are accessed to determine the time to transmit a given job. In some examples, the characteristics can includes the time, CPU, memory, storage transactions, network bandwidth, and other resources necessary to start and stop the job execution on a given provider. In some embodiments, steps 504, 505, and 506 can be executed together and need not be executed in the sequence illustrated.

In one embodiment, a moving average of the resources used is calculated from historic execution information. In some examples, the moving average of the resources used is calculated from the last three times the job execution was started or stopped. In one example, the exchange can estimate the amount of data to transfer from A to B by executing process 500. As discussed, the estimate can be based either on a moving average of the volume transferred during recent reassignments of allocated jobs or in other examples, users can be permitted to submit estimations of movement costs and/or time. Given these estimates, the exchange can be configured to compute the charge incurred to provider A to retrieve the job's data from any storage system by multiplying a number of I/O transactions required, by the cost per I/O transaction. The charge incurred by provider A for transmitting the data can also be computed by multiplying the per-byte bandwidth charge by the volume of data to be moved. The cost charged by provider B for inbound data and storage transactions can also be added to generate a total cost for movement.

In one embodiment, the job may have been executing at provider A for some time. At 510, a determination is made as to whether any of the allocated resources for executing the job have been used. If provider A has begun execution 510 (yes), the costs of the execution performed is determined at 507. Any processing that has already been performed can be viewed as a sunk cost. In some examples, a provider can specify that early termination of a job incurred a termination cost. Any termination costs can also be included as part of determining incurred or "sunk" costs at 507. If no resources have been consumed 510 (no) and no termination costs apply process 500 continues from both paths at 511.

At 511, the exchange determines if the executing job has a definite deadline. If a deadline is specified 511 (yes), then at 508 the capacity for provider B is analyzed to determine if the specified deadline can be met. According to one embodiment, the determination of whether the specified deadline can be met includes any calculation of movement costs (translation costs and time) determined in the previous steps. If the deadline cannot be met by the resources available at B, a total cost of movement can still be determined at 509. The total cost of movement determined at 509 can be provided to a consumer, detailing the potential improvement in job execution, while at the same time providing the information on the un-satisfied deadline. The consumer can be given the option by the exchange to accept the missed deadline to achieve the detailed improvements in execution. In some embodiments, the resources available at B can meet the stated demand, and in some embodiments, the improved execution achieved through movement of the job can be automatically committed. In other embodiments, a consumer can be notified of the potential to improve execution based on the cost of movement determined at 509, and the system configured to require acceptance from the consumer prior to committing the movement operation.

In one embodiment, at step 509, the exchange computes the economic and time costs of movement which can include any one or more of the following:
1. The economic cost of movement is determined to be the sum of the shutdown cost at A, the startup cost at B, the sunk cost at A, the sunk cost at B, the cost of storage transactions at A, the cost of storage transactions at B, and the cost of bandwidth used at A to transmit the job and the cost of bandwidth at B to receive it.
2. The time cost of moving the application from A to B is the sum of the following estimated times: the estimated time to shutdown the application at A, the estimated time for the transmission, and the estimated startup time at B. The estimation of the transmission time can be computed by maximum likelihood estimation over a Gaussian mixture model of the point-to-point bandwidth observed from A to B as a function of the transmission size, time of day, day of week, and month. The same method can be used to estimate the startup and shutdown time of the application at A and at B, respectively. The time cost of moving the application is the sum of these three estimates plus the estimated change in run time, i.e. the difference between the time for the job to complete at B and the time for it to complete at A.

According to one aspect, the operator of the exchange or the owner of the system implementing the exchange can compute and charge a commission to both buyers and sellers. A commission based exchange recognizes that there is a cost to performing the calculations necessary to efficiently allocate resources, and compensates the exchange for that function. There are any number of approaches to structuring the commission paid to the exchange. These approaches can include any one or more of the following examples:

1. Pure auctioneer
   a. The auction house charges a flat fee per-transaction
   b. The auction house charges a flat percentage of $-value per-transaction
   c. The auction house charges a tiered rate based on volume as in (a) or (b)
   d. The auction house charges a different rate for each resource crossed in a transaction, either (tiered) flat fee or percentage
   e. The auction house may charge a (tiered) fee to participate in the auction plus any combination of (a)-(d)
2. A "broker-dealer"
   a. The exchange may act as a "broker-dealer":
      i. As a broker it may charge as in (1)
      ii. As a dealer it may buy or sell capacity for its own account
3. A broker/agent arrangement
   a. A broker may charge buyer or seller a commission as in (1) above
   b. A broker may share the commission with an agent represent either the buyer or the seller
   c. An agent may pay a fee as in (1) above to have access to the broker's exchange
   d. An agent may share the commission from any transaction with broker In one embodiment of the invention, the exchange advertises capacity from one or more providers to one or more potential consumers. A consumer submits a job request (e.g., as in process 100) to the exchange, which calculates an efficient assignment of resources and a set of n providers, $P_0$ through $P_{n-1}$ that can be used to satisfy the request. The resources are provisioned at each provider and the fee $F_i$ at each provider $P_i$ plus a commission $C_i$ is charged to the consumer. The consumer's total cost is:

$$\sum_{i=0}^{n-1} F_i + C_i$$

The method for computing the commission, $C_i$ may be agreed upon in advance or stated by the exchange at the time of the transaction. One standard method for computing the commission is to set $C_i$ to be some fixed percentage of $F_i$, for example 5%. The specific method is at the discretion of the system embodying the invention.

In another embodiment, which can be used in conjunction with the commission based model, the exchange may buy current capacity or contract for future capacity from some subset of providers $P_0$ through $P_k$ and advertise that capacity as a separate set of providers'$P'_0$ through $P'_k$ where the reported cost of the providers P' is chosen by the exchange. The exchange may additionally charge a commission on the sale of capacity advertised by the virtual providers P'. The exchange may choose the price advertised by the providers P' in one of several ways, including but not limited to, the basis of contracts with the corresponding providers $P_0$ through $P_k$, which might, for instance, set a maximum spread between $P_i$ and $P'_i$, on the basis of the current market price or might not charge a markup at all, simply collecting the commission instead.

In another embodiment, the exchange may charge a fee to providers to list their capacity on the exchange in addition to one or more of the schemes described above. This fee may be calculated in one of a number of ways, including, but not limited to, charging a fixed fee or a percentage of the gross transaction size. This fee may be paid entirely by the listing provider, entirely by the consumer using the capacity sold through the exchange, or split between the provider and the consumer.

According to another aspect, the exchange may analyze time series data pertaining to one or more providers' resources and develop models of providers' variations in pricing and capacity over time, including without limitation by time of day, day of week, time of year, association with special events, or general business cycle. These data may be assembled into aggregate statistics about computing resource capacity and pricing over time. According to a related aspect, these time series may be analyzed by well-known algorithms in order to predict future prices or capacity at various times and dates. Automated prediction models may be programmed into a computer system implementing this aspect of the invention: in one example, the computer system could be asked to estimate the cost of operating web site services on Monday, Nov. 28, 2011 ("Cyber Monday") at 12 pm Eastern Time. In one embodiment, an algorithm implementing the invention can include any of or more of the following steps:

1. Obtain historical costs for comparable dates and times and average them. For example, calculate the average cost of similar computation resources for web site services from each provider on Mondays at 12 noon over the past year.
2. Correlate with seasonal effects. For example, calculate the average cost of similar computation resources for the 2 weeks before and after the target date for preceding years, and compute an expected "seasonal" factor adjusting the expected price for time of year.
3. Correlate with any anomalies. For example, retail web sites typically experience a significant spike in demand on the Monday following the fourth Thursday of November. The system might observe, or be programmed to take into account, any patterns that occur on particular days and adjust its expected price by the magnitude of similar historical spikes vis-à-vis an ordinary day.
4. Combine the expected historical costs with the magnitude of any expected anomaly in order to yield an expected price for that date. For example, the expected price might be the average price of computing cycles on Mondays over the past year, adjusted for the implied growth rate through the target date, and then adjusted again for the expected spike due to Cyber Monday effects.

In other embodiments, the system might use a different analytical technique for prediction based on time series, or present the historical data to a skilled human worker who examines the data and issues a price quotation through other methods of analysis.

According to another related aspect, a system implementing an exchange for computing resources may offer future resources for sale, for example, to a project manager who wishes to "lock in" a certain amount of computation capacity for analysis three months from now after a data collection process is complete. The system may offer these resources based on actual quotations from resource providers who wish to sell their resources in advance, and/or using expected costs for other providers who do not sell their resources in advance but whose time series have been analyzed by the system according to the foregoing aspect of the invention, or a combination thereof. A system implementing this aspect of the invention is configured to conduct the exchange as described in the foregoing, except that a job description also include one or more constraints on the future date(s) and time(s) the described computation is to be run. One method of supplying these constraints is to include a representation of the earliest date the job would start and the latest date the job could start; the already described deadlines already form constraints on when the job must end. The exchange would then optimize the allocation of available future resources according to providers' future prices (where available) or its own estimates of providers' future prices.

These agreements to provide computing resources in the future form the basis of forward or futures contracts for computing resources, where the exchange facilitates the determination of the expected price of the resource in the future and guarantees that the buyer will receive compute cycles and, when acting as an intermediary instead of a seller, that the seller be paid for those cycles. In another aspect of the invention, the system operating the exchange calculates appropriate prices for futures or forward contracts for resources using established formulae for financial derivatives, given the expected prices of resources, a widely accepted risk-free interest rate, historical time series, and any risk premium inherent in the provider of any resources. Moreover, the exchange could facilitate continuously traded futures contracts for standardized resources such as "2 GHz Xeon CPU Days", "1 TB of online disk storage with 99.999% durability and 99.9% availability", and "1 TB of Internet bandwidth at 5 MB/sec", permitting large-scale producers or consumers of computing resources to hedge against changes in the price of those resources. An example from existing futures exchanges is wheat futures traded on the Minneapolis Grain Exchange, which are for "hard red winter wheat"; agriculture producers and consumers of durum wheat hedge variations in wheat prices by buying and selling these futures.

Various embodiments are configured to predict future prices for resources, compute prices for futures or forward contracts for computing resources, implement an exchange for futures contracts or computing resources, or any combination thereof.

Embodiments can be configured to offer future resources for sale as "baskets" so that consumers may purchase a basket of resources in the future from the exchange. In this aspect, the consumer gives the exchange a purchase order including one or more resources to purchase on a future date. The exchange guarantees the provision of the purchased resources to the purchaser on the future date, and the exchange seeks agreements with the providers of the resources to provide the required resources. In a further aspect, the exchange would seek to monitor the capability of the contracted provider to provide the resources. The exchange would either be obligated to find suitable substitutes in the event the original provider was no longer able or willing to provide the resources at the appointed time, or reach an understanding of terms of default with the consumer in the event the resources are not available at the appointed time. An excellent comparison model for this business structure is commodities futures exchanges, which monitor exchange participants and charge fees that enable it to aggregate risk and guarantee delivery of commodities to purchasers of commodities futures.

Various embodiments according to the present invention may be implemented on one or more specially programmed computer systems, including for example FIG. 10 clearing system 1002. These computer systems may be, for example, general-purpose computers such as those based on Intel PENTIUM-type processor, Motorola PowerPC, AMD Athlon or Turion, Sun UltraSPARC, Hewlett-Packard PA-RISC processors, or any other type of processor, including multi-core processors. It should be appreciated that one or more of any type computer system may be used to facilitate optimization and/or distribution of a cloud compute task according to various embodiments of the invention. Further, the system may be located on a single computer or may be distributed among a plurality of computers attached by a communications network.

A general-purpose computer system according to one embodiment of the invention is specially configured to perform any of the described functions, including but not limited to, creating, storing, partitioning, optimizing, allocating, and analyzing cloud compute tasks. It should be appreciated that the system may perform other functions, including dynamically monitoring executing tasks, determining optimal allocations of compute sub-tasks across a plurality of cloud compute providers, registering compute providers, providing sandboxed compute environments, generating benchmark tasks, monitoring execution of benchmark tasks at the plurality of compute providers, estimating compute costs, estimating compute time, re-allocating compute jobs, job instances, and job sub-tasks, calculating translation costs for a cloud compute provider, estimating translation costs, estimating movement costs associated with moving an executing task from an assigned provider, estimating movement costs for allocated jobs, analyzing a received compute task to automatically determine constraints, interactively defining constraints for a received job through a user interface displayed on a host computer, estimating total cost for completing a compute task, estimating a total time for completing a compute task, paying users, receiving payments from information consumers, providing indications to users and consumers, etc., and the invention is not limited to having any particular function or set of functions.

Figure 20:
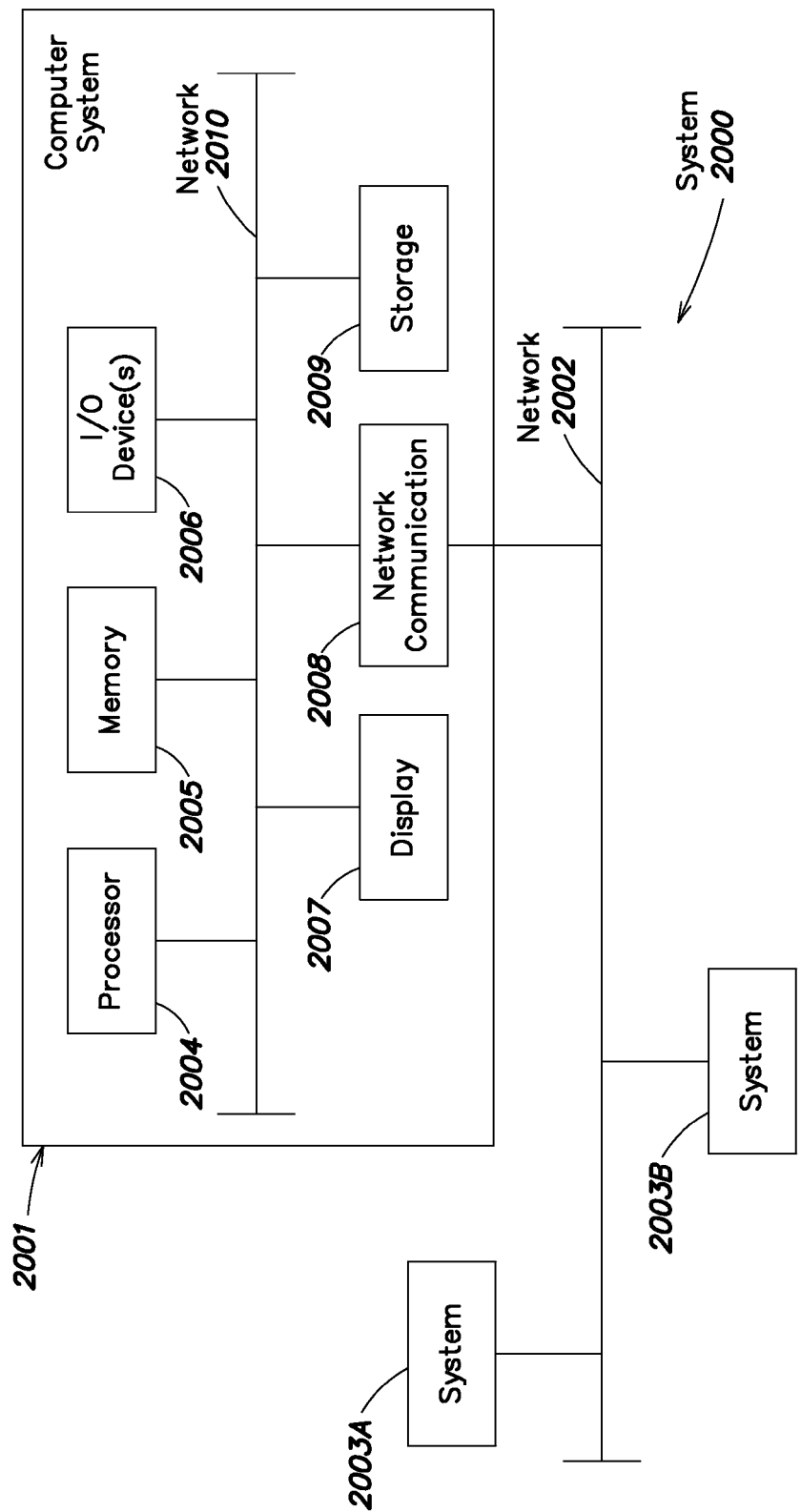
FIG. 20 is a block diagram of an example general-purpose computer system upon which various embodiments of the invention may be implemented.

FIG. 20 shows a block diagram of a general purpose computer and network system 2000 in which various aspects of the present invention may be practiced. For example, various aspects of the invention may be implemented as specialized software executing in one or more computer systems including general-purpose computer system 2001 shown in FIG. 20. Computer system 2001 may include a processor 2004 connected to one or more memory devices 2005, such as a disk drive, memory, or other device for storing data. Memory 2005 is typically used for storing programs and data during operation of the computer system 2001. Components of computer system 2001 may be coupled by an interconnection mechanism such as network 2010, which may include one or more busses (e.g., between components that are integrated within a same machine) and/or a network (e.g., between components that reside on separate discrete machines). The interconnection mechanism enables communications (e.g., data, instructions) to be exchanged between system components of system 2001.

Computer system 2001 also includes one or more input/output (I/O) devices 2006, for example, a keyboard, mouse, trackball, microphone, touch screen, a printing device, display screen, speaker, etc. In addition, computer system 2001 may contain one or more interfaces (e.g., network communication device 2008) that connect computer system 2001 to a communication network 2002 (in addition or as an alternative to the network 2010.

The storage system 2009, typically includes a computer readable and writeable nonvolatile recording medium in which signals are stored that define a program to be executed by the processor or information stored on or in the medium to be processed by the program. The medium may, for example, be a disk or flash memory. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). The memory may be located in storage system 2009, as shown, or in memory system 2005. The processor 2004 generally manipulates the data within the memory 2005, and then copies the data to the medium associated with storage 2009 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 2001 is shown by way of example as one type of computer system upon which various aspects of the invention may be practiced, it should be appreciated that aspects of the invention are not limited to being implemented on the computer system as shown in FIG. 20. Various aspects of the invention may be practiced on one or more computers having a different architectures or components that that shown in FIG. 20.

Computer system 2001 may be a general-purpose computer system that is programmable using a high-level computer programming language. Computer system 2001 may be also implemented using specially programmed, special purpose hardware. In computer system 2001, processor 2004 is typically a commercially available processor such as the well-known Pentium class processor available from the Intel Corporation. Many other processors are available including multi-core processors and microprocessors. Such a processor usually executes an operating system which may be, for example, the Windows-based operating systems (e.g., Windows NT, Windows 2000 (Windows ME), Windows XP, Windows VISTA, Windows 7 operating systems) available from the Microsoft Corporation, MAC OS System X operating system available from Apple Computer, one or more of the Linux-based operating system distributions (e.g., the Enterprise Linux operating system available from Red Hat Inc.), the Solaris operating system available from Sun Microsystems, or UNIX operating systems available from various sources. Many other operating systems may be used, and the invention is not limited to any particular operating system.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems 2003A-B. For example, various aspects of the invention may be distributed among one or more computer systems (e.g., servers) configured to provide a service to one or more client computers, or to perform an overall task as part of a distributed system. For example, various aspects of the invention may be performed on a client-server or multi-tier system that includes components distributed among one or more server systems that perform various functions according to various embodiments of the invention including receiving, analyzing, partitioning, distributing, executing, re-allocating, and accessing cloud compute tasks. Other components can be configured to determine automatically job constraints and monitor executing jobs for dynamic optimization in a plurality of provider formats environment as well as a single provider format environment. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Various aspects of this system can be implemented by one or more systems within system 2000. For instance, the system may be a distributed system (e.g., client server, multi-tier system). In one example, the system includes software processes executing on a system associated with a user (e.g., a client system). These systems may permit the user to create, submit, view, track, and alter compute tasks submitted to a cloud compute marketplace. Further, client systems can be associated with compute providers who access, for example, a central clearing system of the cloud compute marketplace to register their service, identify available compute resources, pricing, limitations on job execution, execution format, among other parameters associated with compute resources.

Figure 21:
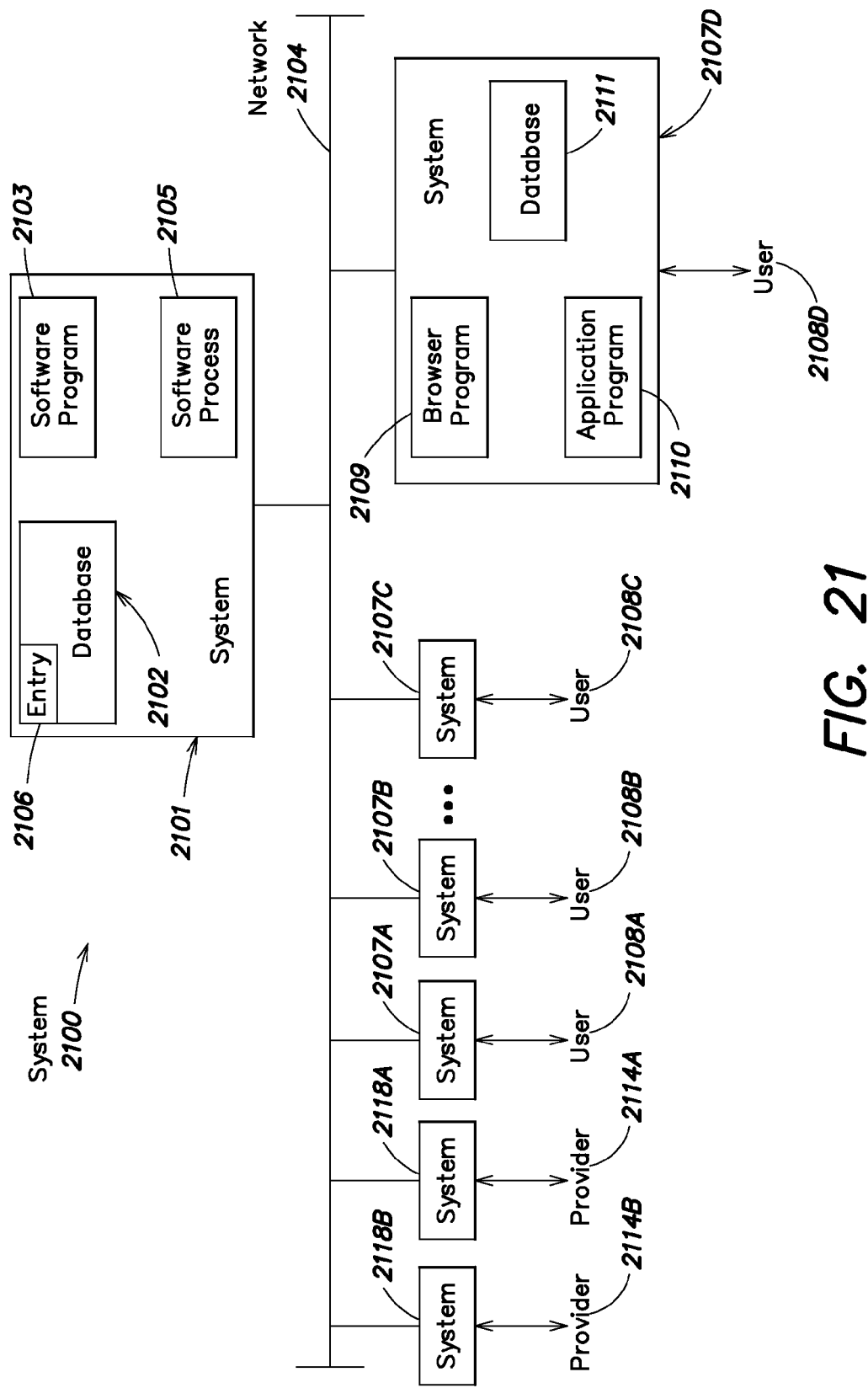
FIG. 21 is a block diagram of an example computer system with which various embodiments of the invention may be practiced.

FIG. 21 shows an architecture diagram of an example system according to one embodiment of the invention. It should be appreciated that FIG. 21 is used for illustration purposes only, and that other architectures may be used to facilitate one or more aspects of the present invention.

As shown in FIG. 21, a distributed system 2100 may be used to conduct functions of the cloud compute system, including, but limited to, job distribution, optimization of sub-task allocation, monitoring of executing sub-tasks, re-allocation of sub-tasks, translation of sub-tasks, automatic identification of job attributes and/or constraints, definition of rule based job analysis, execution of job analysis rules, among other examples. System 2100 may include one or more computer systems (e.g., systems 2101, 2107A-D, 2118A-B) coupled by a communication network 2104. Such computer systems may be, for example, general-purpose computer systems as discussed above with reference to FIG. 20.

In one embodiment of the present invention, system 2101 stores attributes associated with executed cloud compute tasks, stores rules associated with assigning attributes and/or constraints to received cloud compute tasks, stores real-time pricing information for each compute provider (e.g., 2118A-B), stores real-time resource availability for each compute provider on one or more databases (e.g., database 2102). Each provider can be associated with an entry in the database 2106, although other database models can be used. In some examples, a relational database model is implemented, and in others non-relational database models can be employed.

Further, system 2101 performs associated functions with the distribution, estimation, translation, monitoring, re-allocation, partitioning, and assignment of constraints to cloud compute tasks. System 2101 can also be configured to provide access to information associated with new compute tasks, completed compute task, and executing compute task through a user interface accessible over a communication network, for example, the Internet.

System 2101 may include a server process (e.g., process 2105) that responds to requests from one or more client programs. Process 2105 may include, for example, an HTTP server or other server-based process (e.g., a database server process, XML server, peer-to-peer process) that interfaces to one or more client programs distributed among one or more client systems (e.g., systems 2107A-2107D), for example, to provide access to information on cloud compute tasks, permit submission of cloud compute tasks, define constraints, monitor execution, and retrieve completed cloud compute tasks.

According to one embodiment, client programs may be capable of permitting a user to create, submit, alter, monitor, request estimates, approve estimates, reject estimates for cloud compute tasks within an online user interface. Such client programs may include, for example, any type of operating system and/or application program capable of communicating with system 2101 through network 2104. In one particular instance, a client may include a browser program (e.g., browser program 2109) that communicates with server process 2105 using one or more communication protocols (e.g., HTTP over a TCP/IP-based network, XML requests using HTTP through an Ajax client process, distributed objects, https, or other secure or non-secure communication protocol).

Although it is shown by way of example that a browser program may be used to access the marketplace by users 2108A-D to perform functions for requesting cloud compute tasks, it should be appreciated that other program types may be used to interface a user to server process 2105 or a cloud compute marketplace. For instance, an application program that is specially-developed to manage cloud compute task submission may be provided to permit a user to perform cloud compute requests and/or functions according to various embodiments of the present invention. The client program may be, for example, a thin client including an interface for submitting and monitoring cloud compute requests. Alternatively, the client may be a scripted program, or any other type of program having the capability of transferring data for a compute task. According to one embodiment, such client programs may, for example, be downloaded and installed over the network. Further, these client programs may be stored and distributed by system 2101 in the form of one or more software programs 2103, including for example, browser plug-ins, active x objects, applets, and java code.

In one specific example, the client program may include an application program 2110 that permits submission and monitoring of cloud compute tasks. Another example of a client programs permits a compute provider (e.g., 2114A-B) to register cloud compute resources (e.g., systems 2118A-B) with the marketplace. The provider may designate their resources as public or private or both. The provider may establish limits on the type of compute task that may be execute on the provider's resources. This program 2110, in one embodiment, may be integrated with browser program 2109 executing on, for example, system 2107D. For instance, the application program 2110 may include one or more controls that, when selected by the user, perform functions for manipulating submitted compute jobs. These controls may be written in a variety of programming languages, and the invention is not limited to any particular language. In one specific example, the control may be a link that, when selected, performs one or more programmed functions. Such functions may permit the user to create, submit, view, monitor, and alter cloud compute tasks within the cloud compute marketplace.

Information stored in the database 2102 may include, for example, real-time provider information including, but not limited to, compute resource pricing, resource availability, resource guarantees, job execution format, translation requirements, historical compute performance, benchmark performance information, public resource designation, private resource designation, execution limitations, and other information that can be used to facilitate the operation of cloud compute marketplace.

This information may be collected from the user in an interface (e.g., as presented by program 2110) and stored in the database (e.g., database 2102). Additionally, client systems may store a local copy of a user's information and any job execution information within a local database associated with the client system (e.g., database 2111 located on client system 2107D). However, it should be appreciated that the invention is not limited to storing information in any particular location. A client system (e.g., clients 2107A-2107D) may include one or more interfaces through which job information may be presented to the user. In one example, job information and status may be presented in an interface of a browser program (e.g., browser program 2109) executing on a client computer system (e.g., system 2107D).

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A computer implemented method for distributing cloud compute jobs, the method comprising acts of:
receiving, by a central computer system, over a communication network a request to complete a computer based task, the request including at least a virtual machine image specifying the computer based task;
creating automatically, by the central computer system, at least one condition constraining the completion of the computer based task, based on analysis of task execution information of the computer based task;
partitioning, by the central computer system, the computer based task into one or more sub-tasks;
determining, by the central computer system, assignment of the one or more sub-tasks to one or more of a plurality of compute providers, wherein the act of determining the assignment of the one or more sub-task includes analyzing the plurality of compute providers for at least resource availability and determining a translation cost for changing an execution format of the one or more sub-tasks to a supported virtual machine execution format of at least one of the plurality of compute providers and to meet the automatically created at least one condition constraining the completion of the computer based task, wherein at least one of the plurality of compute providers provides a different virtual machine execution format associated with execution of a compute task;
transmitting, over the communication network, a request to execute each sub-task to at least one virtual machine of a respective provider; and
providing access, over the communication network, to any portion of the executed task, wherein the computer based task is scheduled to be executed according to the any condition.

2. The method according to claim 1, wherein the act of creating the at least one condition includes acts of:
analyzing the computer based task; and
determining, automatically by the central computer system, at least a minimal set of conditions required to execute the computer based task.

3. The method according to claim 2, wherein an act of determining, automatically by the central computer system, the at least a minimal set of conditions includes identifying constraints for the computer based task based on a training set of constraints for computer based tasks having identified attributes.

4. The method according to claim 2, wherein an act of determining, automatically by the central computer system, the at least the minimal set of conditions includes acts of:
accessing a set of stored rules having computer based task attributes;
evaluating the computer based task against the set of rules; and
assigning constraints to the computer based task based on matching attributes.

5. The method according to claim 2, wherein the method further comprises acts of:
evaluating the at least the minimal set of conditions required to execute the computer based task, and
updating at least one of a training procedure and a set of rules having computer based task attributes and constraints in response to the act of evaluating.

6. The method according to claim 1, wherein the method further comprises an act of determining at least a minimal set of conditions required to execute the computer based task in response to an act of classifying the computer based task according to at least one of system prompted user-responses, a stochastic classifier, and a rules based classifier.

7. The method according to claim 1, wherein the act creating, automatically by the central computer system, the at least one condition based on the computer based task includes an act of assigning at least one response-function family of constraints for the computer based task.

8. The method according to claim 1, wherein the method further comprises an act of monitoring, by the central computer system, at least a portion of an execution of the computer based task in an input environment; and
generating a virtualized environment corresponding to the input environment.

9. The method according to claim 1, further comprising an act of storing the at least one constraining the completion of the computer based task and attributes of the computer based task.

10. The method according to claim 1, wherein one or more of a plurality of compute providers include at least a first compute provider having a first compute execution format and at least a second compute provider having a second compute execution format, and the act of determining the assignment of the one or more sub-tasks to the one or more of a plurality of compute providers includes estimating the translation cost in terms of compute resource of any of the one or more sub-tasks to permit execution in at least one of the first compute execution format and the second compute execution format.

11. The method according to claim 1, further comprising an act of querying the one or more providers for job execution format and processing capability.

12. The method according to claim 11, wherein the act of querying the one or more providers includes an act of requesting execution of a benchmark task.

13. The method according to claim 1, further comprising an act of recalculating the assignment of the one or more sub-tasks to the one or more of the plurality of compute providers based on execution parameters.

14. The method according to claim 13, wherein the execution parameters includes at least one of new compute resource availability, updated pricing information for available compute resources, sub-task performance information, and update computer based task preferences.

15. The method according to claim 1, further comprising an act of estimating a compute cost of moving at least one assigned sub-task.

16. The method according to claim 15, wherein the act of estimating a compute cost of moving the at least one assigned sub-task includes estimating a translation cost in terms of compute resource.

17. The method according to claim 1, wherein the task execution information includes information generated from historic, current, or modeled task execution.

18. The method according to claim 17, identifying the wherein the task execution information is generated based on matching a model of execution to the computer based task.

19. A system for executing cloud compute jobs, the system comprising:
at least one processor operatively connected to a memory for executing system components;
a communication component configured to receive a request to complete a computer based task, the request including at least a virtual machine image specifying the computer based task;
a constraint component configured to automatically create at least one condition constraining the completion of the computer based task, based on analysis of task execution information of the computer based task;
a partition component configured to partition the computer based task into one or more sub-tasks;
an allocation component configured to assign the one or more sub-tasks to one or more of a plurality of compute providers, wherein the allocation component is further configured to determine the assignment of the one or more sub-tasks based on at least resource availability and determine a translation cost associated with each compute provider for changing an execution format of the one or more sub-tasks to a supported virtual machine execution format of at least one of the plurality of compute providers and to meet the automatically created at least one condition constraining the completion of the computer based task, wherein at least one of the plurality of compute providers provides a different virtual machine execution format associated with execution of a compute task;
a distribution component configured to distribute each sub-task to at least one virtual machine of a respective compute provider for execution; and wherein the communication component is further configured to provide access to the completed computer based task, wherein the computer based task is completed within the any defined condition.

20. The system according to claim 19, wherein the constraint component is further configured to:
analyze the computer based task; and
determine, automatically, at least a minimal set of conditions required to complete the computer based task.

21. The system according to claim 20, wherein the constraint component is further configured to determine constraints for the computer based task based on a training set of constraints for computer based tasks having identified attributes.

22. The system according to claim 20, wherein the constraint component is further configured to:
access a set of stored rules having computer based task attributes;
evaluate the computer based task against the set of rules; and
assign constraints to the computer based task based on matching attributes.

23. The system according to claim 22, further comprising a classification component configured to determine at least a minimal set of conditions required to execute the computer based task in response to an act of classifying the computer based task according to at least one of system prompted user-responses, a stochastic classifier, and a rules based classifier.

24. The system according to claim 20, wherein the system further comprises a training component configured to:
evaluate the at least the minimal set of conditions required to complete the computer based task, and
update at least one of a training procedure and a set of rules having computer based task attributes and constraints in response to evaluating of the at least the minimal set of conditions required to complete the computer based task.

25. The system according to claim 19, wherein the constraint component is further configured to assign at least one response-function family of constraints for the computer based task.

26. The system according to claim 19, wherein the system further comprises a translation component configured to:
monitor at least a portion of an execution of the computer based task in an input environment; and
generate a virtualized environment corresponding to the input environment.

27. The system according to claim 26, wherein the translation component is further configured to query the one or more providers for job execution format.

28. The system according to claim 27, wherein the translation component is further configured to request execution of a benchmark task.

29. The system according to claim 19, wherein the system further comprises a storage component configured to store the at least one condition constraining the completion of the computer based task and attributes of the computer based task.

30. The system according to claim 19, wherein one or more of a plurality of compute providers include at least a first compute provider having a first compute execution format and at least a second compute provider having a second compute execution format, and allocation component is further configured to estimate a translation cost in terms of compute resource of any of the one or more sub-tasks to permit execution in at least one of the first compute execution format and the second compute execution format.

31. The system according to claim 19, wherein the system further comprises an optimization component configured to recalculate the assignment of the one or more sub-tasks to the one or more of the plurality of compute providers based on execution parameters.

32. The system according to claim 31, wherein the execution parameters includes at least one of new compute resource availability, updated pricing information for available compute resources, sub-task performance information, and update computer based task preferences.

33. The system according to claim 19, wherein the optimization component is further configured to estimate a compute cost of moving at least one assigned sub-task.

34. The system according to claim 33, wherein the optimization component is further configured to estimate a translation cost in terms of compute resource.

35. The system according to claim 19, wherein the task execution information includes information generated from historic, current, or predictive task execution.

36. The system according to claim 35, identifying the wherein the task execution information is generated based on matching a model of execution to the computer based task.

37. A computer implemented method for distributing cloud compute jobs, the method comprising acts of:

receiving, by a central computer system, over a communication network a request to complete a computer based task;

creating automatically, by the central computer system, at least one condition constraining the completion of the computer based task, based on analysis of task execution information;

partitioning, by the central computer system, the computer based task into one or more sub-tasks;

determining, by the central computer system, assignment of the one or more sub-tasks to one or more of a plurality of compute providers, wherein the act of determining the assignment of the one or more sub-task includes analyzing the plurality of compute providers for at least resource availability and determining a translation cost for changing an execution format of the one or more sub-tasks to meet the automatically created at least one condition constraining the completion of the computer based task, wherein at least one of the plurality of compute providers provides a different execution format associated with execution of a compute task;

transmitting, over the communication network, a request to execute each sub-task to a respective provider; and providing access, over the communication network, to any portion of the executed task, wherein the computer based task is scheduled to be executed according to the any condition.

* * * * *